(12) United States Patent
Grouf et al.

(10) Patent No.: US 10,939,168 B2
(45) Date of Patent: *Mar. 2, 2021

(54) METHODS AND SYSTEMS FOR GENERATING AND PROVIDING PROGRAM GUIDES AND CONTENT

(71) Applicant: Pluto Inc., West Hollywood, CA (US)

(72) Inventors: Nicholas A. Grouf, Beverly Hills, CA (US); Ilya Pozin, Los Angeles, CA (US); Thomas Sieverding, Los Angeles, CA (US); Michael Price, St. Petersburg, FL (US); Lindsey Emerson, Los Angeles, CA (US); Lynn D. Gabbay, Jacksonville, FL (US); Thomas V. Ryan, Los Angeles, CA (US); Audra E. Gold, Los Angeles, CA (US); Chan V. Hou, Long Beach, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,834

(22) Filed: Feb. 7, 2020

(65) Prior Publication Data

US 2020/0177959 A1  Jun. 4, 2020

Related U.S. Application Data

(63) Continuation of application No. 16/297,143, filed on Mar. 8, 2019, now Pat. No. 10,560,746, which is a
(Continued)

(51) Int. Cl.
*H04N 7/10* (2006.01)
*H04N 21/45* (2011.01)
(Continued)

(52) U.S. Cl.
CPC ......... *H04N 21/4532* (2013.01); *H04N 5/445* (2013.01); *H04N 5/45* (2013.01);
(Continued)

(58) Field of Classification Search
CPC ............... H04N 21/4532; H04N 21/47; H04N 21/4882; H04N 21/4788; H04N 21/4316;
(Continued)

(56) References Cited

U.S. PATENT DOCUMENTS 6,378,129 B1 * 4/2002 Zetts ................. H04L 29/06027
348/E5.008
6,625,811 B1 * 9/2003 Kaneko ................. H04H 20/12
725/94
(Continued)

FOREIGN PATENT DOCUMENTS

EP  0 594 350 A1  4/1994
GB  2 343 051 A   4/2000
(Continued)

OTHER PUBLICATIONS

European Search Report dated May 3, 2019 received for European Patent Application No. EP 19 15 8438, 10 pages.
(Continued)

*Primary Examiner* — Michael B. Pierorazio
(74) *Attorney, Agent, or Firm* — Knobbe, Martens, Olson & Bear LLP

(57) ABSTRACT

Systems and methods for identifying, assembling, and publishing content are described. A content item, such as a video, having a first time length, is identified by a system to be included in a program scheduled for a first time period. The video may be hosted on a third party system. A first span of time within the first program is allocated for the video, wherein the first span of time is longer than the first time length. The system determines, prior to or at the first time
(Continued)

period, a time difference between a current length of the video and the first span of time. At least partly in response to determining that the video has a time length shorter than the first span of time, the system selects supplemental content based at least in part of the determined time difference to be streamed to user terminals over a data network within the first time period.

30 Claims, 35 Drawing Sheets

Related U.S. Application Data continuation of application No. 15/975,545, filed on May 9, 2018, now Pat. No. 10,231,018, which is a continuation of application No. 15/633,646, filed on Jun. 26, 2017, now Pat. No. 9,998,787, which is a continuation of application No. 14/988,375, filed on Jan. 5, 2016, now Pat. No. 9,712,884, which is a continuation of application No. 14/622,153, filed on Feb. 13, 2015, now Pat. No. 9,258,589.

(60) Provisional application No. 61/940,096, filed on Feb. 14, 2014.

(51) Int. Cl.
```
H04N 21/262      (2011.01)
H04N 21/2665     (2011.01)
H04N 21/234      (2011.01)
H04N 21/472      (2011.01)
H04N 21/24       (2011.01)
H04N 21/482      (2011.01)
H04N 5/445       (2011.01)
H04N 21/488      (2011.01)
H04N 5/45        (2011.01)
H04N 21/47       (2011.01)
H04N 21/431      (2011.01)
H04N 21/435      (2011.01)
H04N 21/458      (2011.01)
H04N 21/466      (2011.01)
H04N 21/4788     (2011.01)
```

(52) U.S. Cl.
CPC ... *H04N 21/23424* (2013.01); *H04N 21/2407* (2013.01); *H04N 21/2665* (2013.01); *H04N 21/26241* (2013.01); *H04N 21/26258* (2013.01); *H04N 21/26283* (2013.01); *H04N 21/435* (2013.01); *H04N 21/4316* (2013.01); *H04N 21/458* (2013.01); *H04N 21/4668* (2013.01); *H04N 21/47* (2013.01); *H04N 21/4788* (2013.01); *H04N 21/47214* (2013.01); *H04N 21/4821* (2013.01); *H04N 21/4825* (2013.01); *H04N 21/4882* (2013.01)

(58) Field of Classification Search
CPC ............. H04N 21/435; H04N 21/458; H04N 21/4668; H04N 21/26283; H04N 21/26241; H04N 21/26258; H04N 21/2665; H04N 21/23424; H04N 21/47214; H04N 21/2407; H04N 21/4825; H04N 21/4821
USPC ........................................................ 725/34
See application file for complete search history.

(56) References Cited

U.S. PATENT DOCUMENTS

| | | | |
|---|---|---|---|
| 7,028,327 B1 | 4/2006 | Dougherty | |
| 7,694,318 B2 | 4/2010 | Konig | |
| 8,005,826 B1* | 8/2011 | Sahami | G06F 16/438 707/723 |
| 8,418,195 B1* | 4/2013 | Page | H04N 21/458 725/32 |
| 8,533,761 B1* | 9/2013 | Sahami | H04N 21/4828 725/53 |
| 8,572,649 B1* | 10/2013 | Gossweiler, III | H04N 21/4828 725/39 |
| 8,578,042 B2* | 11/2013 | Hu | H04N 7/165 709/231 |
| 8,631,440 B2* | 1/2014 | Gossweiler, III | H04N 21/278 725/52 |
| 8,826,443 B1* | 9/2014 | Raman | H04L 63/20 726/26 |
| 8,886,745 B2 | 11/2014 | Kannan | |
| 9,112,623 B2 | 8/2015 | Blaxland | |
| 9,130,918 B2* | 9/2015 | Picconi | H04L 63/08 |
| 10,560,746 B2* | 2/2020 | Grouf | H04N 21/4316 |
| 2002/0038457 A1* | 3/2002 | Numata | H04N 21/4583 725/47 |
| 2002/0083439 A1 | 6/2002 | Eldering | |
| 2002/0083442 A1 | 6/2002 | Eldering | |
| 2003/0058707 A1 | 3/2003 | Dilger | |
| 2003/0074664 A1 | 4/2003 | Kwoh | |
| 2003/0088872 A1 | 5/2003 | Maissel et al. | |
| 2003/0149988 A1 | 8/2003 | Ellis et al. | |
| 2003/0212708 A1* | 11/2003 | Potrebic | H04N 21/4334 |
| 2003/0229900 A1 | 12/2003 | Reisman | |
| 2004/0117831 A1 | 6/2004 | Ellis et al. | |
| 2004/0123317 A1 | 6/2004 | Ozawa | |
| 2004/0255336 A1 | 12/2004 | Logan et al. | |
| 2005/0256873 A1 | 11/2005 | Walker | |
| 2006/0287915 A1 | 12/2006 | Boulet | |
| 2006/0294548 A1 | 12/2006 | Potrebic et al. | |
| 2007/0107010 A1 | 5/2007 | Jolna | |
| 2007/0174125 A1 | 7/2007 | Poole | |
| 2007/0204297 A1 | 8/2007 | Gonzalez | |
| 2007/0204310 A1 | 8/2007 | Hua et al. | |
| 2007/0299877 A1 | 12/2007 | Cohen et al. | |
| 2008/0040743 A1 | 2/2008 | Dharmaji | |
| 2008/0052741 A1 | 2/2008 | Dharmaji | |
| 2008/0127257 A1 | 5/2008 | Kvache | |
| 2008/0250445 A1 | 10/2008 | Zigmond | |
| 2008/0271078 A1* | 10/2008 | Gossweiler | H04N 5/44543 725/40 |
| 2008/0271080 A1* | 10/2008 | Gossweiler | H04N 21/4334 725/47 |
| 2008/0306818 A1 | 12/2008 | Evans | |
| 2009/0006375 A1 | 1/2009 | Lax | |
| 2009/0070819 A1* | 3/2009 | Gajda | H04H 60/65 725/46 |
| 2009/0133054 A1 | 5/2009 | Boggie | |
| 2009/0172725 A1 | 7/2009 | Heilbron | |
| 2009/0199114 A1 | 8/2009 | Lewis | |
| 2009/0204487 A1 | 8/2009 | Cansler | |
| 2009/0217316 A1 | 8/2009 | Gupta | |
| 2009/0241145 A1 | 9/2009 | Sharma | |
| 2009/0259711 A1 | 10/2009 | Drieu et al. | |
| 2009/0300675 A1 | 12/2009 | Shkedi | |
| 2009/0327346 A1 | 12/2009 | Teinila | |
| 2010/0325657 A1* | 12/2010 | Sellers | H04N 21/2387 725/32 |
| 2011/0030012 A1 | 2/2011 | Diaz | |
| 2011/0149992 A1 | 6/2011 | Sharma et al. | |
| 2011/0153423 A1 | 6/2011 | Elvekrog | |
| 2011/0179356 A1 | 7/2011 | Bassali | |
| 2011/0261171 A1 | 10/2011 | Otsuka et al. | |
| 2011/0264522 A1 | 10/2011 | Chan | |
| 2012/0102524 A1 | 4/2012 | Goldschmidt et al. | |
| 2012/0110621 A1* | 5/2012 | Gossweiler, III | H04N 21/488 725/46 |
| 2012/0116869 A1 | 5/2012 | Vasudevan | |

(56) References Cited

U.S. PATENT DOCUMENTS

| | | |
|---|---|---|
| 2012/0144416 A1 | 6/2012 | Wetzer et al. |
| 2012/0192232 A1* | 7/2012 | Ellis .................. H04N 7/17336 |
| | | 725/41 |
| 2012/0272264 A1* | 10/2012 | Suzuki ............. H04N 21/23113 |
| | | 725/33 |
| 2013/0198642 A1* | 8/2013 | Carney ............. H04N 21/4307 |
| | | 715/738 |
| 2013/0198779 A1 | 8/2013 | Moon |
| 2013/0239136 A1 | 9/2013 | Babu |
| 2013/0276032 A1 | 10/2013 | Walter et al. |
| 2013/0305285 A1 | 11/2013 | Cook |
| 2013/0305287 A1* | 11/2013 | Wong .................. H04N 21/482 |
| | | 725/42 |
| 2013/0312028 A1 | 11/2013 | Dharmaji et al. |
| 2013/0332959 A1 | 12/2013 | Kothari |
| 2013/0347018 A1 | 12/2013 | Limp |
| 2014/0157312 A1* | 6/2014 | Williams ........... H04N 21/4667 |
| | | 725/39 |
| 2014/0189743 A1* | 7/2014 | Kennedy .......... H04N 21/44222 |
| | | 725/46 |
| 2014/0201791 A1 | 7/2014 | Angiolillo et al. |
| 2014/0282667 A1 | 9/2014 | Major |
| 2014/0282677 A1 | 9/2014 | Mantell |
| 2014/0282736 A1 | 9/2014 | Elstermann |
| 2014/0304756 A1 | 10/2014 | Fletcher |
| 2014/0351843 A1* | 11/2014 | Theriault ............. H04N 21/812 |
| | | 725/25 |
| 2014/0366068 A1* | 12/2014 | Burkitt .................. G06F 16/735 |
| | | 725/61 |
| 2015/0113547 A1 | 4/2015 | Wolf |
| 2015/0128163 A1 | 5/2015 | Cormican |
| 2015/0143413 A1 | 5/2015 | Hall |
| 2015/0189347 A1 | 7/2015 | Oztaskent |
| 2015/0237389 A1 | 8/2015 | Grouf et al. |
| 2015/0264450 A1 | 9/2015 | Jung |
| 2015/0310498 A1 | 10/2015 | Brandstetter |
| 2015/0358661 A1 | 12/2015 | Navarro |
| 2016/0112740 A1 | 4/2016 | Francisco |
| 2017/0085962 A1 | 3/2017 | Maughan |
| 2018/0060759 A1 | 3/2018 | Chu |
| 2018/0276256 A1 | 9/2018 | Sarkar |
| 2019/0114662 A1 | 4/2019 | Bennion |
| 2019/0228439 A1 | 7/2019 | Anthony |

FOREIGN PATENT DOCUMENTS

| | | |
|---|---|---|
| KR | 10-2009-0004398 A | 1/2009 |
| KR | 10-2014-0024359 A | 2/2014 |
| KR | 10-2016-0021132 A | 2/2016 |
| WO | WO 00/40021 A1 | 7/2000 |
| WO | WO 2004/077808 A2 | 9/2004 |
| WO | WO 2005/048589 A2 | 5/2005 |
| WO | WO 2007/123613 A1 | 11/2007 |
| WO | WO 2008/007274 A2 | 1/2008 |
| WO | WO 2012/079054 | 6/2012 |
| WO | WO 2015/036618 A1 | 3/2015 |

OTHER PUBLICATIONS

Examination Report dated Apr. 16, 2019, received in Australian Patent Application No. 2015218353.
Examination Report dated Jul. 25, 2019, received in Australian Patent Application No. 2015218353.
Extended European Search Report dated Aug. 4, 2017, Application No. 15749508.6.
Host. Oxford Dictionaries. Oxford University Press, n.d. Web. Sep. 3, 2016. <http://www.oxforddictionaries.com/us/definition/american_english/host>., 7 pages.
International Search Report and Written Opinion, dated May 21, 2015, in International Application No. PCT/US2015/015902, 14 pp.
Li et al., "Video Multicast over the Internet", IEEE Network, vol. 13, Issue: 2, pp. 46-60, Mar./Apr. 1999.
PCT Search Report and Written Opinion dated Feb. 26, 2018 received in International Patent Application No. PCT/US2017/039960.
Extended European Search Report dated Feb. 12, 2020, received in EP Patent Application No. 17824725.0.
Office Action dated Jun. 29, 2020 received in European Patent Application No. 19 158 438.2, in 3 pages.

* cited by examiner

FIG. 2B

PLUTO.TV ☰ 603 Cats 24/7 ⟨ ⟩ All Channels | Feedback ⌧ | 🔊 | 👤 Hi, Lisa Sign out ALL
e chat
24/7

Music
- 101 Top 40
- 102 Party Playlists
- 103 Underground Pulse
- 104 Hip Hop
- 105 Old Skool
- 106 EDM
- 107 Indie Music
- 108 Live
- 109 Top Dance Hits
- 111 1970's Music
- 112 1980's Music
- 113 1990's Music
- 114 2000's Music
- 115 Classic Rock
- 116 Alt Rock
- 117 Metal Rock
- 119 Covers
- 120 Country
- 131 Christian
- 134 Latin Pop

News & Info

Sports
- 509 Sport X
- 510 Fight Night
- 511 SK8
- 515 Snow Sports
- 516 Surfing

Entertainment
- 601 Top Viral Clips
- 602 Web Sci-Fi
- 603 Cats 24/7
- 604 Dogs 24/7
- 605 Web Comedy
- 606 Web Drama
- 607 X Toons
- 608 Web Talk
- 609 Classic Toons
- 611 Adult Swim

Comedy
- 301 Stand Up
- 302 COMEDY QA
- 304 Best of Youtube: Comedy 2013
- 307 Classic Stand Up
- 308 Sketch Comedy
- 309 NSFW Comedy
- 311 Fail Videos
- 314 Pranked
- 315 Female Comedians
- 317 NextGen Comedy
- 318 Comedy Grab Bag

TV
- 667 Daytime Soaps

Film
- 713 Movie Trailers
- 715 Comedy Film

Kids
- 401 Plutots: Songtime
- 404 Pluto Kids: Science
- 406 Plutots: Learn & Pay
- 408 Pluto Kids: How Things Work
- 409 Kids Shows
- 412 School Kids: History

Tech
- 552 Gadget
- 555 Nerd Culture
- 557 Gamer Lifestyle
- 558 Action Adventure Gaming
- 561 FPS ZONE
- 562 Minecraft
- 563 Car Reviews

Lifestyle
- 751 Healthy Cooking
- 755 World Travel

| | | 2pm | 3pm | 4pm |
|---|---|---|---|---|
| | VIEW ALL CHANNELS | Splinter Cell... | H+: Part 1 | Video Game... | SYNC: Part1 | The Power In... | Star Talk with... | The cell: Part1 |
| ☆ | 602 Web sci-fi | Cats Gone Viral! Sa... | Cats Gone Viral! Friday | Awesome Dog Tricks-Sunday | Cats Gone viral Thursday |
| ★ | 603 Cats 24/7 ☐ | Awe Heroic Pups | | | Heroic Pups |
| ☆ | 604 Dogs 24/7 | The Onion S... | Leap Year: Pa... | The Onion SK... | Double Feature: Your Dad's Friends + Friend Pals | Dead Kevi | Amy Poehler's... |
| ☆ | 605 Web comedy | | | | |

Pluto Dashboard > Channels > Search channels...    [+New Channel]

[Channels] [Clips] [Episodes] [Fragmented Episodes]

| No. | Title | Actions |
|-----|-------|---------|
| 0 | Welcome | ✎ ✕Delete |
| 101 | Top 40 | ✎ ✕Delete |
| 102 | Top Dance Hits | ✎ ✕Delete |
| 103 | Top Web Tracks | ✎ ✕Delete |
| 104 | Top Country Hits | ✎ ✕Delete |
| 105 | Party | ✎ ✕Delete |
| 106 | Underground Pulse | ✎ ✕Delete |
| 107 | Covers | ✎ ✕Delete |
| 108 | EDM | ✎ ✕Delete |
| 109 | Hip Hop | ✎ ✕Delete |
| 110 | Old Skool | ✎ ✕Delete |
| 111 | Indie Music | ✎ ✕Delete |
| 112 | Alt Rock | ✎ ✕Delete |
| 113 | Latin Pop | ✎ ✕Delete |
| 115 | Christian | ✎ ✕Delete |

Next

FIG. 3B

Pluto Dashboard Channels Details Episodes Clips Episodes New Episode Broadcasts Guide Fragmented Episodes Programming Top 40:

Episodes  (Find episodes...)

On Air

| Name | Aired Date | 9:00:00 | Actions |
|---|---|---|---|
| Even More Hot Hit Videos - Week of 12/21 | Mon Dec 23 2013 12:00:00 GMT-0800 (PST) | 2:00:00 | |
| Hottest Hit Videos - Week of 12/21 | Mon Dec 23 2013 09:00:00 GMT-0800 (PST) | 2:00:00 | |
| Scorching Hot Videos - Week of 12/21 | Mon Dec 23 2013 14:00:00 GMT-0800 (PST) | 1:00:00 | |
| Top Christmas Music | Mon Dec 23 2013 11:00:00 GMT-0800 (PST) | 1:00:00 | |
| Top Music Countdown-Week of 12/21 | Mon Dec 23 2013 15:00:00 GMT-0800 (PST) | 3:00:00 | |

Archived

| Name | Aired Date | 40:35:12 | Actions |
|---|---|---|---|
| 25 Hottest Club Tracks - 10/5 | ... | 1:42:59 | |
| Breaking and Entering - 10/5 | ... | 1:35:38 | |
| Even More Hot Hit videos - 11/23 | Thu Nov 14 2013 11:00:00 GMT-0800 (PST) | 2:56:16 | |
| Even More Hot Hit Videos - Week of 11/30 | Sun Dec 08 2013 18:17:51 GMT-0800 (PST) | 2:00:00 | |
| Even More Hot Hit Videos - Week of 12/7 | Wed Dec 11 2013 08:59:51 GMT-0800 (PST) | 2:00:00 | |
| Hottest 20 Alternative songs - 10/5 | ... | 1:21:53 | |
| Hottest Hit Videos - 11/23 | Thu Nov 14 2013 09:00:00 GMT-0800 (PST) | 2:00:00 | |
| Hottest Hit Videos - Week of 11/30 | Sun Dec 08 2013 16:47:51 GMT-0800 (PST) | 1:30:00 | |

FIG. 3C1

Pluto Dashboard | Channels | Clips | Episodes | Fragmented Episodes

Inside Beauty: Details Episodes New Episode Broadcasts Guide Programming Episodes (Find episodes...)

In Progress

| Name | Aired Date | 6:59:04 | Actions |
|---|---|---|---|
| 10 Must See Special Effects Makeup Tutorials: Halloween Pop Art Edition | ... | 1:00:00 | |
| Beauty Oops And LOLs: "Boyfriend Does My Makeup" | ... | 1:00:00 | |
| Best Winter Hauls \| e3 | Mon Jan 20 2014 08:04:48 GMT-0800 (PST) | 1:00:00 | |
| Celebrity Style: The Real Housewives Edition | ... | 1:00:00 | |
| Get The Look: Kim Kardashian \| e3 | Sun Jan 19 2014 06:48:14 GMT-0800 (PST) | 1:00:00 | |
| Halloween Helpers | ... | 1:00:00 | |
| The Best DIY: Making Your Own Exfoliants \| e1,v1 | Mon Jan 13 2014 04:09:58 GMT-0800 (PST) | 59:40 | |

On Air

| Name | Aired Date | 12:00:16 | Actions |
|---|---|---|---|
| "How To": Spotlight On The Perfect Manicure \| e3 | Mon Jan 20 2014 11:04:48 GMT-0800 (PST) | 1:00:00 | |
| Best Winter Hauls \| e2 | Mon Jan 20 2014 08:04:48 GMT-0800 (PST) | 1:00:00 | |
| Deals & Steals - Top Finds In Stores Now \| e2 | Mon Jan 20 2014 13:04:48 GMT-0800 (PST) | 1:00:16 | |
| Fresh Off Shelves: New Beauty Reviews \| e3 | Mon Jan 20 2014 04:04:48 GMT-0800 (PST) | 1:00:00 | |
| Get The Look: Lana Del Rey \| e2 | Mon Jan 20 2014 07:04:48 GMT-0800 (PST) | 1:00:00 | |

| Name | Provider | Author | Link | On Air | Actions |
|---|---|---|---|---|---|
| PlutoTV 10 - Smoke | youtube | Pluto TV | https://www.youtube.com/watch?v=8E8QeuVebdM | 00:10 | |
| T-Pain feat. B.O.B - Up Down (Do This All Day) (Explicit) | youtube | TPainVEVO | https://www.youtube.com/watch?v=45Q4ZK3CN8k | 4:28 | |
| Janson Derulo "Marry Me" (Offical HD Music Video) | youtube | Jason Derulo | https://www.youtube.com/watch?v=zRCsZ5a3aCM | 3:46 | |
| Katy Perry - Unconditionally (Official) | youtube | KatyPerryVEVO | https://www.youtube.com/watch?v=XjwZAa2E;KA | 3:57 | |
| Lorde - Royals (US Version) | youtube | LordeVEVO | https://www.youtube.com/watch?v=niciKh6sBtc | 3:21 | |
| Ylvis - The Fox (What Does the Fox Say?) [Official Music Video HD] | youtube | tvnorge | https://www.youtube.com/watch?v=iofNR_WkoCE | 3:45 | |
| The Neighbourhood - Sweater Weather | youtube | TheNeighbourhoodVEVO | https://www.youtube.com/watch?v=GCdwKhTtNNw | 4:13 | |
| Zendaya - Replay | youtube | ZendayaVEVO | https://www.youtube.com/watch?v=cyLE4814XY0 | 4:01 | |
| PlutoTV: Watch What's Possible | youtube | PlutoTV | https://www.youtube.com/watch?v=OMN-GMvNCKc | 00:15 | |
| John Newman - Love Me Again | youtube | JhonNewmanVEVO | https://www.youtube.com/watch?v=CfihYWRWRTQ | 3:56 | |
| Future - Honest | youtube | FutureVEVO | https://www.youtube.com/watch?v=FAeAp9MzPtk | 3:37 | |
| Cassadee Pope - Wasting All These Tears | youtube | CassadeeVEVO | https://www.youtube.com/watch?v=EJZOeTnvq4k | 3:41 | |
| Hunter Hayes featuring Jason Marz - "Everybody's Got Somebody But Me" [Official Video] | youtube | hunterhayes | https://www.youtube.com/watch?v=yVdnvQsKyUs | 3:01 | |
| Sage The Gemini - Red Nose | youtube | SageTheGeminiVEVO | https://www.youtube.com/watch?v=-l-YY5p0uq8 | 3:48 | |
| Rich Homie Quan - Type of Way | youtube | RichHomieQuanVEVO | https://www.youtube.com/watch?v=-KKbdErJKiY | 4:34 | |

FIG. 3E

PLUTO.TV     My Account   Tasks ⑫   Notifications ②   Logout   ( SEARCH )

Sources
Clips
Playlists
Programs

Analytics
Scheduler

WATCH LIVE TV

CLIPS
STEP 3 : CLIP ASSIGNMENT
Assign the clips to an associated category, channel or playlist.

Assign to: Category    Channel    Playlist    ( ASSIGN )

| Clip Title △ | | Views △ | Duration △ | Date △ | |
|---|---|---|---|---|---|
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 | ☐ |
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 | ☐ |
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 | ☐ |

( FINISH )

FIG. 4B

PLUTO.TV     My Account   Tasks ②   Notifications ②   Logout [SEARCH]

Sources
Clips
Playlists
Programs

Analytics
Scheduler

CLIPS

STEP 2 : REMOVE BAD URLS

Below are URLs that were rejected because they are not able to be embedded on Pluto TV.

| Clip Title △ | Views △ | Duration △ | Date △ |
|---|---|---|---|
| [Thumb] Clip Title - Could Be Very Long So Watc... This is where the description goes! Lots of intersting information... more than meets the eye! It goes all the way up to perhaps 255 characters. | 1,043,250 | 4:56 | 12/1/1012 |
| [Thumb] Clip Title - Could Be Very Long So Watc... This is where the description goes! Lots of intersting information... more than meets the eye! It goes all the way up to perhaps 255 characters. | 1,043,250 | 4:56 | 12/1/1012 |

[REMOVE AND CONTINUE]

WATCH LIVE TV

FIG. 4C

PLUTO.TV  My Account  Tasks (12)  Notifications (2)  Logout  SEARCH

Sources
Clips
Playlists
Programs

Analytics
Scheduler

WATCH LIVE TV

NOTIFICATIONS

| Channel Name | Show Name | Ep. # | Status | Date |
|---|---|---|---|---|
| Ammo | Big Time Explosions | 2 | Broken Link | 12/09/2013 |
| TOP 40 | This Week's Hits | | Broken Link | 12/06/2013 |

Mousing over the row in the table will show that you can click and it will take you to the playlist where you need to fix the broken link.

The "Date" is the date that the link was reported broken.

As of right now, I can't think of any other notifications to tell curators.

FIG. 4E

PROGRAM INFO

Title:
Program Description:
Category Select:
Genres:
Supplier:

{{ Pluto TV, Funny or Die, Hearst, and so on for Partners we are working with to make programs. }}

[SAVE AND EXIT]   [GO TO SERIES]

SERIES INFO

Series & Episode Listening: (Click to edit)
Series Title  Eps Title  Duration  Season + Ep #  Last Air Date  Premiere Date

Play Log:
Series Title  Eps Title  Season + Ep #  Last Air Date  Channel Name ADD New Series Screen ↑

METHODS AND SYSTEMS FOR GENERATING AND PROVIDING PROGRAM GUIDES AND CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention is related to the identification, generation, organization, and distribution of content.

Description of the Related Art

Video sharing sites have become ever more popular. Users upload videos to a video sharing website. Other users can then navigate to and within the website to locate videos of interest. Users then watch the videos independent of other users, that is, users do not watch the videos on a schedule, but rather at whatever random time a given user accesses the video. Thus, using conventional techniques, it is difficult for users to locate videos of interest. Further, video viewing is an isolating experience, where users are viewing videos at different times, and often, because of the difficulty in locating content, friends infrequently view the same videos.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure is a method of synchronizing content with a program guide, and a system configured to perform the method or at least a portion thereof. The method comprises some or all of the following acts: identifying, by a first system, a first program previously scheduled to be shown to users at a first time period, the first program comprising at least a first video hosted on a third party system, the third party system under separate control from the first system, wherein the first video has a length; determining by the first system, prior to the first time period, whether the first video is still accessible from the third party system; at least partly in response to determining that the first video no longer accessible from the third party system: identifying, by the first system, at least one replacement video based at least in part on the first video length; causing, at least in part, the at least one replacement video to be streamed to user terminals over a data network within the first time period.

An aspect of the disclosure is a method. The method comprises some or all of the following acts: identifying, by a first system, a first program previously scheduled to be shown to users at a first time period, the first program comprising at least a first content item hosted on a third party system, the third party system under separate control from the first system, wherein the first content item has a length; determining by the first system, prior to the first time period, whether the first content item is still accessible from the third party system; at least partly in response to determining that the first content item no longer accessible from the third party system: identifying, by the first system, at least one replacement content item based at least in part on the first content item length; causing, at least in part, the at least one replacement content item to be streamed to user terminals over a data network within the first time period.

An aspect of the disclosure is a method of generating content, and a system configured to perform the method or at least a portion thereof. The method comprises some or all of the following acts: identifying, by a first system, a first video to be included in a first program scheduled to be shown to users at a first time period, the first video hosted on a third party system, the third party system under separate control from the first system, wherein the first video has a first time length; allocating a first span of time with the first program for the first video to be provided to users, wherein the first span of time is longer than the first time length; determining, by the first system, prior to or at the first time period, a time difference between a current length of the first video and the first span of time; at least partly in response to determining that the first video has a time length shorter than the first span of time, causing, at least in part, supplemental content selected based at least in part of the determined time difference to be streamed to user terminals over a data network within the first time period.

An aspect of the disclosure is a method of generating content, and a system configured to perform the method or at least a portion thereof. The method comprises some or all of the following acts: identifying, by a first system, a first content item to be included in a first program scheduled to be shown to users at a first time period, the first content item hosted on a third party system, the third party system under separate control from the first system, wherein the first content item has a first time length; allocating a first span of time with the first program for the first content item to be provided to users, wherein the first span of time is longer than the first time length; determining, by the first system, prior to or at the first time period, a time difference between a current length of the first content item and the first span of time; at least partly in response to determining that the first content item has a time length shorter than the first span of time, causing, at least in part, supplemental content selected based at least in part of the determined time difference to be streamed to user terminals over a data network within the first time period.

An aspect of the disclosure is a method that comprises some or all of the following acts: identifying, by a first system comprising computer hardware configured with specific executable instructions and a network interface configured to communicate with user terminals and content hosting systems, a first program, included in an electronic program guide as being scheduled to be shown to users at a first time period, wherein the first program comprises at least a first video having a time length, the first video hosted on a third party system that provides streaming video content, the third party system under separate control from the first system; prior to the first time period, determining whether a content availability check is to be performed; at least partly in response to determining that a content availability check is to be performed, determining by the first system whether the first video is still accessible; at least partly in response to determining that the first video no longer accessible: identifying, by the first system, at least one replacement video based at least in part on the first video time length, on data indicating the first program subject matter, and on metadata accessed from a source of replacement content; causing, at least in part, the at least one replacement video to be streamed to user terminals over a data network within the first time period; at least partly in response to determining that the first video is still accessible, causing, at least in part, the first video to be streamed to one or more user terminals over a data network within the first time period as part of the first program included in the electronic program guide.

An aspect of the disclosure is a computer-implemented method of synchronizing content with a program guide, the method comprising some or all of the following acts: identifying, by a first system comprising computer hardware configured with specific executable instructions and a network interface configured to communicate with user terminals and content hosting systems, a first program, listed in an electronic program guide provided to user terminals as being scheduled to be shown to users at a first time period, wherein the first program comprises at least a first video having a time length, the first video hosted on a third party system that provides streaming video content, the third party system under separate control from the first system; prior to the first time period, determining whether a content availability check is to be performed; at least partly in response to determining that a content availability check is to be performed, transmitting, prior to the first time period, a query over the network to the third party system via an application programming interface (API), and determining by the first system whether the first video is still accessible from the third party system, based at least in part on a result of the query; at least partly in response to determining that the first video no longer accessible from the third party system: identifying, by the first system, at least one replacement video based at least in part on the first video time length, on data indicating the first program subject matter, and on metadata accessed from a source of replacement content; causing, at least in part, the at least one replacement video to be streamed to user terminals over a data network within the first time period; at least partly in response to determining that the first video is still accessible from the third party system, causing, at least in part, the first video to be streamed from the third party system to user terminals over a data network within the first time period as part of the first program listed in the electronic program guide.

An aspect of the disclosure is a computer-implemented method, the method comprising some or all of the following acts: identifying, by a first system comprising computer hardware configured with specific executable instructions and a network interface configured to communicate with user terminals and content hosting systems, a first program, listed in an electronic program guide provided to user terminals as being scheduled to be shown to users at a first time period, wherein the first program comprises at least a first content having a time length, the first content hosted on a third party system that provides streaming content, the third party system under separate control from the first system; prior to the first time period, determining whether a content availability check is to be performed; at least partly in response to determining that a content availability check is to be performed, transmitting, prior to the first time period, a query over the network to the third party system via an application programming interface (API), and determining by the first system whether the first content is still accessible from the third party system, based at least in part on a result of the query; at least partly in response to determining that the first content no longer accessible from the third party system: identifying, by the first system, at least one replacement content based at least in part on the first content time length, on data indicating the first program subject matter, and on metadata accessed from a source of replacement content; causing, at least in part, the at least one replacement content to be streamed to user terminals over a data network within the first time period; at least partly in response to determining that the first content is still accessible from the third party system, causing, at least in part, the first content to be streamed from the third party system to user terminals over a data network within the first time period as part of the first program listed in the electronic program guide.

An aspect of the disclosure is a method that comprises some or all of the following acts: generating, by a first system comprising computer hardware configured with specific executable instructions, an electronic program guide including channels and channel programs; identifying, by the first system, a first video to be included in a first program scheduled to be shown to users at a first time period, wherein the first video has a first time length, wherein the electronic program guide includes an entry for the first program; allocating a first span of time within the first program for the first video to be provided to users, wherein the first span of time is longer than the first time length; determining, by the first system, a current length of the first video; determining, by the first system, prior to or at the first time period, a time difference between a current length of the first video and the first span of time; at least partly in response to determining by the first system that the first video has a time length shorter than the first span of time: selecting, by the first system, supplemental content based at least in part of the determined time difference; and causing, at least in part, supplemental content selected based at least in part of the determined time difference to be streamed to user terminals over a data network within the first time period so that timing of the playing of the first program corresponds to scheduling of the first program in the electronic program guide.

An aspect of the disclosure is a system, comprising some or all of the following: a network interface configured to communicate over a network; a computing system comprising one or more computing devices; and a computer storage system comprising a non-transitory storage device, said computer storage system having stored thereon executable program instructions that direct the computer system to at least perform some or all of the following: identify a first program, listed in an electronic program guide provided to user terminals as being scheduled to be shown to users at a first time period, wherein the first program comprises at least a first content item having a time length, the first content item hosted on a third party system that provides streaming content item content, the third party system under separate control from the system; prior to the first time period, determine whether a content availability check is to be performed; at least partly in response to a determination that a content availability check is to be performed, transmit, prior to the first time period, a communication via the network interface over the network to the third party system, and determine whether the first content item is still accessible from the third party system, based at least in part on a result of the communication; at least partly in response to a determination that the first content item no longer accessible from the third party system: identify at least one replacement content item based at least in part on the first content item time length, on data indicating the first program subject matter, and on metadata accessed from a source of replacement content; causing, at least in part, the at least one replacement content item to be accessed by user terminals over a data network within the first time period; at least partly in response to a determination that the first content item is still accessible from the third party system, cause, at least in part, the first content item to be accessed by user terminals from the third party system over a data network within the first time period as part of the first program listed in the electronic program guide.

An aspect of the disclosure is a computer storage system comprising a non-transitory storage device, said computer storage system having stored thereon executable program instructions that direct a computer system to at least perform some or all of the following: identify a first program, listed in an electronic program guide provided to user terminals as being scheduled to be shown to users at a first time period, wherein the first program comprises at least a first content item having a time length, the first content item hosted on a third party system that provides streaming content item content; prior to the first time period, determine whether a content availability check is to be performed; at least partly in response to a determination that a content availability check is to be performed, transmit, prior to the first time period, a communication via the network interface over the network to the third party system, and determine whether the first content item is still accessible from the third party system, based at least in part on a result of the communication; at least partly in response to a determination that the first content item no longer accessible from the third party system: identify at least one replacement content item based at least in part on the first content item time length, on data indicating the first program subject matter, and on metadata accessed from a source of replacement content; causing, at least in part, the at least one replacement content item to be accessed by user terminals over a data network within the first time period; at least partly in response to a determination that the first content item is still accessible from the third party system, cause, at least in part, the first content item to be accessed by user terminals from the third party system over a data network within the first time period as part of the first program listed in the electronic program guide.

An aspect of the disclosure is a computer-implemented method of synchronizing content with a program guide, the method comprising some or all of the following acts: generating, by a first system comprising computer hardware configured with specific executable instructions, an electronic program guide listing channels and channel programs; identifying, by the first system, a first video to be included in a first program scheduled to be shown to users at a first time period, the first video hosted on a third party system, the third party system under separate control from the first system, wherein the first video has a first time length, wherein the electronic program guide comprises a listing of the first program; allocating a first span of time within the first program for the first video to be provided to users, wherein the first span of time is longer than the first time length; determining, by the first system, a current length of the first video, based at least in part on length information accessed via an application programmer interface (API) associated with the third party system; calculating, by the first system, prior to or at the first time period, a time difference between a current length of the first video and the first span of time; at least partly in response to determining by the first system that the first video has a time length shorter than the first span of time: selecting, by the first system, supplemental content based at least in part of the determined time difference; and causing, at least in part, supplemental content selected based at least in part of the determined time difference to be streamed to user terminals over a data network within the first time period so that timing of the playing of the first program corresponds to scheduling of the first program in the electronic program guide.

An aspect of the disclosure is a computer-implemented method of synchronizing content with a program guide, the method comprising some or all of the following acts: optionally generating, by a first system comprising computer hardware configured with specific executable instructions, an electronic program guide listing channels and channel programs; identifying, by the first system, a first content item to be included in a first program scheduled to be shown to users at a first time period, the first content item hosted on a remote system, wherein the first content item has a first time length, wherein the electronic program guide comprises a listing of the first program; allocating a first span of time within the first program for the first content item to be provided to users, wherein the first span of time is longer than the first time length; determining, by the first system, a current length of the first content item, based at least in part on length information accessed via an application programmer interface (API) associated with the third party system; determining, by the first system, a time difference between a current length of the first content item and the first span of time; at least partly in response to determining by the first system that the first content item has a time length shorter than the first span of time: selecting, by the first system, supplemental content based at least in part of the determined time difference; and causing, at least in part, supplemental content selected based at least in part of the determined time difference to be streamed to user terminals over a data network within the first time period so that timing of the playing of the first program corresponds to scheduling of the first program in the electronic program guide.

An aspect of the disclosure is a system, comprising some or all of the following: a network interface configured to communicate over a network; a computing system comprising one or more computing devices; and a computer storage system comprising a non-transitory storage device, said computer storage system having stored thereon executable program instructions that direct the computer system to at least perform some or all of the following: identify a first video to be included in a first program scheduled to be shown to users at a first time period, the first video hosted on a third party system, the third party system under separate control from the system, wherein the first video has a first time length; allocate a first span of time within the first program for the first video to be provided to users, wherein the first span of time is longer than the first time length; determine a current length of the first video, based at least in part on length information accessed via an application programmer interface (API) associated with the third party system; calculate, prior to or at the first time period, a time difference between a current length of the first video and the first span of time; at least partly in response to a determination that the first video has a time length shorter than the first span of time: select supplemental content based at least in part of the determined time difference; and cause, at least in part, supplemental content selected based at least in part of the determined time difference to be streamed to user terminals over a data network within the first time period.

An aspect of the disclosure is a computer storage system comprising a non-transitory storage device, said computer storage system having stored thereon executable program instructions that direct a computer system to at least perform some or all of the following: identify a first video to be included in a first program scheduled to be shown to users at a first time period, the first video hosted on a third party system, the third party system under separate control from the system, wherein the first video has a first time length; allocate a first span of time within the first program for the first video to be provided to users, wherein the first span of time is longer than the first time length; determine a current length of the first video, based at least in part on length information, optionally accessed via an application programmer interface (API) associated with the third party system; calculate or otherwise determine, prior to or at the first time period, a time difference between a current length of the first video and the first span of time; at least partly in response to a determination that the first video has a time length shorter than the first span of time: select supplemental content based at least in part of the determined time difference; and cause, at least in part, supplemental content selected based at least in part of the determined time difference to be streamed to user terminals over a data network within the first time period.

An aspect of the disclosure is a computer-implemented method, the method comprising some or all of the following acts: generating, by a first system comprising computer hardware configured with specific executable instructions, an electronic program guide including at least a first program scheduled to begin at a first time and end at a second time, a second program following the first program, the second program scheduled to begin at a third time and end at a fourth time; identifying, by the first system, a first video item to be included in a first program scheduled to be shown to users at a first time period, wherein the first video item has a first time length, wherein the electronic program guide includes an entry for the first program; allocating a first span of time within the first program for the first video item to be provided to users; determining, by the first system, a current length of the first video item; determining, by the first system a time difference between a current length of the first video item and the first span of time; at least partly in response to determining by the first system that the first video item has a time length longer than the first span of time: causing, at least in part, the second program to begin at a delayed time on a first user terminal, wherein the first user terminal had been playing the first program, the delayed time based at least in part on the time difference between the current length of the first video item and the first span of time; causing, at least in part, the second program to begin at a non-delayed time on a second user terminal, wherein the second user terminal had not been playing the first program.

An aspect of the disclosure is a computer-implemented method of playing streaming video content, the method comprising some or all of the following acts: detecting, by a first system comprising computer hardware configured with specific executable instructions, that a first program is scheduled to be accessed by a user terminal, wherein the first program is comprised of at least: a first video item configured to be streamed from a first source and to be viewed using a first video player, and a second item configured to be streamed from a second source and to be viewed using a second video player; accessing, by the first system, metadata for the first video item, the metadata comprising an identification of the first video item and the first video player; based at least in part on the metadata for the first video, determining, by the first system, that the first video player is to be used to play the first video item; instructing a unified content player executing on a user terminal to access the first video item from the first source and to utilize the first video player to play the first video item, wherein the first video item is streamed from the first source, wherein the unified content player comprises a user interface (e.g., including at least a rewind control positioned at a first location and having a first appearance, and a pause control positioned at a second location and having a second appearance); accessing, by the first system, metadata for the second video item, the metadata comprising an identification of the second video item and the second video player; based at least in part on the metadata for the second video, determining, by the first system, that the second video player is to be used to play the second video item; determining timing for playing of the second video item; based at least in part on the determined timing for playing of the second video item, instructing the unified content player executing on the user terminal to access the second video item from the second source and to utilize the second video player to play the second video item, wherein the second video item is streamed from the second source, and wherein an appearance of the unified player user interface does not change relative to the appearance of the unified player user interface when the first video player is utilized. Optionally, the metadata for the first video item comprises an identifier identifying the first source, and a unique identifier corresponding to the first content item. Optionally, the first video player comprises program code accessed, by a browser hosted on the user terminal, at least in part from the first source. Optionally, the first video player comprises program code accessed, by a browser hosted on the user terminal, at least in part from the first system. Optionally, the first video player comprises program code accessed, by a browser hosted on the user terminal, at least in part from the first system and from the first source. Optionally, the first video player and the second video player are presented via a browser or a dedicated application hosted on the user terminal. Optionally, a timer is used to determine timing for playing of the second video item. Optionally, the act of determining timing for playing of the second video item is based at least in part on detection of an indication from the first video player that the playing of the first video item is or is about to be completed. Optionally, the unified content player comprises a stage module configured to ensure an appropriate video player is being used for respective items of content of video content. Optionally, the method further comprises utilizing a plurality of native bridge application programming interfaces for a respective plurality of different native environments. Optionally, the unified content player is configured to provide a common wrapper for a plurality of different video players. Optionally, the first system comprises the user terminal and/or a system remote from the user terminal.

An aspect of the disclosure is a system, comprising some or all of the following: a computing system comprising one or more computing devices; and a computer storage system comprising a non-transitory storage device, said computer storage system having stored thereon executable program instructions that direct the computer system to at least perform some or all of the following: detect that a first program is scheduled to be accessed by a user terminal, wherein the first program is comprised of at least: a first video item configured to be streamed from a first source and to be viewed using a first video player, and a second item configured to be streamed from a second source and to be viewed using a second video player; access metadata for the first video item, the metadata comprising an identification of the first video item and the first video player; based at least in part on the metadata for the first video, determine that the first video player is to be used to play the first video item; instruct a unified content player executing on a user terminal to access the first video item from the first source and to utilize the first video player to play the first video item, wherein the first video item is streamed from the first source, wherein the unified content player comprises a user interface including at least a rewind control positioned at a first location and having a first appearance, and a pause control positioned at a second location and having a second appearance; access metadata for the second video item, the metadata comprising an identification of the second video item and the second video player; based at least in part on the metadata for the second video, determine that the second video player is to be used to play the second video item; determine timing for playing of the second video item; based at least in part on the determined timing for playing of the second video item, instruct the unified content player executing on the user terminal to access the second video item from the second source and to utilize the second video player to play the second video item, wherein the second video item is streamed from the second source, and wherein an appearance of the unified player user interface does not change relative to the appearance of the unified player user interface when the first video player is utilized.

An aspect of the disclosure is a computer storage system comprising a non-transitory storage device, said computer storage system having stored thereon executable program instructions that direct a computer system to at least perform some or all of the following: detect that a first program is scheduled to be accessed by a user terminal, wherein the first program is comprised of at least: a first video item configured to be streamed from a first source and to be viewed using a first video player, and a second item configured to be streamed from a second source and to be viewed using a second video player; access metadata for the first video item, the metadata comprising an identification of the first video item and the first video player; based at least in part on the metadata for the first video, determine that the first video player is to be used to play the first video item; instruct a unified content player executing on a user terminal to access the first video item from the first source and to utilize the first video player to play the first video item, wherein the first video item is streamed from the first source, wherein the unified content player comprises a user interface including at least a rewind control positioned at a first location and having a first appearance, and a pause control positioned at a second location and having a second appearance; access metadata for the second video item, the metadata comprising an identification of the second video item and the second video player; based at least in part on the metadata for the second video, determine that the second video player is to be used to play the second video item; determine timing for playing of the second video item; based at least in part on the determined timing for playing of the second video item, instruct the unified content player executing on the user terminal to access the second video item from the second source and to utilize the second video player to play the second video item, wherein the second video item is streamed from the second source, and wherein an appearance of the unified player user interface does not change relative to the appearance of the unified player user interface when the first video player is utilized.

An aspect of the disclosure is a computer-implemented method and a system for performing the method, the method comprising some or all of the following acts: generating, by a first system comprising computer hardware configured with specific executable instructions, an electronic program guide listing channels and channel programs, including at least a first program scheduled to begin at a first time and end at a second time, a second program following the first program, the second program scheduled to begin at a third time and end at a fourth time; identifying, by the first system, a first video item to be included in a first program scheduled to be shown to users at a first time period, the first video item hosted on a third party system, the third party system under separate control from the first system, wherein the first video item has a first time length, wherein the electronic program guide comprises a listing of the first program; allocating a first span of time within the first program for the first video item to be provided to users; determining, by the first system, a current length of the first video item, based at least in part on length information accessed via an application programmer interface (API) associated with the third party system; calculating or otherwise determining, by the first system a time difference between a current length of the first video item and the first span of time; at least partly in response to determining by the first system that the first video item has a time length longer than the first span of time: causing, at least in part, the second program to begin at a delayed time on a first user terminal, wherein the first user terminal had been playing the first program, the delayed time based at least in part on the calculated time difference between the current length of the first video item and the first span of time; causing, at least in part, the second program to begin at a non-delayed time on a second user terminal, wherein the second user terminal had not been playing the first program. Optionally, when the first video item is identified by the first system, the first video item comprises primary content and a first advertisement, the first advertisement having a first advertisement length, and when determining the time difference between a current length of the first video item and the first span of time, the first video item comprises the primary content and a second advertisement and not the first advertisement, the second advertisement having a different time length then the first advertisement length. Optionally, when the first video item is identified by the first system, the first video item comprises primary content, and when determining the time difference between a current length of the first video item and the first span of time, the first video item comprises the primary content and a video advertisement, wherein the video advertisement is streamed from an advertisement server. Optionally, when a first instantiation of the electronic program guide is displayed by the first user terminal and a second instantiation of the electronic program guide is displayed by the second user terminal, the method further comprises causing, at least in part, the instantiation of the electronically program guide displayed on the first user terminal to be dynamically adjusted to reflect the delayed time, without performing a corresponding dynamic adjustment of the instantiation of the electronic program guide displayed on the second user terminal.

An aspect of the disclosure is a computer-implemented method and a system for performing the method, the method comprising some or all of the following acts: generating, by a first system comprising computer hardware configured with specific executable instructions, an electronic program guide listing channels and channel programs, including at least a first program scheduled to begin at a first time and end at a second time, a second program following the first program, the second program scheduled to begin at a third time and end at a fourth time; identifying, by the first system, a first video item to be included in a first program scheduled to be shown to users at a first time period, wherein the first video item has a first time length, wherein the electronic program guide comprises a listing of the first program; allocating a first span of time within the first program for the first video item to be provided to users; determining, by the first system, a current length of the first video item, based at least in part on data accessed from a first user terminal playing the first program; at least partly in response to determining by the first system that the first video item, as played by the first user terminal, has a time length longer than the first span of time: causing, at least in part, the second program to begin at a delayed time on a first user terminal, wherein the first user terminal had been playing the first program; causing, at least in part, the second program to begin at a non-delayed time on a second user terminal, wherein the second user terminal had not been playing the first program with an extended play time. The current length of the first video time may be extended when played by the first user terminal as a result of buffering delays. Optionally, when a first instantiation of the electronic program guide is displayed by the first user terminal and a second instantiation of the electronic program guide is displayed by the second user terminal, the method further comprises causing, at least in part, the instantiation of the electronically program guide displayed on the first user terminal to be dynamically adjusted to reflect the delayed time, without performing a corresponding dynamic adjustment of the instantiation of the electronic program guide displayed on the second user terminal.

An aspect of the disclosure is a computer-implemented method and a system for performing the method, the method comprising some or all of the following acts: maintaining a data store of channel access randomizer rules, and/or maintaining a data store of user information, the user information comprising explicitly provided user preferences and/or user data from which one or more user preferences are inferred; generating a program guide of a plurality of channels of content; detecting a user activation of a channel randomizer control; generating a channel scan ordering based at least in part on: the program guide; the channel access randomizer rules; the explicitly provider user preferences; and/or the inferred user preferences; scanning through at least a portion of the plurality of channels based at least in part on the generated scan channel ordering, and displaying content of a scanned-to channel for at least a period of time before proceeding to a next scanned-to channel. Optionally, the user data from which one or more preferences are inferred comprises user viewing history and/or user navigation. Optionally, the method further comprises determining which channels are to be scanned and/or which channels are not to be scanned based at least in part on the user data.

An aspect of the disclosure is a computer-implemented method and a system for performing the method, the method comprising some or all of the following acts: maintaining a data store of channel access randomizer rules; maintaining a data store of user information, the user information comprising explicitly provided user preferences and user data from which one or more user preferences are inferred; generating a program guide of a plurality of channels of content; detecting a user activation of a channel randomizer control; generating a channel scan ordering based at least in part on: the program guide; the channel access randomizer rules; the explicitly provider user preferences; and the inferred user preferences; scanning through at least a portion of the plurality of channels based at least in part on the generated scan channel ordering, and displaying content of a scanned-to channel for at least a period of time before proceeding to a next scanned-to channel.

An aspect of the disclosure is a computer-implemented method, the method comprising some or all of the following acts: accessing a channel schedule, the channel schedule including a plurality of programs, including at least a first program and a second program, scheduled at respective times; before or during the first program, accessing metadata for the second program, the second program scheduled for a later time than the first program; based at least in part of the metadata for the second program, dynamically generating interstitial content, the interstitial content providing information on the second program; causing the interstitial content to be presented to the user via a user terminal during or after the first program, and prior to the second program.

An aspect of the disclosure is a computer-implemented method, the method comprising some or all of the following acts: accessing a program schedule for a first program, the first program comprised of a plurality of content items; before or during a first content item in the plurality of content items, accessing metadata for a subsequent content item in the plurality of content items; based at least in part of the metadata for the subsequent content item, dynamically generating interstitial content, the interstitial content providing information on the subsequent content item; causing the interstitial content to be presented to the user via a user terminal during or after the first content item, and prior to the subsequent content item.

While reference may be made to a program guide, the program guide need not be displayed to a user for the user to view or listen to programs or channels. For example, the user may access a program or channel via voice command, a gesture, remote control, or otherwise.

BRIEF DESCRIPTION OF THE DRAWINGS

FIGS. 2A-2L illustrate example program guide user interfaces.

FIGS. 3A-3E illustrate example backend guide user interfaces.

FIGS. 4A-4G illustrate example backend guide user interfaces.

FIG. 5A illustrates an example program generation user interface.

FIG. 5B illustrates an example program guide user interface including a user-generated program.

DETAILED DESCRIPTION

Certain embodiments described herein overcome some or all of the noted deficiencies of conventional video sharing sites. Certain embodiments logically assemble user and/or professional content (e.g., streamed content) from one or more sites into channels, and provide a content site where specific videos are provided for display to viewers at specific times, according to a program schedule. Optionally, the content for a given channel, or a program within a channel, is streamed from multiple third party content sites to the user terminals, without passing through the content site system that organizes the third party content into channels and programs.

Figure 1A:
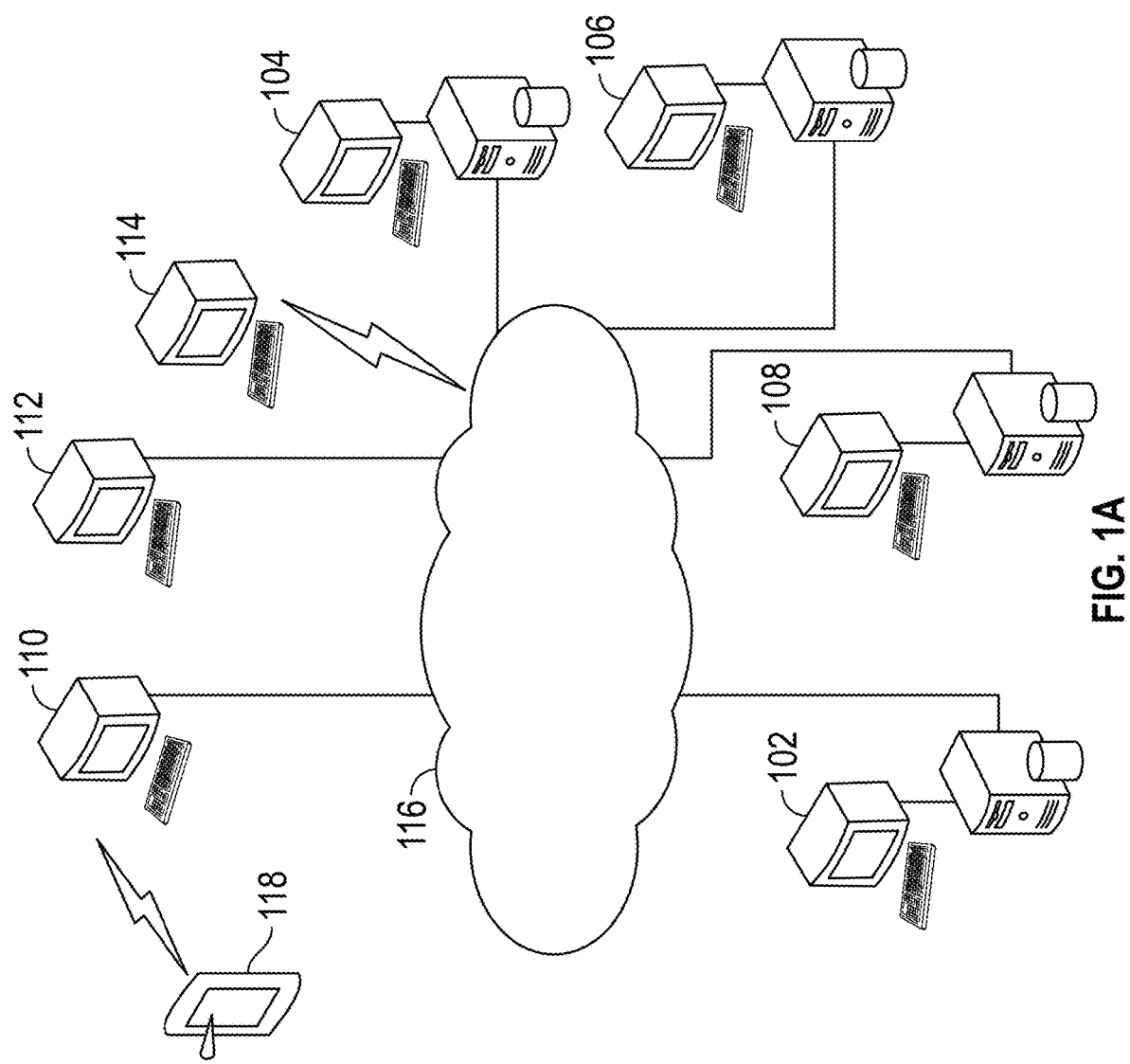
FIG. 1A-1C illustrates an example system environment and certain components thereof.
Figure 1B:
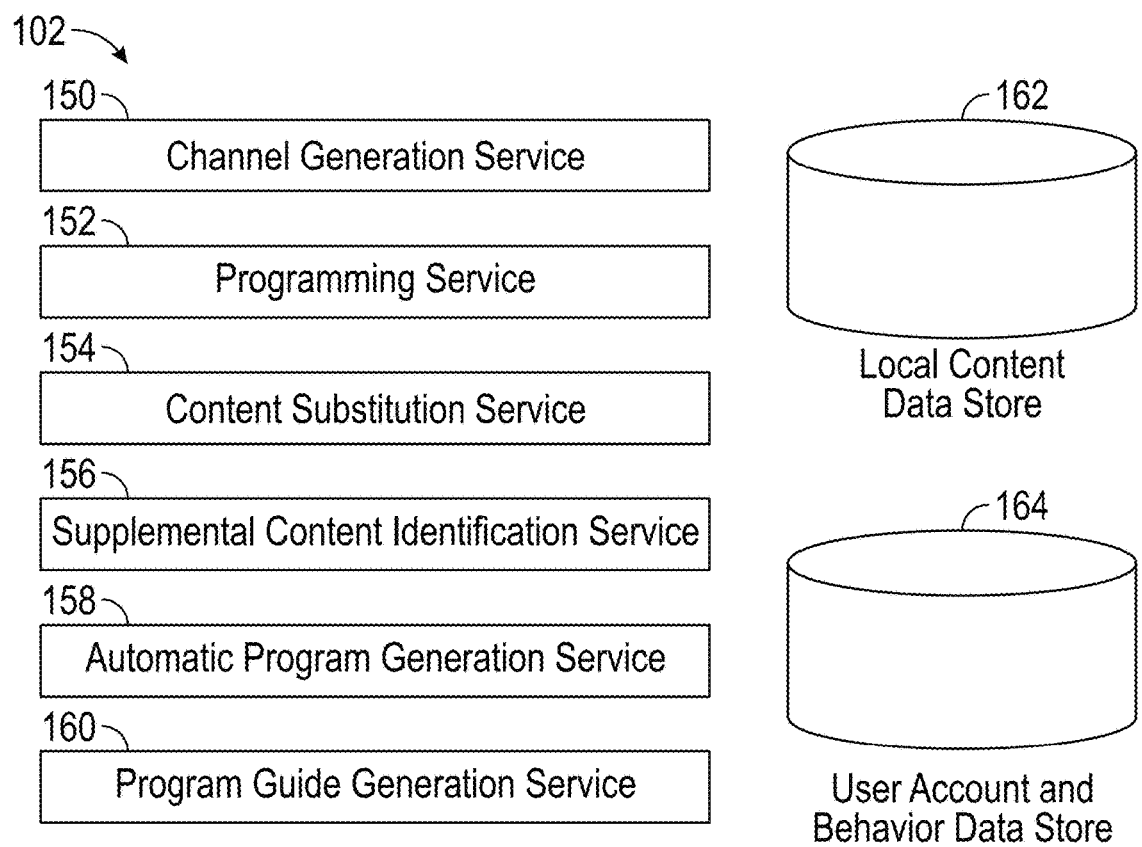
Figure 1C:
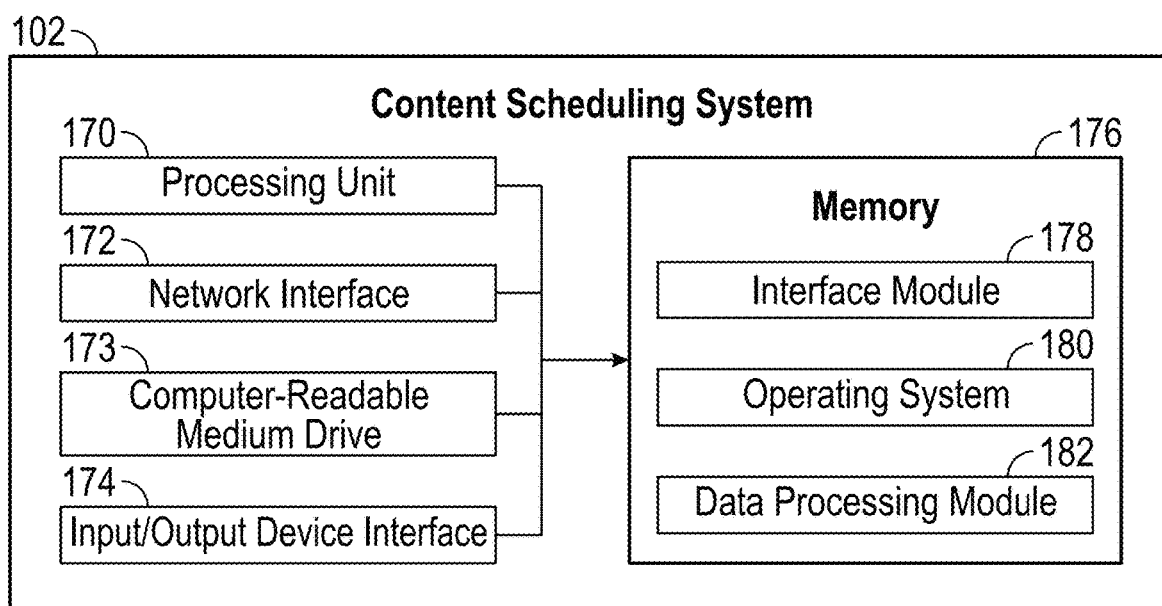

FIG. 1A illustrates an example content scheduling system 102 in an example environment. FIGS. 1B-1C illustrate example components of the content scheduling system 102.

The content scheduling system 102 may host a program guide (described in greater detail herein), program scheduling information, channel definitions, channel categories, user account information, video player schema information for video players or other content players from different websites, etc. The content scheduling system 102 may include one or more of the following service modules, discussed in greater detail herein: a channel generation module 150, a programming module 152, a content substitution module 154, a supplemental content identification module 156, an automatic program generation module 158, a program guide generation module 160 and/or other modules. It is understood that the functions of the modules may be performed by fewer or more modules.

The example content scheduling system 102 includes a processing unit 170, a network interface 172, a non-transitory computer-readable medium drive 173, and an input/output device interface 174, all of which may communicate with one another by way of a communication bus. The network interface 172 may provide the content scheduling system 102 with connectivity to one or more networks (e.g., network 116) or computing systems. The processing unit 170 may thus receive information and instructions from other computing devices, systems, or services, such a user terminals and third party content hosting services, via a network. The processing unit 170 may also communicate to and from memory 176 and further provide output information via the input/output device interface 174. The input/output device interface 174 may also accept input from various input devices, such as a keyboard, mouse, digital pen, touch screen, etc.

The memory 176 may contain computer program instructions that the processing unit 170 may execute in order to implement one or more embodiments of the present disclosure. The memory 176 generally includes RAM, ROM and/or other persistent or non-transitory computer-readable storage media. The memory 176 may store an operating system 180 that provides computer program instructions for use by the processing unit 170 in the general administration and operation of the content scheduling system 102. The memory 176 may further include other information for implementing aspects of the present disclosure.

Optionally, the memory 176 includes an interface module 178. The interface module 178 can be configured to facilitate generating one or more interfaces through which a third party user, utilizing a compatible computing device, may send to, or receive from, the content scheduling system 102 content, content metadata, preferences, content recommendations, instruction data, or otherwise communicate with the content scheduling system 102. Specifically, the interface module 174 may be configured to facilitate processing functions described herein, including generating and providing program guides, scheduling programming, generating recommendations, providing program guide navigational tools, providing DVR functionality, dynamically generating programs, enabling a user to generate a program, providing user interfaces, etc. The user interfaces described herein can be implemented as a graphical user interface (GUI), web-based user interface, computer program, smartphone or tablet program or application, touchscreen, command line interface, gesture, voice, or text interface, etc., or any combination thereof. A user may cause a program to be played by a content player by selecting a program from a program guide. A program may also be displayed without a user having to select a program or channel and without the display of a program guide. Further, the program guide need not be displayed to a user for the user to view or listen to programs or channels. For example, the user may access a program or channel via voice command (e.g., recognized by a voice command system), a body/hand gesture or a wand gesture (e.g., recognized by a camera-equipped gesture recognition system, or a wand motion tracking system), a remote control, or otherwise.

In addition, the memory 176 may include a data processing module 182 that may be executed by the processing unit 170. Optionally, the data processing module 182 implements aspects of the present disclosure. For example, the data processing module 182 can be configured to process user queries, instructions, data and content from the data stores 162, 164, etc.

The content scheduling system 102 may communicate with a variety of third party content hosting systems 104, 106, 108 (wherein the third party systems are not operated by the same entity that operates the content scheduling system 102), from which content may be streamed. Optionally, a content programmer (sometimes referred to as a curator) defines a program and/or a channel. For example, the content programmer may define a channel to be "cats". The content programmer may define a program for the "cats" channel to be "cats playing with dogs", with a time length of 30 minutes, to be provided to users at a specified day/time (or at recurring days/times). The content programmer may search for, identify, and select program-appropriate content (e.g., video content, music content, still image content, social streams, text messages, etc.) from one or more content sites, such as third party video, music, image, social media, blogs (e.g., microblogs), and/or other hosting sites that may host video clips, music media, still images, graphics, social media, blog/microblog messages (e.g., text and/or audio-video messages), etc., from one or many users. The content programmer may define an order for the selected clips and/or other form of content to be presented in when the program is viewed or listened to by users. For example, the content scheduling system 102 may record clip sequencing information specified by a programmer or the system to indicate the order that selected clips will be played back as part of a program. The system 102 may associate metadata with a given clip in a program, such as a starting point/time and a stop point/time for each clip. Thus, the system 102 may cause the clips in a given program to be sequenced so as to provide a user with a seamless viewing experience. Optionally, the programmer may indicate where advertisements may be inserted between clips. For example, the programmer may specify that an advertisement may be inserted between the 4th and 5th clip and the 9th and 10th clip. Then, during playback, one or more advertisements may be selected and inserted at the designated points between clips.

Optionally, a mediation layer is provided to dynamically determine the placement of advertising on programs comprised of short videos or other content. The mediation layer may include defined rules (e.g., programmer defined rules) that specify when an advertisement is to be displayed (e.g., within a specified time block within a program, based on how much of a particular program a user has viewed, based on the subject matter of a given item of content (e.g., as determined from associated metadata), based on what is occurring or being displayed in the content, between specified clips, etc.).

Optionally, a single clip or other streaming content being viewed by a viewer may be automatically paused during playback at a designated point or time (or randomly), and an advertisement (e.g., optionally from a source different than the clip, such as from an advertisement server) may be selected (e.g., by the advertisement server), streamed and played to the user. When the advertisement has completed playing, the playing of the clip may be resumed. Thus, an advertisement may optionally be played as a mid-roll advertisement with respect to a given clip.

A programming module may keep a running tally of the sum of the lengths (in time) of the video clips and/or other content selected by the content programmer for a program, and display the running tally to the content programmer. The programming module may provide a visual and/or audible alert to the user when the running tally is equal to the defined time length of the program, and may provide a different notification when the running tally is greater than the defined time length of the program. If the total length of the selected clips and/or other content exceeds the defined program length, the programming module may optionally trim the last clip in the program or a portion of each clip and/or other content in the program to bring the total length of the program to be about equal to the defined length of the program. The content scheduling system records the locators for the selected clips (or other content, such as image content, social streams, blog (e.g., microblogs), text messages, etc.), or a locator for a playlist of the selected clips or other content, the ordering of the clips and/or other content, and day(s)/time(s) the video program is to be presented to users, and then causes the program (with the clips in the defined order) to be presented accordingly at the scheduled days/times and causes a program guide to include a listing for the program at the specified days/times for the specified duration.

Optionally, the system 102 may automatically perform at least a portion of the content selections for a channel or program, optionally using for example, a channel generation module or an automatic program generation module. For example, the system 102 may search for and locate video content using search terms (e.g., specified by a content programmer) corresponding to various categories/subjects. By way of illustration, if the system is seeking to define a channel of videos and/or other content regarding cats, the system may issue a search for videos of cats. The system may issue the search request using the search engine of one or more third party content hosting sites (e.g., by submitting the search request and search terms using an application programming interface associated with the content hosting sites). The content hosting sites may use tags (e.g., assigned by the user that posted the video, assigned by other users, assigned by an operator of the video hosting sites, etc.) associated with the video content to identify videos corresponding to the search request. By way of further example, if the system is instructed to include microblog entries as part of the cat channel, the system 102 may search for microblog entries (e.g., TWITTER® tweets) that include cat related text or hashtags (e.g., "#funnycat").

The system 102 may use further criteria in selecting among videos and/or other content for the cat channel or for a specific program. For example the system may issue a search query for "cats", and optionally filter the results based on one or more criteria. Optionally, the system may search for cat videos and/or other content of a specific length or range of lengths (e.g., 5 minutes, between 4 minutes and 6 minutes, etc.). Other criteria may be used as well in determining which videos and/or other content to select and include in a given program for a given channel. For example, the system may access the number of views on the third party video hosting site and/or the user ratings provided by users of the third party video hosting site in determining which videos to select.

By way of illustration, the system may be programmed to select only those videos which have more than a threshold number of positive indications (e.g., more than 500 positive indications (e.g., "thumbs up" votes)), and/or greater than a specified percentage of positive posting indications (e.g., 75% of users, that provide an indication as to whether or not they like the video, indicate that they like the video) or a specified ratio of positive indications vs. negative indications (e.g., a ratio of at least 3/1 of positive indications vs. negative indications). In addition or instead, the system may access and/or analyze other types of indications. For example, the indications (e.g., social presence, social rating, number of followers, number of posted videos, aggregated number of views for all videos posted by author for videos posted on one or more sites, audience size and/or type, other author activities, etc.) may relate to the author/source of an item of content generally. For example, a threshold may be set with respect to an author's number of followers, social rating, influence rating, number of friends (on a social networking site), etc. Such indications may be accessed from the third party video hosting site on which the content is hosted and/or from other sites and sources (e.g., social networking sites, influence scoring sites, microblog sites, etc.).

By way of further illustration, in this example, the system may select videos for the cat channel that have a tag and/or title of "cat", have at least 600 views and/or have at least a 75% approval rating. The system 102 may in addition or instead select the top 50 (or other number) most viewed cat videos or the top 50 (or other number) rated videos for the channel. The system 102 or other content programmer may in addition or instead select videos of cats from the top 50 ranked (or other number) authors based on the number of followers they have and/or their influence score. The system 102 may assemble a channel and a program based on the identified videos from one or more third party sites.

By way of further example, the system may access the number of followers a blogger (e.g., a microblogger) has and/or the number of times a given blog post has been re-posted by others in determining which blog posts to select for a program. Other example factors that may be taken into account in selecting content may include the number of replies that were received in response to a content posting, the number of likes a posting received, the number of different social networking sites a posting was reposted too, an engagement or influence rating of a posting user (which may be based at least in part on engagement measurements, such as the ratio of reactions generated by content posted by the user over the number of content postings, and/or where the rating may be generated by the system 102 and/or accessed from one or more influence rating services, such as KLOUT®, KRED®, PEERINDEX®, etc.), etc.

The system 102 may use the supplemental content identification module or other tool to periodically review the video hosting websites to ensure that the selected videos for a given program are still available to be streamed to the user display. If the system 102 determines that certain videos that had already been included in scheduled program are no longer available, the system may find alternative videos of similar length (e.g., based on a length tag or other length indication) and subject matter (e.g., because the alternative video had been previously manually designated as an alternate video from the specific program, based on a subject tag or other indication) to substitute in place of the missing videos, as discussed in greater detail herein. Similarly, the system 102 may periodically review other content hosting websites to ensure that the selected content items (e.g., microblog postings, social networking page postings, etc.) for a given program are still available to be provided to the user terminal. If the system 102 determines that certain other content items that have already been included in scheduled program are no longer available, the system may find alternative content of similar length (e.g., based on a length tag or other length indication), type, and/or subject matter to substitute in place of the missing content.

The system 102 may also communicate with a variety of user terminals over a network 116 (e.g., via the Internet). The system may provide user terminals 110, 112, 114 with access to the program guide (e.g., as a web app via a web browser and/or via a dedicated application, such as a phone app hosted on a user terminal) and enable the user terminals to access programs streamed directly from the content hosting systems 104, 106, 108, and/or via the system 102, according to the timing of the program guide schedule. The system 102 may also provide simulated digital video recorder (DVR) functionality as described elsewhere herein. The system 102 may also host administrator user interfaces and associated programs. A mobile device 118 may have an application installed thereon that enables the mobile device to act as a remote control and enables the user to navigate the program guide on a user terminal via inputs on the mobile device 118.

The system 102 may include data stores 162, 164 that store content to be streamed to users (e.g., backup/alternate content as discussed herein, standard channel content, promotional/advertisement content, etc.), location information for content to be streamed to users (e.g., URLs to video content on third party hosting sites 104, 106, 108, URLs to music content, image content, social content, microblogs, etc., or any combination thereof on local or third party content hosting sites), program schedules, user account information (e.g., user channel and content preferences (e.g., genre, program, subject matter, content and/or channel likes and/or dislikes provided by the user via one or more interfaces), user specifications of channels to be blocked, user reminder instructions, user bookmarks, user viewing history (e.g., which channels and programs the user has watched, how often the user watches a given channel or program, how long a user watches a given program or channel, etc.), rules, and/or other information.

By way of example, user account information (e.g., user channel and content preferences explicitly provided by the user, user channel and content preferences as determined from the user's content viewing history, etc.), user behaviors (e.g., how long a user watches content per day or week, how many times in a specified time period the user changes channels, how often per specified time period the user tries a new channel or show (a channel or show the user has not previously viewed), etc.), promoted content (e.g., content sponsored by an advertiser or other third party), and/or data from third parties may be used in generating content recommendations for the user and/or in organizing how a program guide is presented to the user. Optionally, the program guide generation module 160 may be utilized to generate and/or personalize program guides. For example, some or all of the foregoing data may optionally be used in determining: the ordering of channels in the electronic program guide (e.g., which channels are presented first, second, third, etc.); which, if any channels are to be excluded from the program guide (e.g., channels that the system determines are of low interest to the user); which channels are to be highlighted (e.g., via color, animation, pop-up interfaces or otherwise, etc.), what types of information are to be included in the program guide, etc. Thus, a program guide may be automatically generated and customized for a given user.

Optionally, an artificial intelligence engine may be provided which learns the user's preferences and interests (e.g., based on the user account information and viewing and/or navigation behavior) and recommends other content (e.g., other programs and channels) via text, graphics, and/or a computer generated voice track synchronized with the lips and facial movements of a computer generated host (which may appear as a human or which may appear as a cartoon figure, animal, or otherwise). The computer generated host may be configured to act as channel or program host.

The content hosting systems 104, 106, 108 may enable users to upload or otherwise post media content (e.g., recorded and/or live streaming content), such as videos, social media content, or other content, and to provide media titles and/or other tags (e.g. descriptive, subject matter tags). The videos or other content may be associated with metadata, such as length of the videos or other content and/or length of advertisement streamed as a pre-roll or post-roll video advertisement). The users and/or the hosting systems may assign a categorization tag to the media content (e.g., humor, cats, licensed television shows, science, film and entertainment, gaming, etc.), and may record and post viewer rating information, and track and post the number of views. Some or all of this information may be accessed and used by the system 102 (e.g., using an application programming interface (API)), as similarly discussed herein.

Figure 2A:
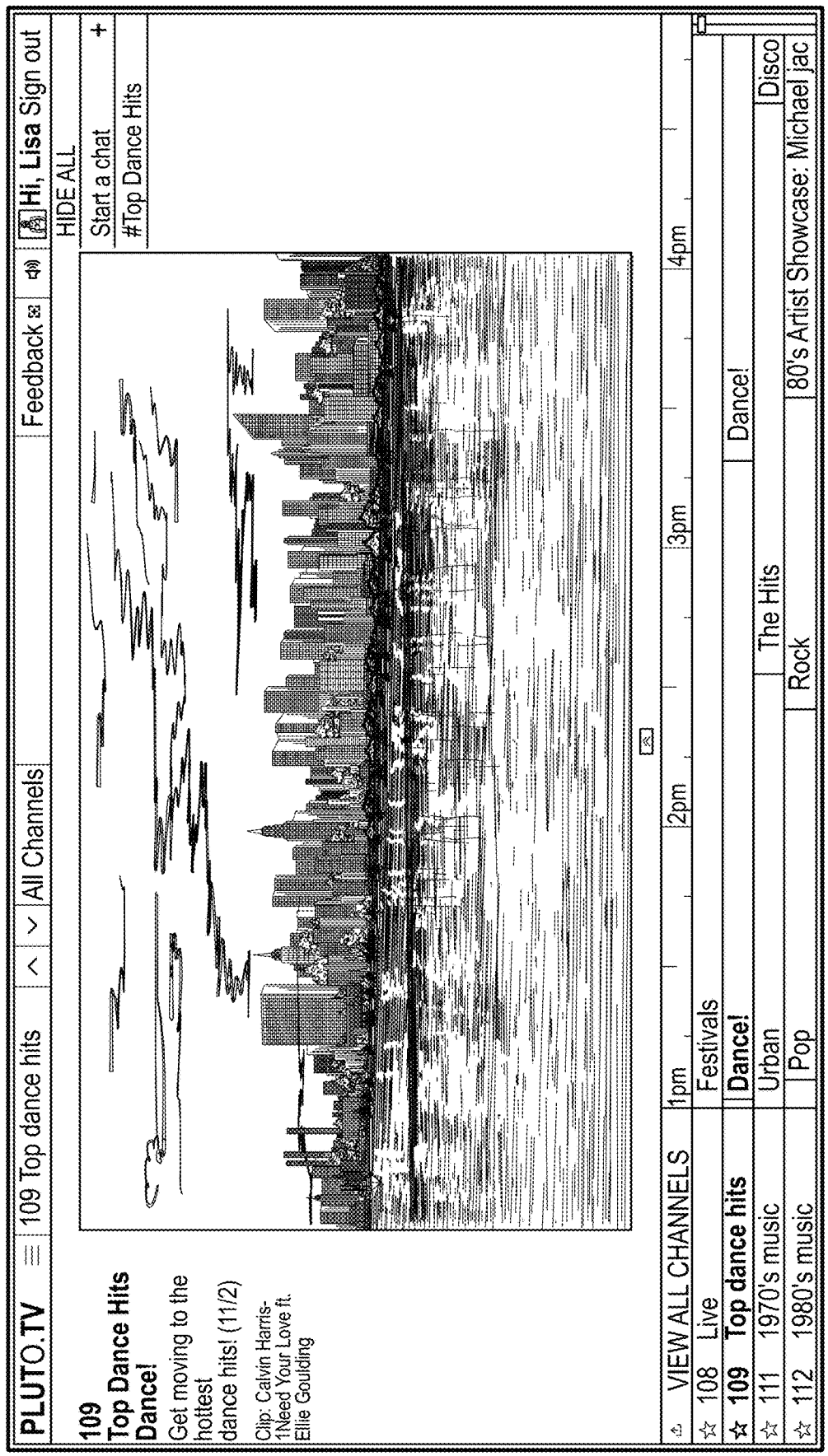

FIG. 2A illustrates an example interactive program guide for a plurality of channels and time periods and a viewing area to view a currently playing program for a user-selected channel. It is understood that the program guide can have fewer or additional features, and may have a different appearance and controls. The program guide may be accessed, displayed, and interacted with using a browser (e.g., as a web app coded using a browser-supported programming language, such as JavaScript), using a dedicated application (e.g., a mobile device app (e.g., a phone app or a tablet app), a game console app, a personal computer app, a smart television app, a streaming device app, etc.), or otherwise. Optionally, program guide functionality may be provided by a system that the user may connect to the user's playback device. For example, the system may be in the form of a dongle or stick that the user can plug into a playback device port (e.g., an HDMI port) or wirelessly connect to the playback device. In this example, the program guide is in the form of a grid, although other arrangements and formats may be used.

In this example, on the left side of the program guide (the vertical axis), channel numbers are provided (although other channel naming conventions may be used, such as titles, letters, colors, etc.). On the horizontal axis, time periods are listed. Program titles are provided, with an indication (e.g., a graphical indication and/or numerical start/stop times) as to when a given program starts and ends. Thus, the programs listed by the program guide are scheduled/planned events, typically with a specified duration, within a channel timeline. The user can scroll over the channels on the left side and the user interface will present additional information regarding the channels and/or regarding programs and episodes of recurring programs. The user can scroll forward and backward thorough the program timeline by mousing over the timeline header or otherwise. The viewing area (and program) may be displayed at the same time as the program guide, or the viewing area may be closed to provide a larger area for the display of the program guide. Similarly, the program guide may be closed or overlaid to provide a larger area for the display of the viewing area (e.g., by activating a "full screen" control provided by the user interface).

Within the program guide, there are individual links by channel that are accessed by the user's browser when the channel is changed. For example, the link for the channel "Top 40" may be in the form of http://pluto.tv/#!channels/Top %2040&_=_. A given channel may have associated content "playlists," which are a series of clips organized into scheduled programs/episodes and which may be accessed by the user browser. Thus, a playlist may optionally be in the form of a list of clips (e.g., compiled by human content programmers or automatically by the system), which share a similar theme, message or subject, and that are organized into a program with a specified duration.

The viewing area displays the currently playing program for a user selected channel. Optionally, information regarding the program is displayed in conjunction with the program. Some of the information may be pulled from the metadata of the currently playing clip and some of the information may be pulled from the channel name and the program name. For example, the viewing area user interface may display the corresponding channel number, the channel name, the program name, the name of the currently playing clip, and/or other information. It is understood that a user does not have to select a specific program to view the program. The user can select a channel, and the programs for that channel will continuously play on the user's terminal according to the schedule until the user navigates to another channel, pauses a program, closes the program guide application, etc. The program guide may emphasize the currently playing channel and/or program in the program listing (e.g., using color, bolding, animation, or otherwise).

Optionally, an "all channels" control is provided. The user can activate the "all channels," control, and in response the user interface will list all the current active channels (although the user may need to scroll through the channel listing to view all the active channels). The user can also select a categories control, and in response, the user interface will display channel groupings, where channels are grouped according to theme/category (e.g., 100-200 children; 300-400 sports; 500-600 on-demand, 700-800 pay-per-view, 900-1000 user generated channels, etc.), and the names and/or channel numbers for each channel are provided. An example channel categories user interface is illustrated in FIG. 2B. The various categories may optionally be visually indicated using separate, spaced apart, color coded rectangles for each category, with a category name as a header, and with a listing of channels for each category.

The user can also activate a control which, when detected, causes the user interface to display additional or fewer channels in the grid or to display only channels the user had previously indicated as being favorite or preferred channels of the user.

Optionally, as noted above, in addition to displaying scheduled programs, the same program guide user interface may optionally also list on-demand programs (e.g., free on-demand content, pay-per-view movies, music, television shows, or other content that are part of a subscription package, etc.), where a user can click on an on-demand program listing at any time and have the program streamed to the user. The on-demand content listings may optionally be grouped so that they are listed as adjacent channels (e.g., channels 500-600 may be dedicated to on-demand channels). The grouped on-demand content listings may be displayed above or below the scheduled programming channels, or between an upper set and a lower set of scheduled programming channels.

If there is a fee associated with viewing an item of on-demand content (e.g., the content is pay-per-view content, or is rentable for a specific period of time), optionally associated fee information is accessed from a data store and provided for display within or in association with the on-demand listing. If the user clicks on an item of fee-based content, the user may be prompted to enter payment information or to agree that previously provided payment information may be used to charge the fee. The user may then be charged the fee and may view the fee-based content. Optionally, the grouping of on-demand channels may be displayed as a single entry, and an expand control may be provided which, if activated by the user, causes each on-demand channel entry to be displayed. Thus, optionally, the same program guide may display listings for, and access to both on-demand and linear, scheduled, channels.

Optionally, a randomizer control (e.g., a button or menu entry) is provided, which when activated by a user, causes the system to generate in substantially real-time a program and/or channel of non-scheduled content and/or content not specifically selected by the user (e.g., where the program or channel is not simply a playlist defined by the user). However, optionally, the content is not truly randomly selected, but may be selected based on one or more criteria. Optionally, some or all of the content is randomly selected and/or handpicked by an operator. For example, the system may access user account information (e.g., a user's content preferences, viewing behavior, and/or viewing history) to be used in selecting, in substantially real-time, one or more items of content to be displayed to the user as a program or channel. For example, if the user's account information indicates that the user likes baseball and skateboarding bloopers but is not interested in football bloopers, the randomizer may select from one or more sources baseball and skateboarding blooper video content, and generate a program for the user from selected baseball and skateboarding blooper video content, while excluding football blooper video content from the program.

Optionally, an intelligent channel scan mode is provided that determines a priority order for channels to jump to, in response to a user activating a scan control based at least in part on processed set(s) of data. By way of illustration, a scan control may be provided, which when activated, causes a player to cycle through channels, presenting content from each channel cycled through for a period of time (e.g., 1 second, 3 second, 5 seconds, or other period of time, or to the end of the current content item (e.g., video clip) or the end of the current program, which is optionally settable by the user) before jumping to the next channel. If the user likes content being provided by a channel, the user can activate the scan control again or a play control to stop scanning and to enable the content of the current channel to be presented. The scan mode may be configured to scan though each available channel or to scan through only a subset of available channels.

The ordering of the scan may be based on the ordering of the channels in the program guide, or the ordering of the scan may be dynamically determined. For example, the scan sequence may be based on the content the user is currently viewing, the user viewing history, user preferences, other user account information (e.g., genre, program, subject matter, content and/or channel likes and/or dislikes, user specifications of channels to be blocked, user reminder instructions, user bookmarks, etc.), etc.

For example, depending on the configuration of the scan mode, if the user is currently viewing a sports channel when activating the scan control, the scan mode may only scan through other sports channels. By way of further example, depending on the configuration of the scan mode, if the user is currently viewing a sports channel when activating the scan control, the scan mode may first scan through other sports channels, and then scan through non-sports channels.

Optionally, a user interface is provided via which the user may specify one or more specific scan sequences, which may be associated with respective scan controls. The user interface may include a field via which the user can enter a scan sequence name, which may then be presented in association with the respective scan controls. Thus, for example, a user may define a sports channel scan sequence, a comedy channel scan sequence, a music channel scan sequence, a reality show scan sequence, etc. A menu of respective scan controls may be presented via which the user can select the desired scan sequence. In response to the user selection, the content player will then scan through the selected channel sequence.

Optionally, a recommendation control is provided, which when activated by the user, causes the system to generate and/or display program and/or channel recommendations. The recommendations may be based at least in part on one or more of the following: user account information (e.g., genre, program, subject matter, content and/or channel likes and/or dislikes, user specifications of channels to be blocked, user reminder instructions, user bookmarks, etc.), user viewing history, user navigation behavior, etc.

Figure 2C:
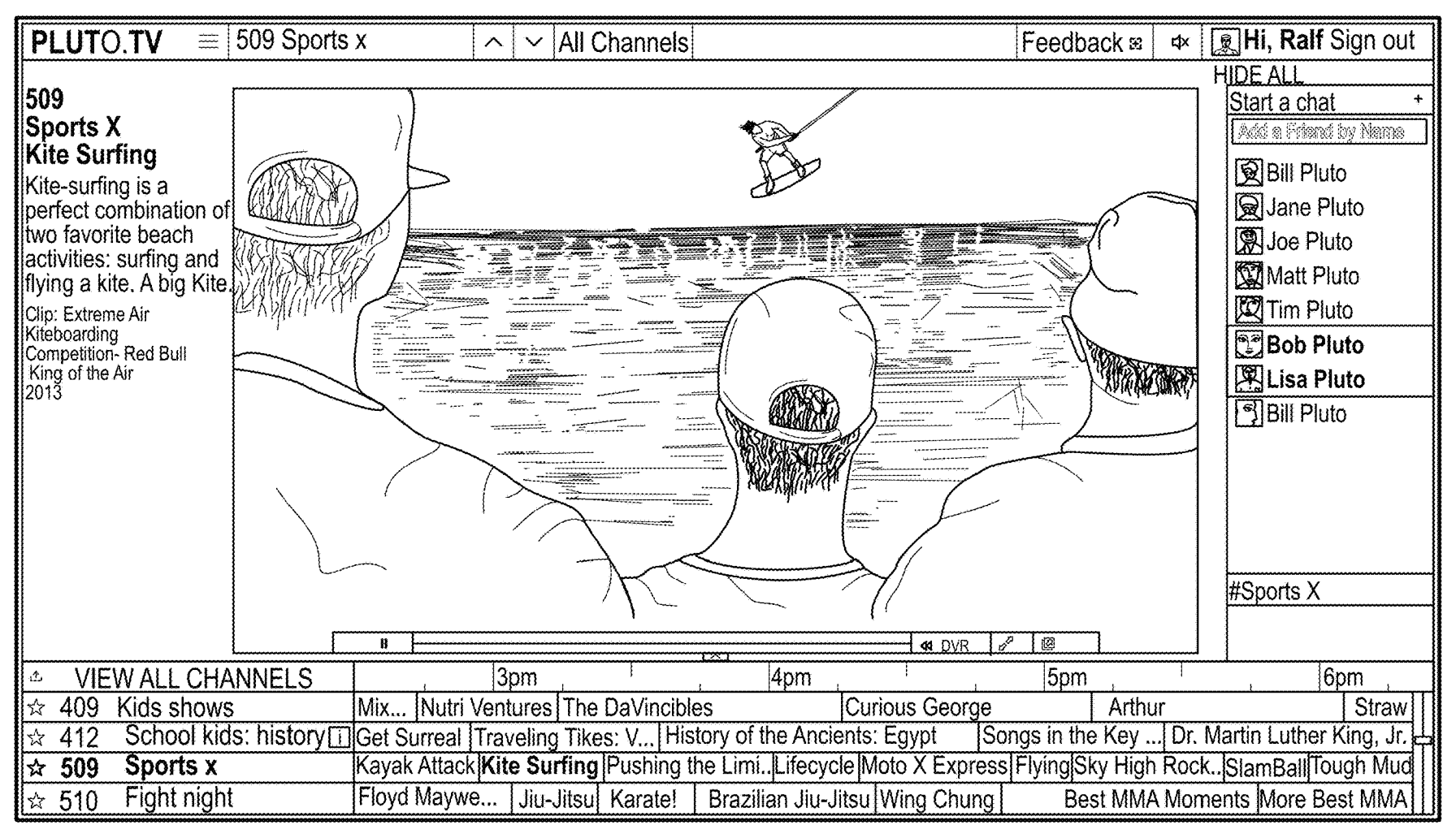
Figure 2D:

As further illustrated in FIG. 2A, a chat control is optionally provided which enables a user to initiate a chat (e.g., a text chat) with others. Optionally, a chat user interface is provided (e.g., in response to the user activating the chat control) displaying names and/or images of the certain of the user's friends, as illustrated in FIG. 2C. The names or images of the user's friends may be accessed from a social networking site or may be provided directly by the user (e.g., via an "add a friend" interface). The chat user interface may indicate which of the user's friends are online, and which of the user's friends are currently viewing the same program as the user. FIG. 2D illustrates a chat session which may take place while the various chatters are viewing a program (e.g., a scheduled program on a channel, so that the chat session is synchronized with the episode). Optionally, the user interface may access video and audio content from a webcam and a microphone to enable users to chat via a video and/or audio conference. The webcam may also be positioned and used to enable a user's friends watch the user watching a given program.

Figure 2E:
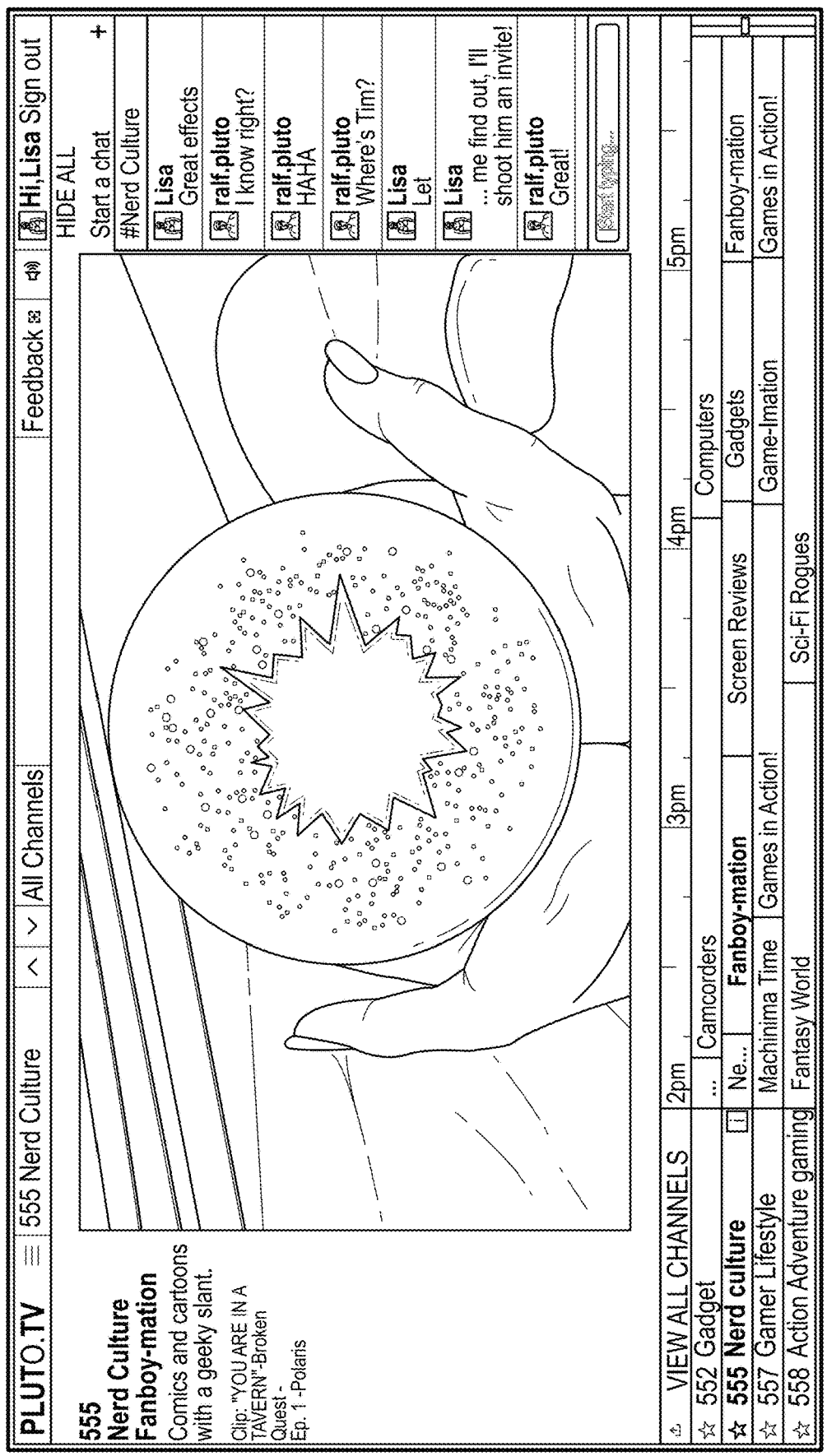

The user can invite others to watch a current or future program via the chat user interface or optionally via a direct invitation user interface. For example, the user can activate an invitation control, and an invitation will be sent to a friend (or other user) specified by the user. The invitation may identify the program title, channel, and/or the program date/time. Optionally, the invitation may include preexisting invitation template text and dynamic text identifying the program and channel the user is watching, such as "I am watching 'Cats having dinner' on Channel 302. Please watch along with me" or "I will be watching 'Cats having dinner' on Channel 302 on Friday, December 26. Please watch along with me" (the underlined text indicates the dynamic text). The dynamic text may be determined by detecting what program the user is watching and determining which channel it is on. The dynamic text may then be inserted into the invitation. The invitation may be sent in real time. Optionally, the chat user interface may also provide access to a public chat room, as illustrated in FIG. 2E.

Figure 2F:
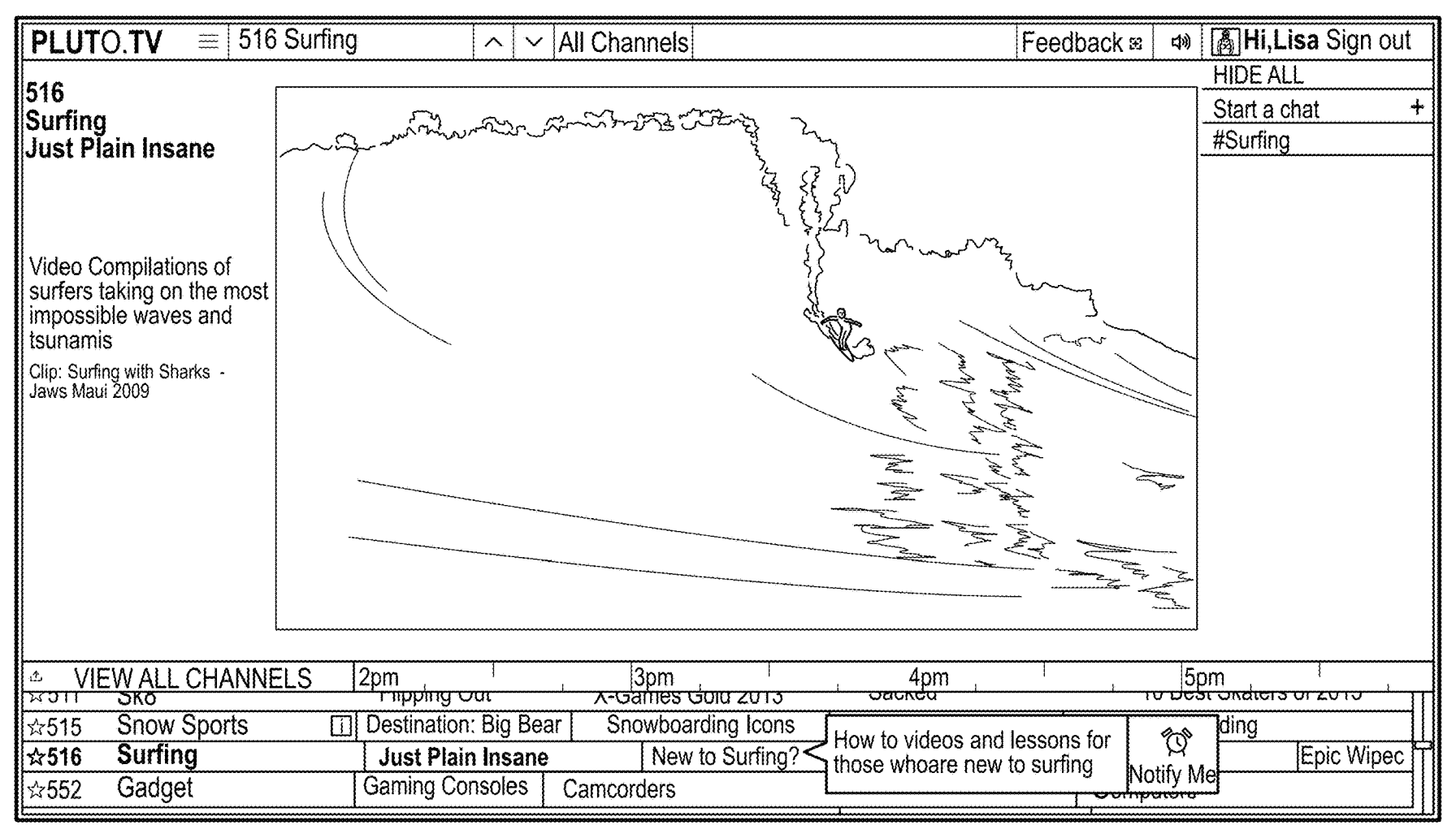
Figure 2G:
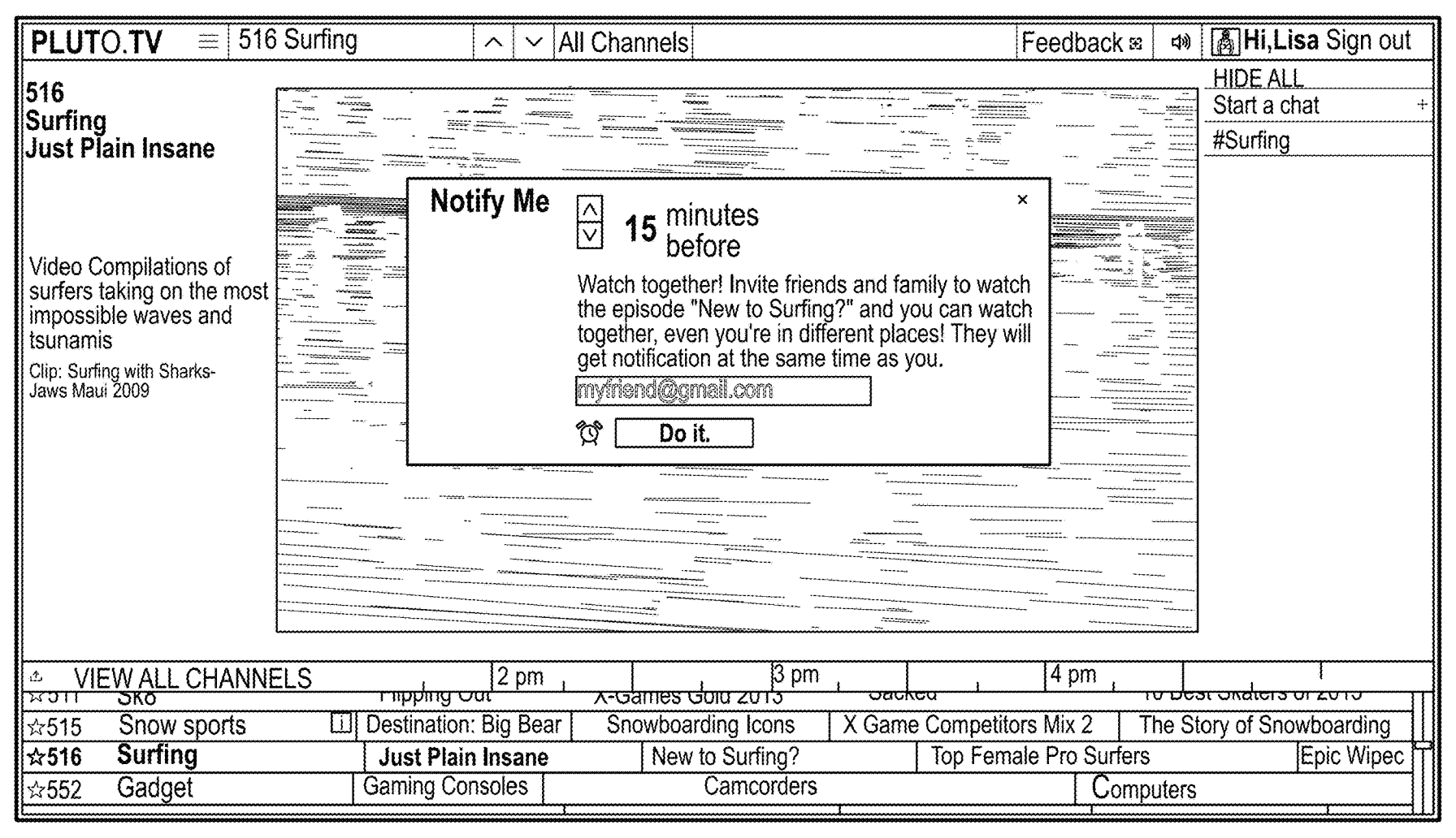
Figure 2H:
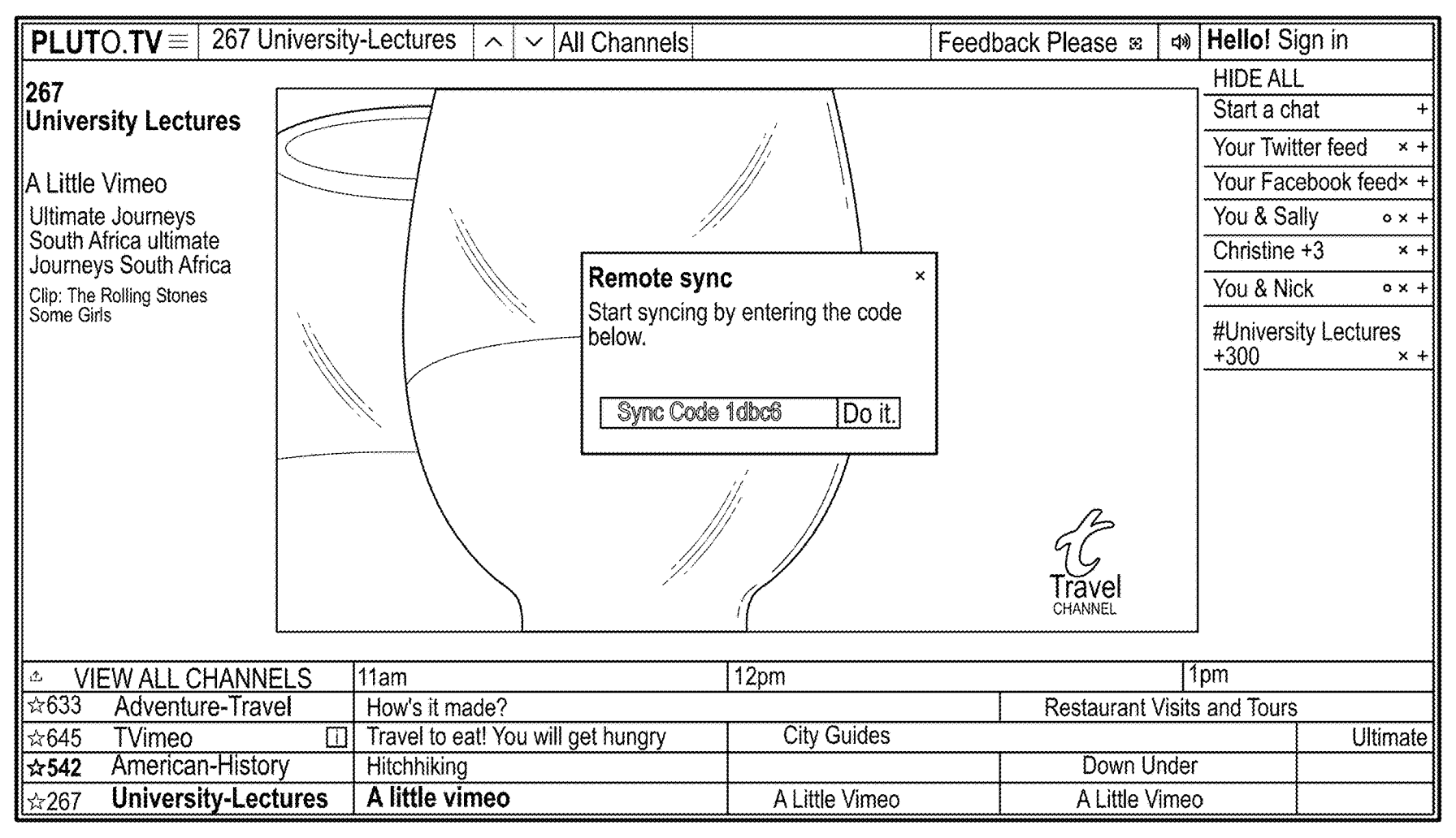
Figure 2I:
Figure 2J:
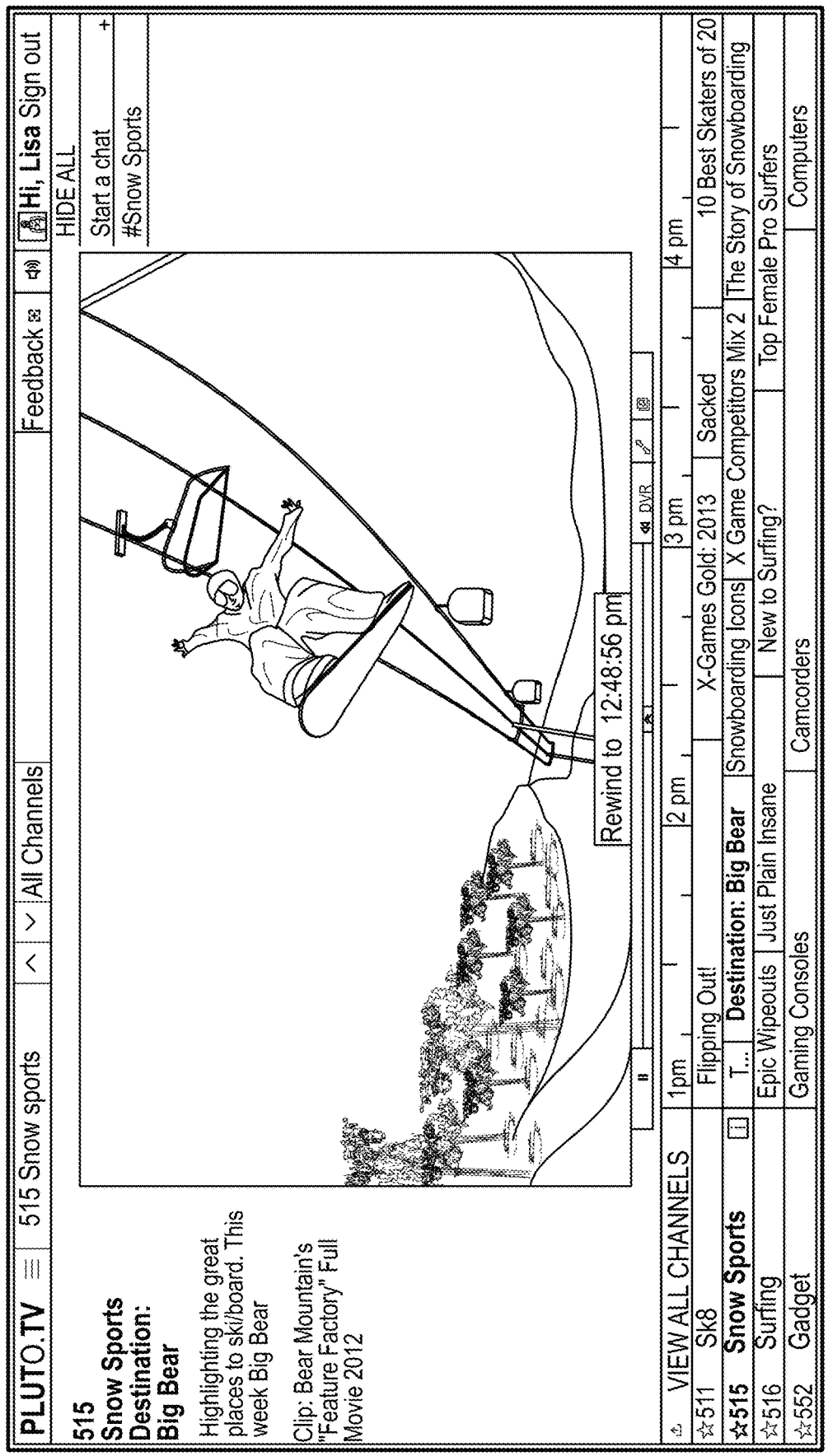

Controls to a real or simulated digital video or other content recorder (DVR) may be provided for display on a user terminal in association with a video or other content player. Optionally, the DVR may be a module hosted by the system 102 or hosted by the user's terminal and implemented in part using software in communication with the software providing the program guide. An example DVR set of controls is illustrated in FIGS. 2C and 2J. As will be described, optionally the DVR may be used to "record" a program, view a recorded program (e.g., from a library specific to a user or from a shared library), pause and rewind a live program, share a program currently being watched, and/or share bookmarks. In this example, a pause/play control, a rewind control, a fast forward control, and a scrubber control are provided. For example, the user may instruct, via a record control provided by the program guide user interface, that a show be recorded for later playback. A DVR user interface may also provide a listing/library of recorded programs (which may be virtually recorded programs), from which the user may select for playback. The DVR function may enable the user to rewind or fast forward through a recorded or currently playing program using corresponding rewind and fast forward controls.

Optionally, an actual DVR is not used. Rather, the interface simulates the functionality of a DVR. Thus, for example, although the DVR control set enables the user to pause, rewind and fast forward through a program, a copy of the program is not stored on the user terminal or on the content scheduling system. Instead, the DVR control set is controlling playback of media being streamed from the third party content sources. Thus, for example, if a user provides a "record" instruction while watching the program, no actual content is recorded in response. Instead, a bookmark may be stored (e.g., on the user terminal or on the content scheduling system) indicating at what point in the program the user activated the record program. When the user later accesses the "recorded" program, the system access the stored bookmark, determines at what time point the user activated the bookmark, and causes playback of the corresponding clip (and hence program that included the clip), accessed from the third party content site, to begin at the bookmarked location. Thus, advantageously, storage space on the user terminal or content scheduling is not wastefully occupied storing the content from the third party content site.

Optionally, the user may associate several bookmarks with a program, where each bookmark is associated with a different time/point in the program. The program guide may include a listing control, which when activated by the user, causes a listing of the bookmarks/recordings to be generated and displayed to the user. The listing may display some or all of the following: a frame from the program corresponding to the location of the bookmark, the name of the program, the program channel, and the date/time the user created the bookmark. The user can then select a given bookmark or "recording" for playback, and the corresponding program will then be played back at the bookmarked point.

A user's bookmarks and library may be associated with the user's account and optionally may not be accessible to other users. Optionally, the user can select to share some or all of the user's bookmarks or library of programs with one or more other users. For example, the user may share bookmarks for a particular program, a set or sets of programs, a channel or set of channels. The recipient(s) of the bookmarks (or library) may be notified that the user is sharing the bookmarks (or library) with the recipient and may view a similar generated bookmark listing. Optionally, a bookmark (or access to a bookmark via a link or otherwise) may be included in an invitation from the user (such as the invitations discussed elsewhere herein) to one or more other users to watch the program (e.g., beginning at the bookmarked location). Thus, the system enables the user to engage in the viewing of the program starting at a bookmarked location with other remote users with whom the user shared the bookmark with. Optionally, the library and/or bookmarks may be shared across a variety of different platform types (e.g., tablet computers, smart phones, desktop computers, networked televisions, etc.) or only one or more user and/or system selected platform types.

In addition, the DVR (the virtual or non-virtual DVR) may be used to navigate through a program being viewed by the user in accordance with its scheduled display. That is, the DVR enables the user to rewind, pause, and fast forward through a "live" program. Optionally, the DVR prevents that user from fast forwarding through a program past it current "live" point. Optionally instead, the DVR may enable the user to fast forward through a program past it current "live" point. Of course, if the program is an actual live program (e.g., a live sporting event), the user is prevented from fast forwarding through the program past the current actual live point in the program.

Because a given program may be composed of multiple clips being streamed from different sources, which are then logical and visually stitched together (to provide a seamless viewing experience to a viewer), rewinding or fast forwarding through a given program may cause clip boundaries to be traversed. Because certain clips may be from different sources, the system determines if the rewind (or fast forward) instruction will cause a clip boundary to be traversed, and if so, will determine which other clip should be streamed to the user video player based on the amount of rewinding or fast forwarding. The system will then cause the appropriate clip from the appropriate source to be streamed to the user video player from the appropriate point in the clip. It is understood, that a user may rewind or fast forward through a program using dedicated rewind and fast forward controls, a scrubber, or otherwise. An example DVR user interface is discussed below with respect to FIGS. 2J and 2K.

Optionally a library add control (e.g., a button) may be provided on third party pages (e.g., website pages) or via a browser plug in that enables a user to add a video on the third party page to the user's individual library (e.g., the user's DVR library for access via the DVR or otherwise). For example, when the user activates the library add control, code associated with the library add control detects the activation and transmits corresponding video locator information (or locator information for other content, such as image content, social streams, microblogs, text messages, etc.), to the user's library (which may be hosted on the user's terminal and/or the system). For example, the locator information may comprises a URL and/or an internal code of the third party that points to the video (or other content) specifically separately from the page as a whole, so that when the video is later accessed by the user, only the video, and not the surrounding page, is displayed in the user's video player. Thus, for example, if the user comes across a video on a news channel website, but does not have time to view the video, the user can "save" the video to the user's library for later playback by activating the library add control. Optionally, the video may be added to a specific private or public playlist or channel, such as a user defined channel of videos that the user has saved but not yet viewed.

If the user clicks on a program listed in the program guide that has not yet begun, a reminder control is presented (e.g., in a pop-up window or otherwise), an example of which is illustrated in FIG. 2F (the "notify me" control). If the user activates the reminder control, the reminder user interface illustrated in FIG. 2G is presented. The user can provide an instruction that a reminder be transmitted to the user preset amount of time or a user-specified amount before the beginning of the program. Optionally, the user can specify, via a user account specification, via a control in the pop-up window, via a menu selection, or otherwise, how the reminder is to be provided.

For example, the user can specify that the reminder is to be provided via an audible alert or visual on the user's terminal, via an SMS/MMS message transmitted to a user mobile device, via an email, via an automated phone call, via an entry on the user's calendar (which will cause the calendar to provide an audible and/or visual reminder), and/or otherwise. By way of illustration, the user can specify that the reminder is to be provided at the program start time, 1 minute before the program start time, 15 minutes before the program start time, 1 hour before the program start time, or other amount of time before the program start time. The system or app will store the reminder instructions and provide reminders to the user accordingly. As illustrated in FIG. 2G, the reminder user interface may also include an interface via which the user can invite another person to watch the upcoming program at the same time. In the example illustrated in FIG. 2G, a field is provided via which the user can indicate (e.g., by entering an email address or SMS address of the invitee) to whom the invitation is to be provided. The invitee will then be provided with a reminder at about the same time the user is provided the reminder (e.g., via email, SMS, or otherwise).

Optionally, the program guide user interface can be navigated using a remote control. For example, the remote control may be in the form of a mobile device, such as a mobile phone with a touch screen or a touch tablet, which has a remote control application (or other application including a remote control module, such as a program guide application including a remote control module) downloaded to and installed thereon. The remote control may be configured to directly communicate with the user interface application hosted on the user's terminal via a local wireless communication protocol, such as Bluetooth, or via a local area wireless network, such as a Wi-Fi network, or otherwise. Optionally, in order to enable the remote control to be synchronized with the program guide presented in a browser on the user terminal, the user selects a sync control presented via the remote control application (e.g., the phone app). The application then prompts the user to enter in the remote sync code generated by the web app executed by the user browser, as illustrated in FIG. 2H. Once the user enters the code into a field presented by the application, the application becomes a remote control for the web app. For example, the application may present a version of the program guide formatted for the remote control application host (e.g., a smart phone or tablet display), as illustrated in FIG. 2I. When the user selects a given channel or program on the program guide provided via the remote control, that same channel or program will be selected in the web app on the user terminal. Thus, the user inputs on the remote control may be functionally mirrored on the user terminal. Similarly and optionally, when the user selects a given channel or program via the web app, that same channel or program will be selected on the remote control.

Figure 2K:
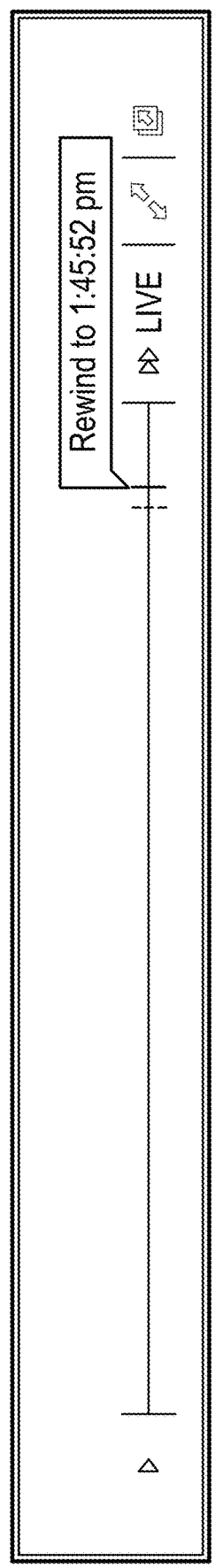

FIGS. 2J and 2K further illustrate the example DVR user interface, where the user has dragged the cursor in the scrubber back to rewind the current program, and the current rewind position of the scrubber cursor is displayed (e.g., in terms of the time of day that portion was originally played). A live control is provided, which when activated, causes the DVR to return a "live" program to the current "live" position (the current point in the program that is being played in accordance with the program guide schedule).

Figure 2L:
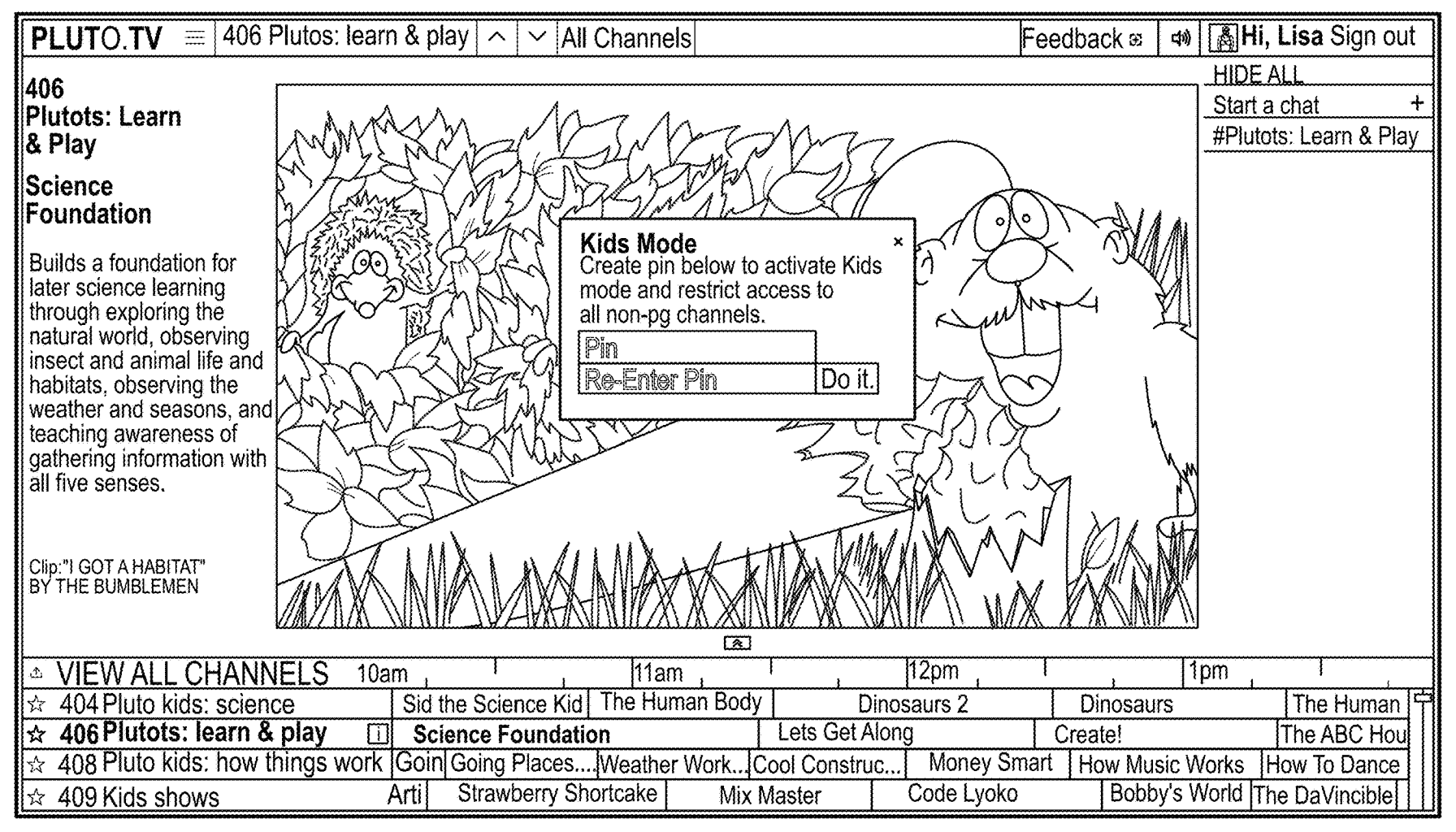

Optionally, a parental control is provided via which the user can prevent channels and/or programs having an unacceptable rating (e.g., a rating above G or PG, or other than a PG rating) from being presented unless an override input is entered (e.g., a PIN code). An administrating user (e.g., a parent) may specify an override code via a user interface accessible via the program guide (see, e.g., the example illustrated in FIG. 2L). The system will record the override code specified by the user. If someone attempts to access, via the user's account, a program that exceeds the permitted rating, such access is detected by the application or system, and in response the user interface provides a visual and/or an audible notification that the program rating exceeds the parental control threshold and prompts the user to enter the override code. If the user enters the correct override code, as verified by the system or application, then the program will be displayed via the user interface. If the user fails to enter the correct override code, then the program will not be displayed.

Figure 3A:
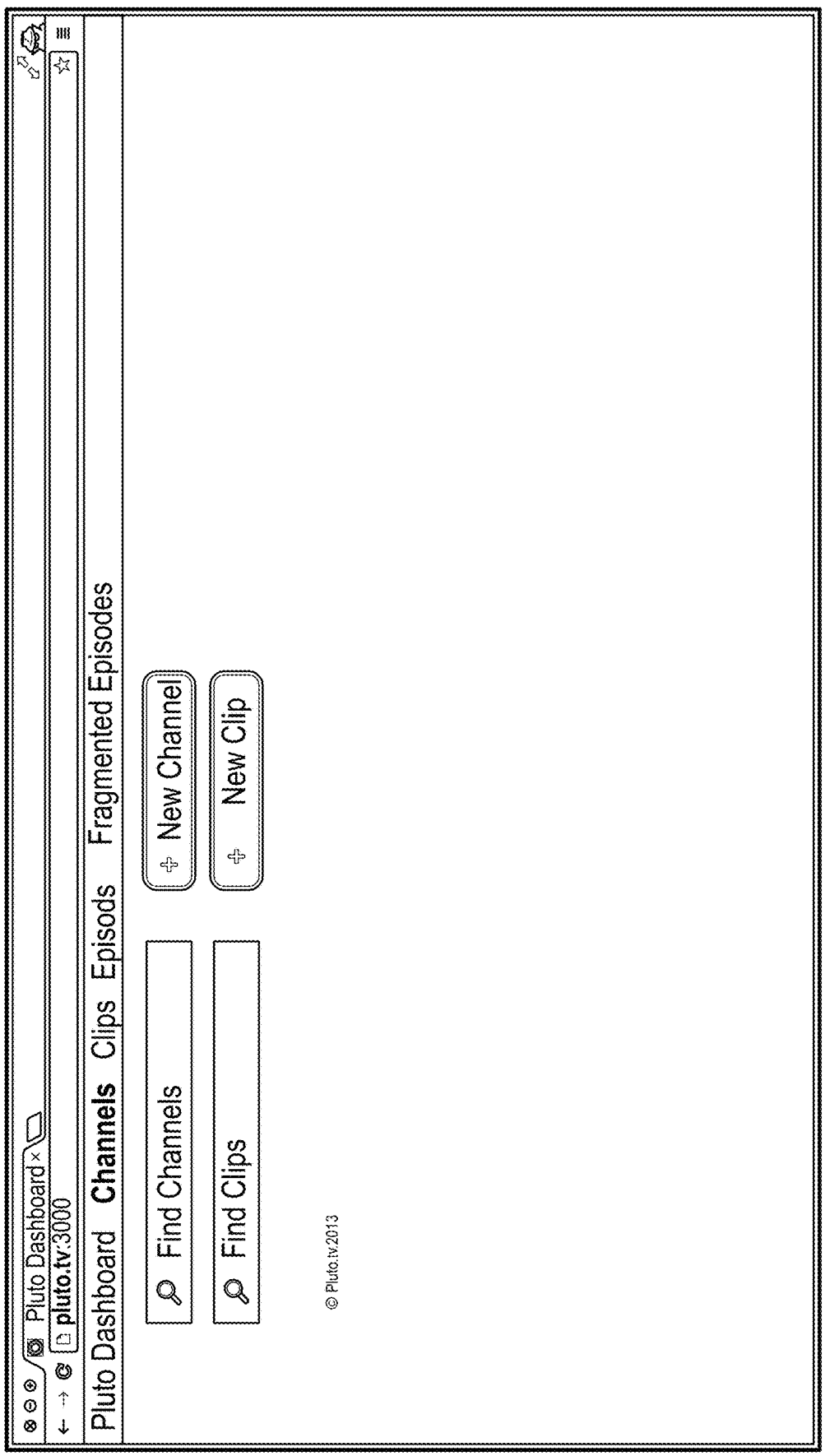

Example backend user interfaces will now be discussed that enable a content programmer to program channels and programs. FIG. 3A illustrates an example user interface including a search field via which the user can enter search queries to search for channels or clips. The search queries may be routed to one or more content hosting sites and/or a content repository or index maintained by the content scheduling system. The search results may then be presented to the user. The search results may be aggregated if they included results from more than one source. The operator can add new channels to a channel lineup by activating a "new channel" control, and can add a new video clip or other content to a program by activating a "new clip" control.

Optionally, the index of content may be made available to third parties (e.g., over a network) via an application programming interface (API). The third parties may access and use the index to identify and locate content from one or more sources that meet one or more filter conditions specified by the third party (where a filter condition may relate to content metadata). For example, the content index may include content locators (e.g., URLs for Internet content), unique content identifiers, and/or metadata extracted and optionally normalized (e.g., into an interoperable standard data format) from one or more content sources (e.g., video, music, image, social media, microblogs, and/or other hosting sites or data stores). By way of further example, the content metadata may include length information. By way of yet further example, the content metadata may identify notable individuals associated with an item of content (e.g., names of writers, actors, directors, producers, artists, performers, etc., in association with their respective titles/job functions), content title, content subject matter/topic, content classification (e.g., video, music, blog, etc.), instruments played (e.g., for music content), other metadata discussed herein, etc. Metadata may have been obtained via the content source, via an analysis of the content (e.g., by processing the content to identify actors, music, subject matter, etc.), and/or from other databases (e.g., other databases that store and provide access to content metadata).

Thus, for example, a third party may specify via an interface a length, subject matter, and category, for desired content, and a search engine will locate and return, via the API, search results identifying corresponding content and/or some or all of the associated metadata. The third parties may utilize the metadata and identified content to construct their own electronic program guides, their own programs, and/or channels, or may use the identified content and metadata for other purposes.

FIG. 3B illustrates an example of a user interface enabling a programmer to edit content programming. For example, the user interface enables a programmer to add channels to a channel lineup (e.g., by activating a "new channel" control) or delete channels from a channel lineup by activating a delete control associated with a given channel. The modifications are stored and reflected within the channel lineup and program schedule by the system. The changes reflected in the channel lineup are presented by the system to the programmer.

FIG. 3C1 illustrates an example user interface presenting lists of programs for a selected channel ("Top 40" in this example) generated by the system. The system categorizes, organizes, and presents the programs as groups based at least in part on the program status, such as "On Air", meaning the program is scheduled to be aired, "In Progress," meaning the program is still being edited and is not yet complete, "Completed", meaning the program is ready (per programmer guidelines) and is ready to be scheduled into the program tool, and "Archived" meaning the programs have been aired or assembled but not aired, but are not currently scheduled to be aired. The aired/airing dates and times, and program lengths for each program may be provided for display as well. Corresponding delete controls are provided for deleting a given program. An "add" control is provided to enable the programmer to duplicate an existing program and then manipulate/edit into a new program. When the system detects that the user has activated the "add" control, the system makes a copy of the corresponding program (or the data used to assemble the clips into the program). The user may then activate an "edit" control provided by the user interface via which the user can edit the program details including the name, description and/or published state. FIG. 3C2 a user interface similar to that of FIG. 3C1. In this example, the system organizes the list so that programs that are in progress are grouped together and programs that are on air are grouped together. In this example, the program title, aired date/time, and duration may be listed. Add, edit, and delete controls are provided and may be used as similarly discussed above with respect to FIG. 3C1.

FIG. 3D illustrates an example user interface presenting a list of clips, including the name of the clip, the source or provider of the clip, author (content creator that uploaded clip), a locator (e.g., a URL or other link) for the clip, and the clip run time. Certain information, such as the name of the clips and the clip length may be obtained from metadata associated with the clips. Controls are provided for deleting a given clip and for obtaining additional information regarding the clip. The programmer may instruct the system to filter or sort the clip list. For example, the user can instruct the system to filter the list to only display published or unpublished clips. A shuffle control is provided which, when activated, instructs the system to reorganize order of clip playback (e.g., randomly or otherwise). The "in progress" indication denotes that the corresponding program is not yet complete, and enables the curator/programmer to organize incomplete programs that are in progress. A field is provided for receiving search queries for searching for additional clips. The search queries may be routed to one or more content hosting sites and/or a content repository or index maintained by the content scheduling system. The search results identifying the matching clips may then be presented to the user. The search results may be aggregated if they included results from more than one source.

Referring again to the example illustrated in FIG. 3D, an import control is provided. The import control enables the programmer to import a clip or to import a list of clips (or links/locator thereto, such as a URL or other locator) into the program at once. A user may enter one or more clip locators (e.g., a URL) into a corresponding field, and the system will import the corresponding clip(s).

Figure 3E:
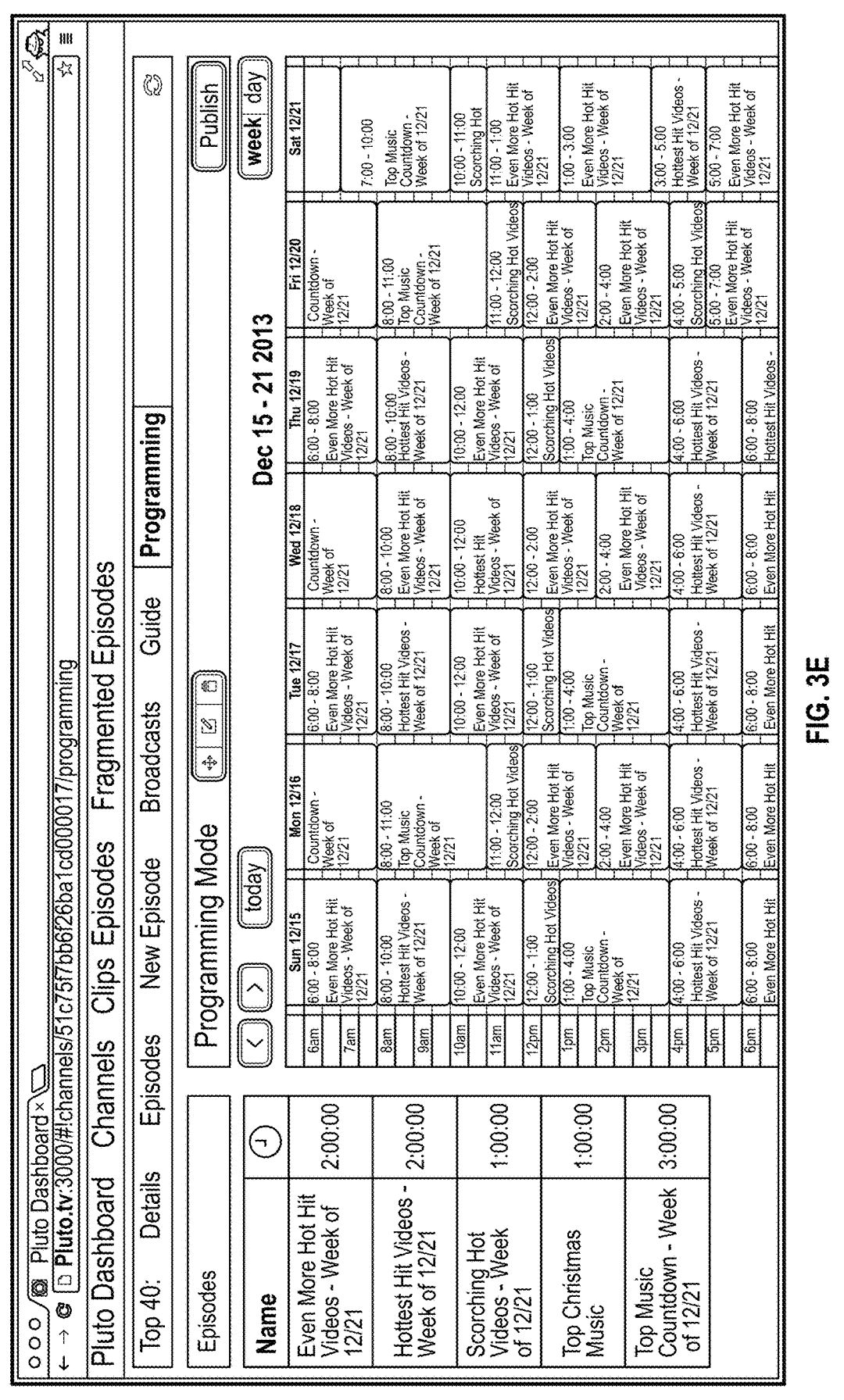

FIG. 3E illustrates an example program scheduler user interface for a channel. The programmer can instruct the program scheduler user interface to display the schedule for a selected week or day, and in response, the program scheduler user interface will display the schedule accordingly. In this example, the schedule for a week is arranged and displayed in a grid format, where time of day is listed on the Y axis, and the day is listed on the X axis. The programs scheduled for each time period of each day are displayed in the grid, wherein a given program entry includes the time period the program will be displayed, the name of the program, and the week the program will be displayed. In this example, the schedule has not yet been published to be accessed and viewed by the general user public. The programmer can activate the "publish" control and the corresponding program guide will be published and made accessible to the general user public by the system. A list of the names of unique programs/episodes included in the grid are listed in a table on the left, including the program length. Thus, the user interface enables the programmer to quickly determine how many unique programs are scheduled for the displayed week or day without having to manually identify and count the unique programs. The user interface optionally enables the programmer to manually drag and drop completed programs from the left navigation into the schedule (e.g., the weekly schedule), providing an optional mechanism to override an automatic program schedule.

Figure 4A:
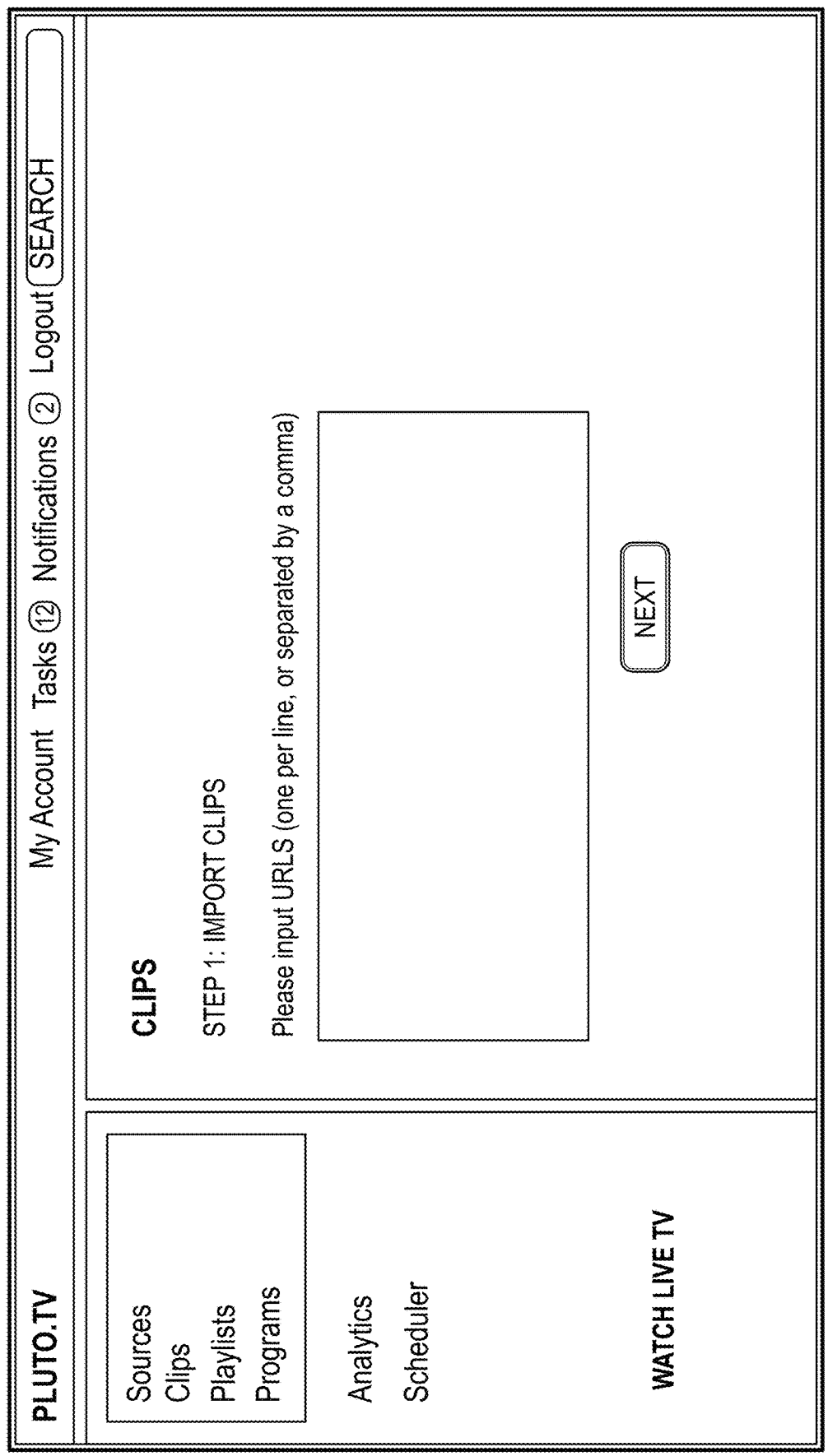

Example content programmer user interfaces will now be discussed. FIG. 4A illustrates an example user interface via which the programmer can enter locators for one or more clips (or locators for other content, optionally including real-time generated content, such as a streaming microblog) to be imported. It is understood that the term real-time includes substantially real-time (e.g., in less than 0.5 seconds, in less than 1 second, in less than 2 seconds, etc.) unless the context indicates otherwise. FIG. 4B illustrates a report generated by the system indicating which locators entered via the user interface of FIG. 4A are not usable (e.g., are not embeddable by the system in the program guide). The list of "bad" clip locators may include, for each corresponding clip, some or all of the following: a thumbnail for the clip, the clip title, a clip description, the number of clip views, the clip duration, and the date the clip was posted, in addition to some or all of the metadata associated to the original clip. A control is provided via which the operator can remove the "bad" locators/clips (or bad locators for other content). FIG. 4C illustrates an example clip assignment user interface via which the programmer can assign a given clip to an associated category, channel, program, or playlist. The system will then store the assignment.

Figure 4D:
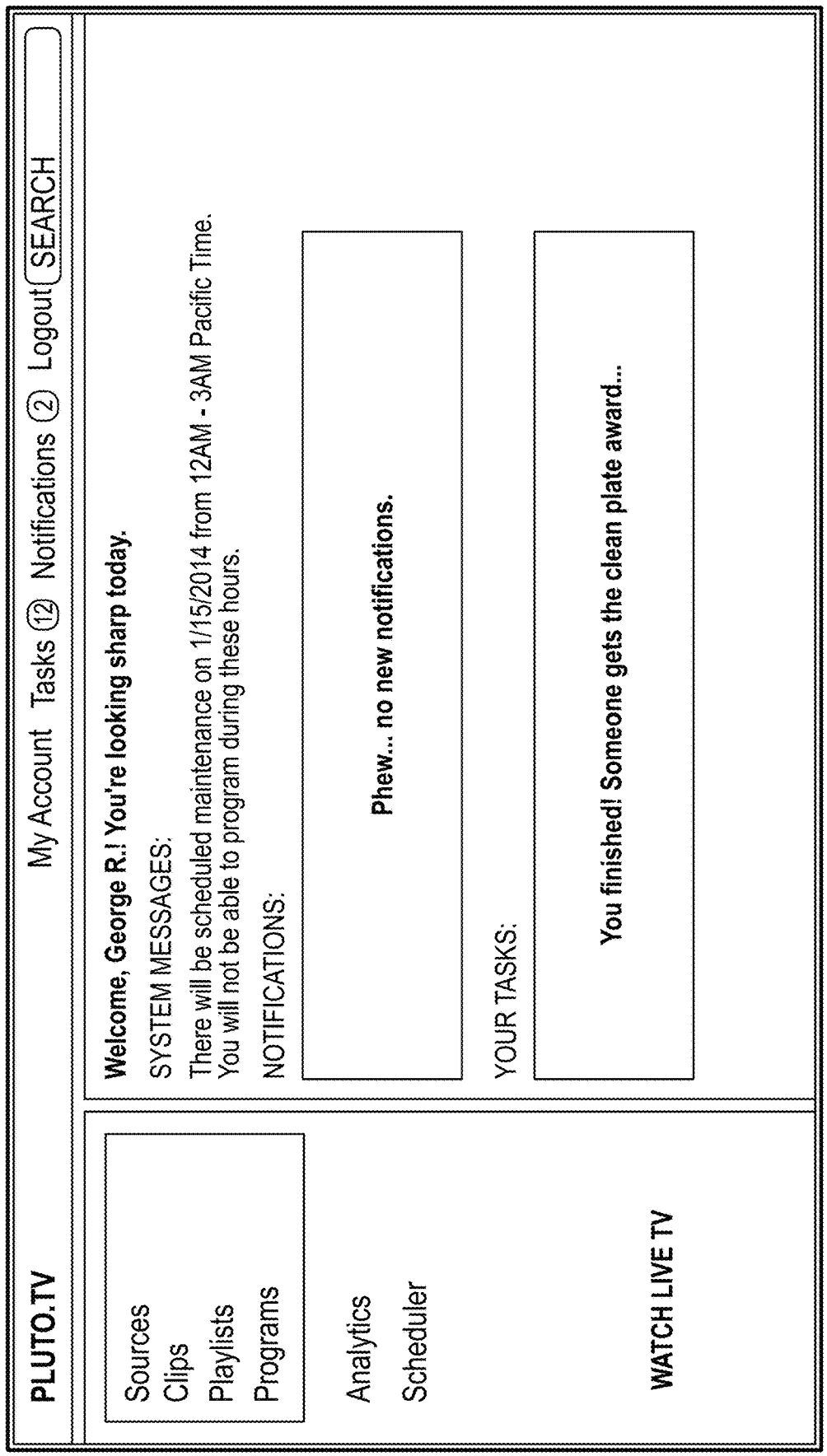

FIG. 4D illustrates an example task/notification interface. The interface may provide system messages (e.g., system up/down times, maintenance schedules, etc.), other notifications, and a listing of uncompleted tasks assigned to the programmer, as tracked by the system. FIG. 4E illustrates an example notification user interface. The notification may identify a corresponding channel, program name, episode number, status/issue (e.g., broken link), and the status date. If, for example, there is a broken link identified, the programmer can click on the corresponding entry, and the system will be present the corresponding playlist, via which the user can fix/replace the broken link.

FIG. 4F illustrates example user interfaces via which a programmer can define a program and can create a new episode within a program series, and can view the last air dates for episodes. The program information user interface enables the programmer to enter, edit, and/or view such information as "title," "program description," "category," "genres", and/or "supplier." The programmer can instruct the system to save the information by activating a save control. The programmer can also navigate to a series information user interface. The series information user interface enables the programmer to enter, edit, and/or view such information as "series title," "episodes title", "duration", season number and episode number, last air/broadcast date of the episode, and premier date (the date the episode was first aired/broadcast). The programmer can select a given episode (e.g., by clicking on an episode entry), and the system will open up the program information user interface.

Figure 4G:
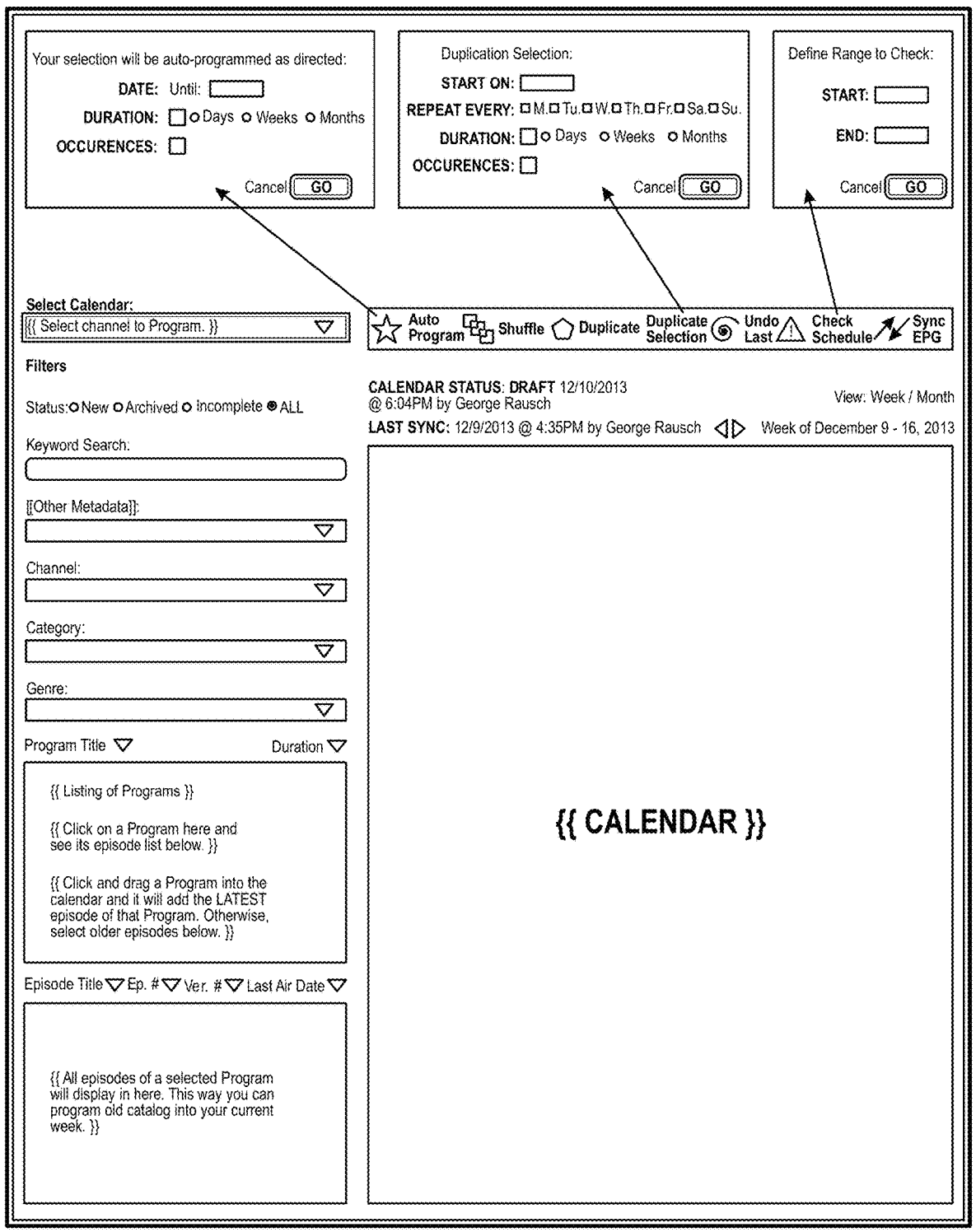

FIG. 4G illustrates an example user interface of a scheduling tool that enables a programmer to program a channel. A "select channel" interface enables the programmer to select (e.g., via a menu or in search results) a channel to be programmed. Once the channel is selected various other fields may be populated by the system with the relevant programming information (retrieved from memory) for the selected channel. Fields are provided via which the programmer can enter search terms, select/enter metadata, select/enter a category, and/or select/enter a genre. The system will identify corresponding programs (optionally including the program title and duration) from which the programmer can select to add to the selected channel.

For example, the programmer can drag a given program identifier to a calendar user interface (which lists days and time for specifying broadcast dates and times) and drop the program identifier at a desired month, week, day, and time for the selected channel. The example calendar user interface includes navigation controls enabling the user to navigate to a desired month, week, and/or year. If the identified program is a series with multiple episodes, optionally dragging and dropping the program name will cause the latest/newest episode to be added to the calendar at the specified date/time. Optionally, multiple or all of the episodes for the selected program are listed (optionally, including the episode title, number, version, and last air date) in an episode user interface, and the programmer can drag and drop whichever episode the programmer wishes to add to the calendar. The system may track, update and display calendar status information, such as the date/time the calendar was last modified, who last modified the calendar, last sync (with a live calendar for consumer viewing) date/time and by who, the calendar status (e.g., draft, finalized, etc.), etc. The system may synchronize the updated calendar with the live calendar in response to detection a sync command from an authorized programmer.

It is understood that the programs which may be added by a content programmer to a channel or schedule are not limited to prerecorded programs. The programming tool can be used to select and add an upcoming live program (e.g., a concert, sporting event, awards show, interview, etc.) to a schedule for a channel. For example, the live program may be streamed from a third party content site. The programming tool may inspect and check the programming to ensure that the programmer did not schedule the live event to be played at a date/time that is prior to the occurrence of the live event. If the programming tool determines that the programmer has attempted to schedule a live event to be played before the occurrence of the live event (e.g., as determined by comparing scheduling day/time metadata accessed from the third party content site with that of the programming calendar), the programming tool may notify the programmer of the error and optionally prevent the programmer from scheduling the live program at such a premature date/time. Thus, optionally, a given channel may include prerecorded and live streamed programs/clips (or other content, such as image content, social streams, blogs, text messages, etc.). Adding a live streamed event to a channel may optionally be performed seamlessly, in a manner similar to that of recorded, non-live, content.

An auto-program user interface corresponds to an auto-program function. The programmer can define certain criteria for the auto-programming of programs by entering or selecting, via respective fields, an ending date, a duration (e.g., in days, weeks, or months), and the number of occurrences. The auto-program function takes a selection (single or multiple programming blocks) and receives the date, duration, or number of occurrences in which to automatically program the selection into the future. Optionally, in order to use the auto-program function, the programming pattern (e.g., day(s) of the week, refresh cycle (daily, weekly, bi-monthly, monthly)) needs to be pre-defined at the program level. The auto-program function will automatically program the program/episodes in accordance with the programmer's definition, thereby reducing the effort and time needed to perform a repetitive programming process.

A duplicate selection user interface corresponds to a duplicate selection function. The programmer can define certain criteria for the programming of programs by entering or selecting, via respective fields, a start date, a repeat definition (e.g., repeat every Monday, Tuesday, Wednesday, Thursday, Friday, Saturday, and/or Sunday), duration (e.g., in days, weeks, or months), and the number of occurrences. The duplicate selection function takes a selection (single or multiple programming blocks) and receives the definition in which to automatically program the selection into the future. The duplicate selection may be used where the programming pattern is not pre-defined at the program level. The duplicate selection function will automatically program the program/episodes in accordance with the programmer's definition, thereby reducing the effort and time needed to perform a repetitive programming process.

A check schedule user interface corresponds to a check schedule function. The check schedule function is configured to detect errors (e.g. unused space (e.g., a time range in the schedule where no content is designated to be played), scheduling of a live event to be played at a time prior to the occurrence of the live event, removed or invalidated clips (or other content), insufficient available advertising and promotional space (in terms of time), incomplete metadata (e.g., missing thumbnails, titles, descriptions, length information, etc.), etc.) and to report the errors to the programmer before the programmer synchronizes their programming calendar to a live calendar for consumer viewing. The check schedule function report may include a list of programming errors that need to be fixed and programming errors that may be ignored auto-program function. The programmer can define start and end dates for the schedule check via the check schedule user interface.

Optionally, consumers may also be provided with access to some or all features of the channel scheduling tool to enable users to program their own channels and to share their channels with other users. Optionally, one or more channels may be crowd sourced by multiple users. Thus, the broader population may be provided with curating tools to let independent users generate channels.

For example, the curating tools may enable an independent user to create a linear, scheduled experience out of on-demand content. For example, a library of different content may be provided via which the user can assemble a program or channel. By way of illustration, on-demand content may be categorized as to themes or subject matter (e.g., retro-comedy, reality clips, etc.). The independent user may select one or more categories of content from the library, and select one or more items of content from the categories of content to create a program or a set of programs. Optionally, the independent user may include content from other sources as well. The independent user may define a channel using the programs (e.g., where the programs are scheduled to be shown at specified times or according to a specified schedule), and the channel may be made available to users at large (e.g., via an electronic program guide provided to other users that includes a listing for the user generated channel or program) or only to users identified by the independent user that created the channel or that have a specified social networking relationship with the independent user.

Figure 5A:
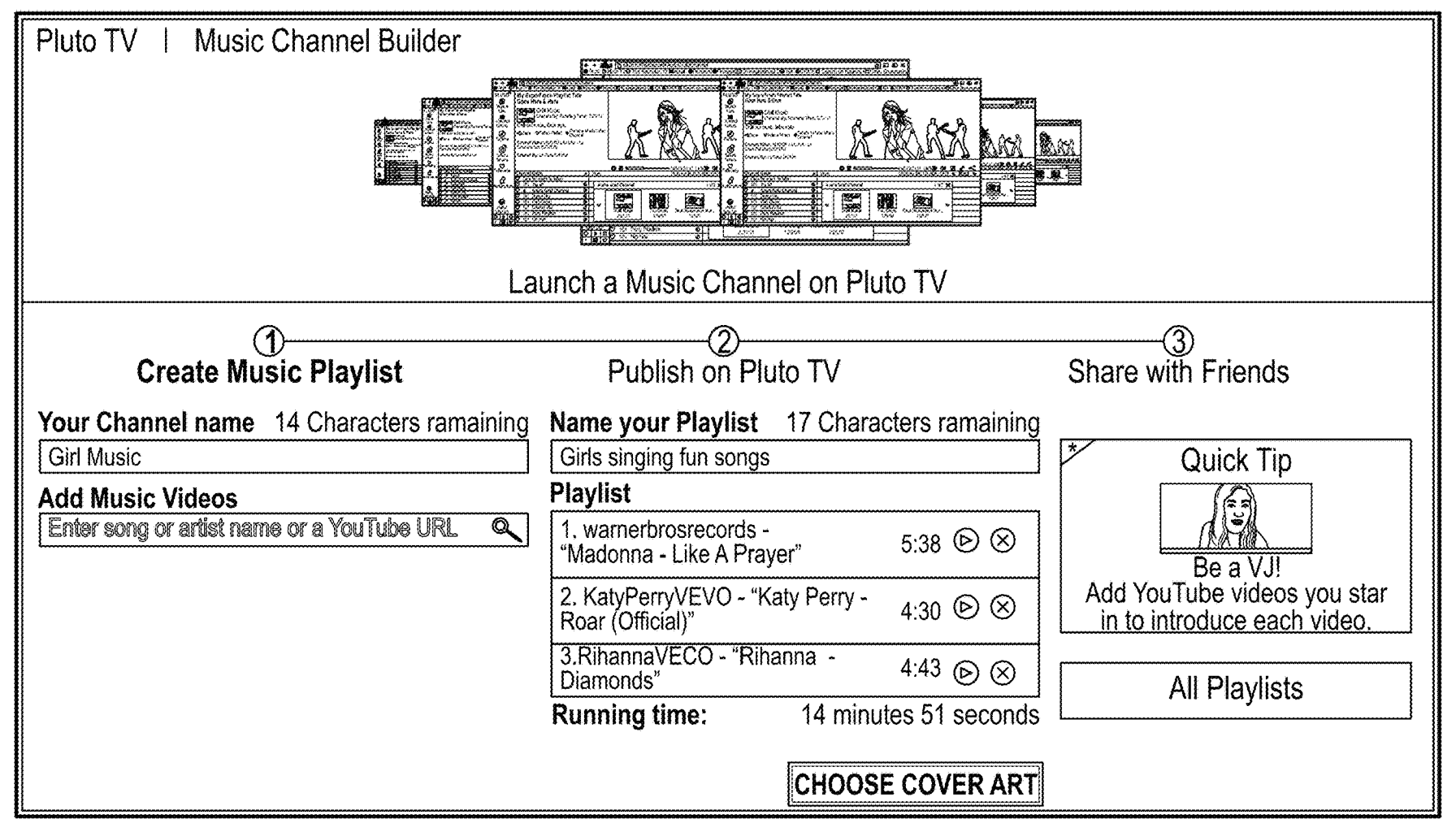

FIG. 5A illustrates an example program generation user interface which guides a user (e.g., an independent user who is not a professional content programmer) through a program generation process. The illustrated example user interface has specific fields and controls for the assemblage of a music video program for a music channel to further ease the program generation process for a music video program. Other program-type specific user interfaces may be provided as well (e.g., a "Top 10 list" program definition user interface, a cooking program definition user interface, etc.).

In the example illustrated in FIG. 5A, a channel name field is provided via which the user may enter a name for the user's channel. A playlist name field (where a playlist may correspond to a program) is provided via which the user may enter a name for the current music video playlist being defined. An "add music videos" interface is provided via which the user can specific or select a music video to add to the playlist. For example, the user may enter a song, artist, or album name, and a system search engine will locate and present a listing of matching music videos with associated play controls enabling the user to view play the music videos. The user may then select one or more of the matching music videos to add to the playlist. Optionally, the "add music videos" interface may be configured to receive a locator (e.g., a URL) for a music video to be added to the playlist, A playlist field displays the music videos currently included in the playlist, including the name of the music video/song, the associated record label, the play time, and the play ordering (1, 2, 3, etc.). A play control may be provided with respective playlist entries, which when activated will cause the corresponding music video to be played. A delete control may be provided in association with a given playlist entry which the user can activate in order to delete the playlist entry from the playlist. The current playlist running time may be calculated and displayed. The playlist running time may be recalculated and displayed when additions or deletions are made to the playlist. A control may be provided enabling the user to select cover art for a given playlist entry and/or for the channel as a whole. The user playlist definitions are received and stored by the system.

Optionally, a user interface may be provided that enables the user to insert user generated content (e.g., video clips) between non-user generated content (e.g., between video content from this party video hosting sites). For example, the user generated content (e.g., where the user records a video of the user acting as a program or channel host) may be used to introduce the next item of non-user generated content. By way of illustration, if the user is defining a "top 10 list" program that discusses 10 items of video content, the user interface may first prompt the user to record (e.g., using a video recorder included in the user terminal) an overall program introduction. The user interface may then prompt the user to record an introduction to the video rated number 10. The user interface may then prompt the user to record an introduction to the video rated number 9, then 8, then 7, and so on. Thus, the user interface provides a template guiding the user through the program and channel creation process. The process may assemble a channel using a plurality of user-generated programs.

Figure 5B:
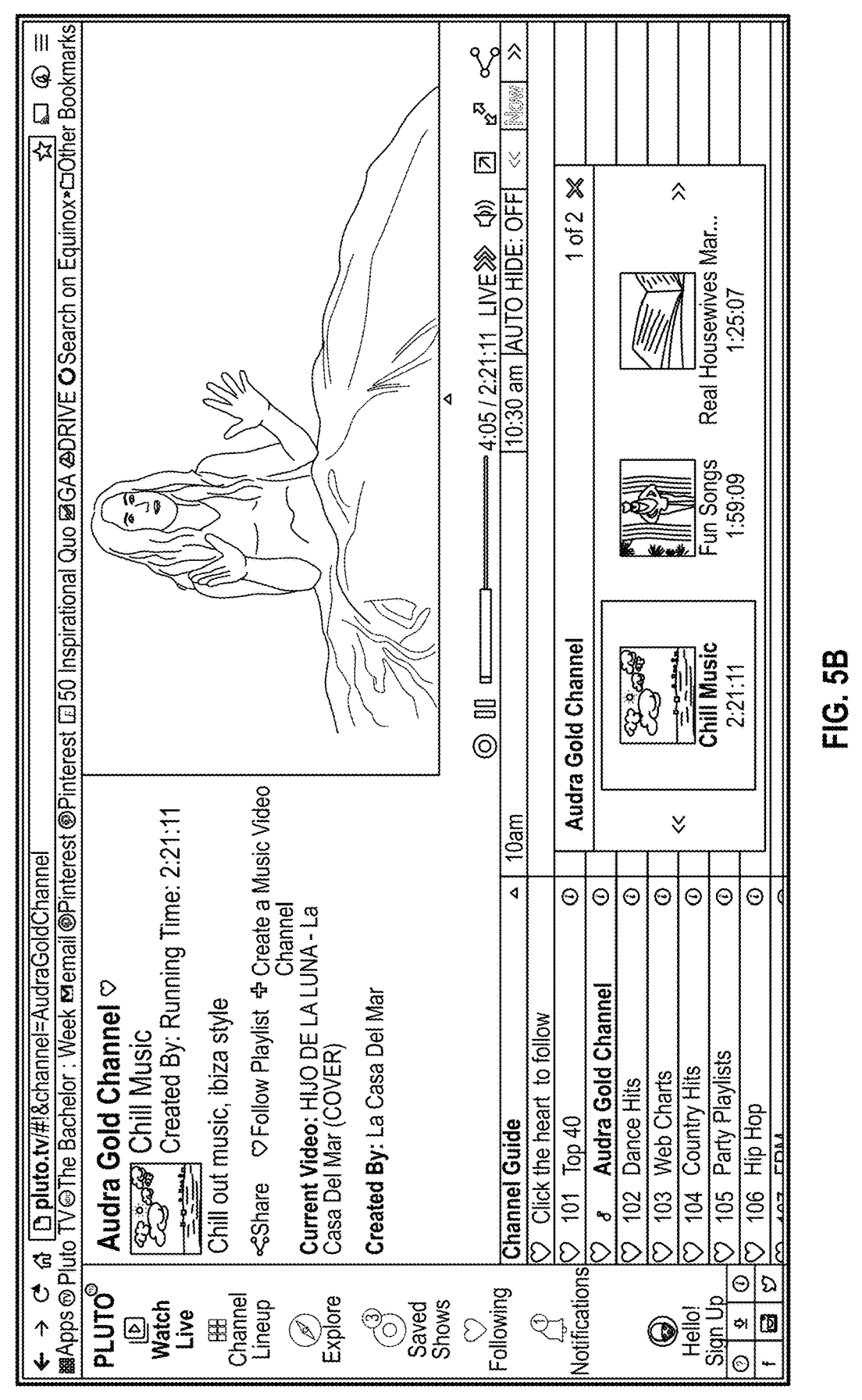

FIG. 5B illustrates an example program guide user interface including a listing for a user-generated program created using the user interface illustrated in FIG. 5A. The user generated playlist is included in the channel guide ("Audra Gold Channel"), and some or all of the album covers may be displayed at a given time, where the album cover of the currently playing music video is emphasized (e.g., via a frame, color, size, or otherwise). Controls may be provided enabling the viewer to skip a music video or to otherwise navigate through the playlist. Optionally, the playlist may be played on-demand, rather than at specifically scheduled times.

As noted above, the program lineup for a given channel may be manually selected by an operator or automatically selected by a channel generation module 150. For example, an operator may specify a theme for a channel. The operator may assign one or more tags to a channel, where the tags correspond to the channel theme. By way of illustration, if the theme of the channel is to be cats, the operator may assign the tags "cat", "feline", and "kitten" to the channel. The operator may specify further tags for a specific desired program/episode at a specific time. A given program may be made up of multiple clips (e.g., short videos and/or other content such as image content, social streams, microblogs, text messages, etc.) from one or more sources (e.g., the video hosting sites discussed above, social network streams, microblogs, etc.). The operator may also specify time lengths for programs, and the day and/or time the corresponding program is to be shown. Optionally, the operator may specify a desired time length, with minimum or acceptable maximum time for the program and/or for clips (and/or other content) included in program. The operator may also specify (e.g., by providing a URL) one or more sources for video content.

For example, the operator may want a program about cat tricks for a 6:00 PM presentation. The operator may specify program tags "cat tricks", "tricks", "swimming cat", "climbing", etc. The operator may further specify that the program is 30 minutes long, and each clip to be included in the program is to be preferably 2 minutes, but no shorter than 1 minute long and no longer than 3 minutes long, and program is to be displayed at 6:00 PM. The module may then search the specified video or other content sources for videos or other content with tags corresponding to one or more of the tags specified by the user, that are preferably 2 minutes long, and no shorter than 1 minute and no longer than 3 minutes, where the total length of the videos are 30 minutes. The operator may optionally specify thresholds for numbers of views and viewer ratings the clips (or other content) are to have, as similarly discussed elsewhere herein. The operator can similarly specify multiple programs for a given day or days, and the channel generation module will locate corresponding clips.

The channel generation module 150 will then schedule the found clips (or other content) to be routed to users that have elected to view the corresponding programs or channels via the program guide user interface. Optionally, the resulting program assembled by the channel generation module 150 may be presented by the system to an operator (e.g., a content programmer) to ensure that the program, and the assembled clips (or other content) for the program, are suitable. The operator may change the ordering of the clips (and/or other content), and may delete clips and add clips or other content (e.g., accessed from a system database of clips or other content and/or by manually navigating to one or more video sources or other content sources to identify and select clips or other content).

As similarly discussed above, the content described herein may be in the form of video content, music content, still image content, social streams, text messages, etc., or any combination thereof. Thus, for example, a programmer (or an end-user programming their own channel), may compose a program (e.g., an episode) or channel to include a mixture of video clips, streaming microblogs, and social networking streams. By way of illustration, a programmer may compose a channel program to include a 3 minute video clip of a pet doing tricks, followed by a 30 second stream of a social network associated with the channel (which may include substantially real-time user posts related to the video clip), followed by a 15 second stream of a microblog of a first specified person (which may include substantially real-time posts from the first person related to the video clip), followed by a 2 minute clip of a pet doing tricks, followed by another 30 second stream of the social network associated with the channel, followed by a 15 second stream of a microblog of a second specified person, followed by a 2 minutes of a live dog show, and so on. Thus, a program and/or channel may integrate different types of content/media (including live and recorded content) from different types of sources.

As similarly discussed above, programs and/or channels may be automatically generated, and programs and/or channels. Further, socially driven real-time programming of channels may be provided. By way of illustration, viewer input may be taken into account in generating a program or channel, in real-time. For example, a poll may be provided to users (e.g., via the program guide, a pop-up prompt, a text message, or otherwise) during a clip, program, advertisement, or content transition, asking viewers what they would like to see next. When the poll is for an existing channel, the poll may include choices related to the subject matter of the channel or program. By way of illustration, if the channel is for dog tricks, the poll may ask if they want to see a clip of a video a dog performing a retrieving trick, a jumping trick, or a catching trick. Based at least in part on the votes, corresponding content may be selected (optionally in real time), and the selected content may then be displayed next and/or at a later time.

Optionally, content (e.g., a video clip, image, etc.) for a channel or program, and/or the theme of a channel or program, may be selected or generated based, at least in part, on input from social network sources. For example, trending subjects may be identified on one or more social network sites, such as microblog sites, image posting sites, etc. The trends may be identified via metadata (e.g., keywords, key phrases, hashtags, subject descriptions etc.) associated with social network data, or from an analysis of the content itself. For example, the speed of posts (e.g., the number of posts per minute) and acceleration of posts (e.g., the rate of increase or decrease of posts over a period of time, such as the last hour) regarding a particular subject may be determined and used in selecting an item of content for a program, may be used to select a title or a channel.

Rules may be defined which specify which social network data, in terms of content, source and/or time period, is to be used in determining which content to select. For example, a rule may specify that video clips from one or more specified sources having metadata corresponding to the top 10 Twitter hashtags over the last 24 hours are to be selected for a program. By way of further example, a rule may be defined specifying that the 20 most popular video clips (in terms of views over the last 7 days), from a specified video hosting website, having the phrase "cat trick" in the title, are to be identified, and that the top 5 of those 20 video clips having the most views over the previous 24 hours are to be selected to form a program.

Optionally, an automated process of selecting and/or generating transitions/interstitials between clips or programs may be utilized. For example, an interstitial may be in the form of text, video, and/or audio content that may be presented during (e.g., as a partial overlay) and/or after a given item of primary content is being displayed (where primary content may be a programmed clip, such as a clip of a cat trick for a cat trick program). The interstitial may be used to aid in tying or bridging clips into a program, or tying or bridging programs into a channel. The interstitial may provide information regarding an upcoming clip or program. The interstitial may optionally be selected based at least in part on characteristics of a viewer (e.g., user preferences, user profile information, etc.). Rules may be defined to select an interstitial.

An interstitial may include static content (e.g., static text) and/or dynamic content (e.g., dynamically selected text). By way of illustration, static text may include the phrase "Coming up next" followed by dynamic text including the title or subject matter of the upcoming content ("the week's funniest cat videos"), optionally obtained from metadata associated with the upcoming content.

By way of further example, the interstitial content may be selected that corresponds to the user's interests. By way of illustration, if it is determined that the next program is not of interest to the viewer (e.g., by comparing preference information for the viewer that indicates the viewer's subject matter interests with metadata of the next program that indicates the subject matter of the next program), but a program that will be displayed in two hours is of high interest to the viewer, the system may select a interstitial that discusses the program that will be displayed in two hours rather than the next program.

Optionally, as discussed above, the system may be configured to generate, using artificial intelligence, a computer generated channel or program host. For example, the host characteristics may be selected based at least in part on user account information, user preference information (e.g., expressly provided and/or inferred user preferences), and/or metadata associated with program host. The computer generated host may be used to deliver interstitial content, examples of which are discussed above.

Another challenge presented by creating channels and programs for clips from different video sources (e.g., video websites) and/or for other content, is that the different video sources may provide custom video players for videos hosted by a given source. For example, each source's video player may have a different appearing video player, with common controls placed in different positions, and with some video players having different control sets than other video players. Conventionally, such inconsistent player user interfaces and functionality does not pose much of a problem for users, as users typically are accessing videos at a single source during a given viewing session.

However, when users are viewing, via a single site, multiple videos as part of a channel, they expect to have a unified viewing experience, and it would be confusing and disconcerting to be presented with a different player for each program/video. To address this problem, certain embodiments provide a meta-player that integrates other video players into single experience and provides a common video player interface. For example, while the user is watching a channel, the meta-player may cause a given program to be presented in a video presentation area. When the next program comes on, it too is presented in the same video presentation area, even though the native players may present the videos in differently positioned presentation areas. Further, the meta-player places a common set of video player controls at the same locations and with the same appearance, even though the native players may have different control placements and different control appearances.

By way of example, the common controls may be defined to include some or all of the following: rewind, fast forward, play, pause, record, navigate to the next clip (or other content), like, share (which enables a user to instruct that a notification regarding the program, optionally including a link to the program, be sent to a designated recipient), etc. Optionally, if a given source player includes a control that is not included in the common control set, that non-common control is excluded from presentation to the user via the meta-player. Optionally instead, if a given source player includes a control that is not included in the common control set, that non-common control is presented to the user via the meta-player in an area reserved for the display of non-common controls.

In certain embodiments, the system determines what player is needed to play a given video clip (e.g., based on the source of the clip/the URL to the clip), and then uses a program (e.g., implemented using an interpreted client side script, such as JavaScript) to call the appropriate player, wrapped in the meta-player interface.

The video player may be configured to display programs from two or more channels at a time in respective windows. For example, the windows may be configured as picture-in-a-picture windows, as side by side windows, or as windows that the user may drag and drop to desired locations.

Thus, certain embodiments optionally provide seamless switching of video sources and players in a manner transparent to the user to thereby provide the user with a unified experience when viewing content from different sources (e.g., within a program or a channel).

Figure 6:
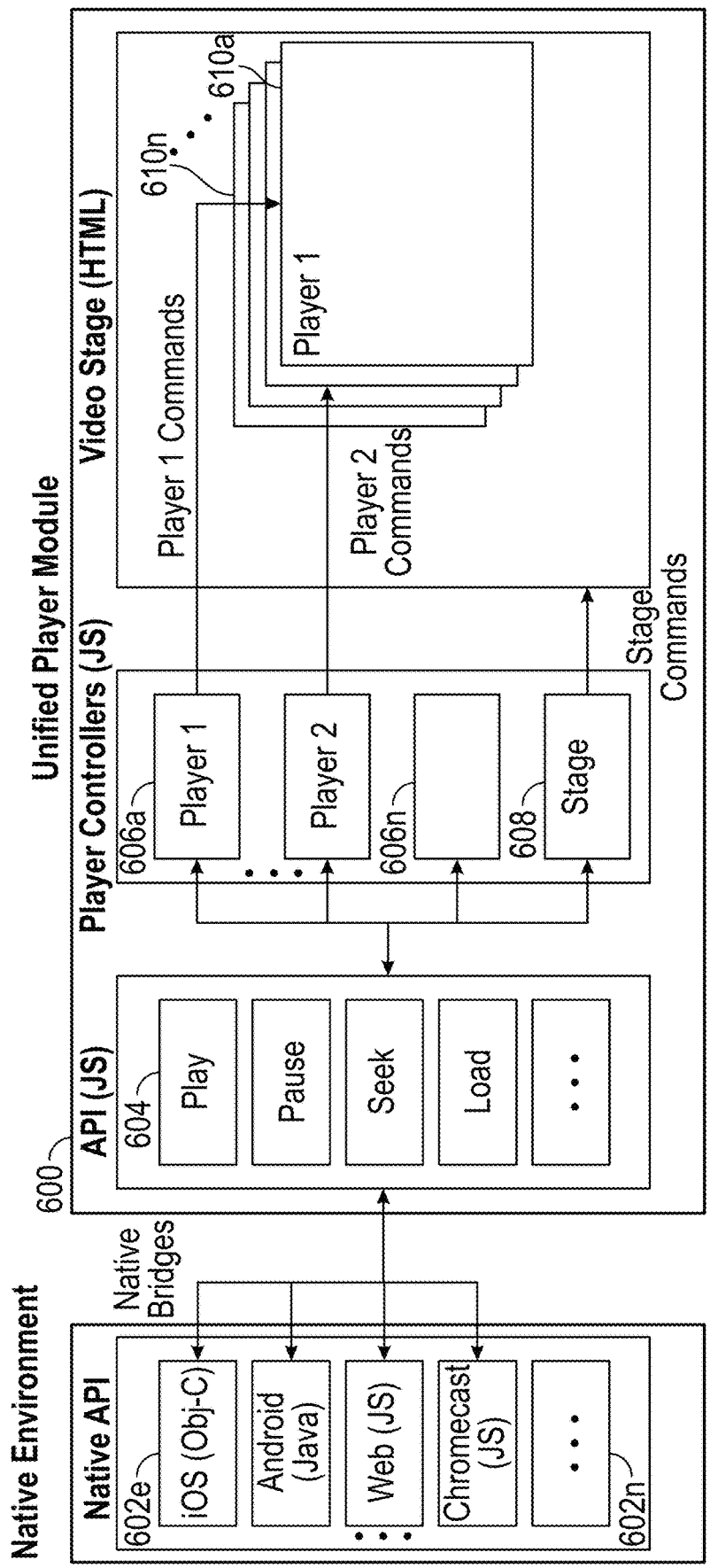
FIG. 6 illustrates an example unified content player architecture.

FIG. 6 illustrates an example architecture utilizing a unified player 600 that provides a common wrapper for a plurality of third party content players 610a-610n. In this example, various native bridge APIs 602a-602n are provided for various native environments (e.g., IOS®, ANDROID®, Web, CHROMECAST®, etc., which may be hosted on mobile devices, such as tablets, phones, laptops, etc., and/or on non-mobile devices, such as networked televisions, desktop computers, game consoles, etc., and which may utilize different programming languages) to communicate with a unified player module (e.g., an HTML or HTML hybrid content player application). The unified player 600 may include APIs 604 (optionally implemented in JavaScript) for common player functions, such as, by way of example some or all of the following: play, pause, forward, fast forward, rewind, fast rewind, seek, load, etc. The player function APIs 604 may in turn communicate with player control APIs 606a-606n (optionally implemented in JavaScript) for various content players 610a-610n (e.g., video players).

The content players 610a-610n may include chromeless content players that provide outside developers access to the standard player controls, and enable the outside developers to provide their own customized skin and/or additional features. Different content players may be configured to play different types of formats of content (e.g., MPEG, MKV, AVI, FLV, etc.). Optionally, the original video host's advertisements, analytics, watermark, etc. are preserved with the content stream.

A given player controller API routes commands received from a user via the native environment to the currently active content player. A stage module 608 ensures the appropriate content player is being used for the content (e.g., video clip) currently being played. By way of illustration, a given program may include four video clips, each of which utilizes a different content player. When the program is played, the stage module 610a-610n causes a first content player to play a first item of content, a second content player to play a second item of content, etc. However, to the user, it appears as if the same content player, with the same controls in the same positions, is being used to play each of the four video clips.

Figure 13:
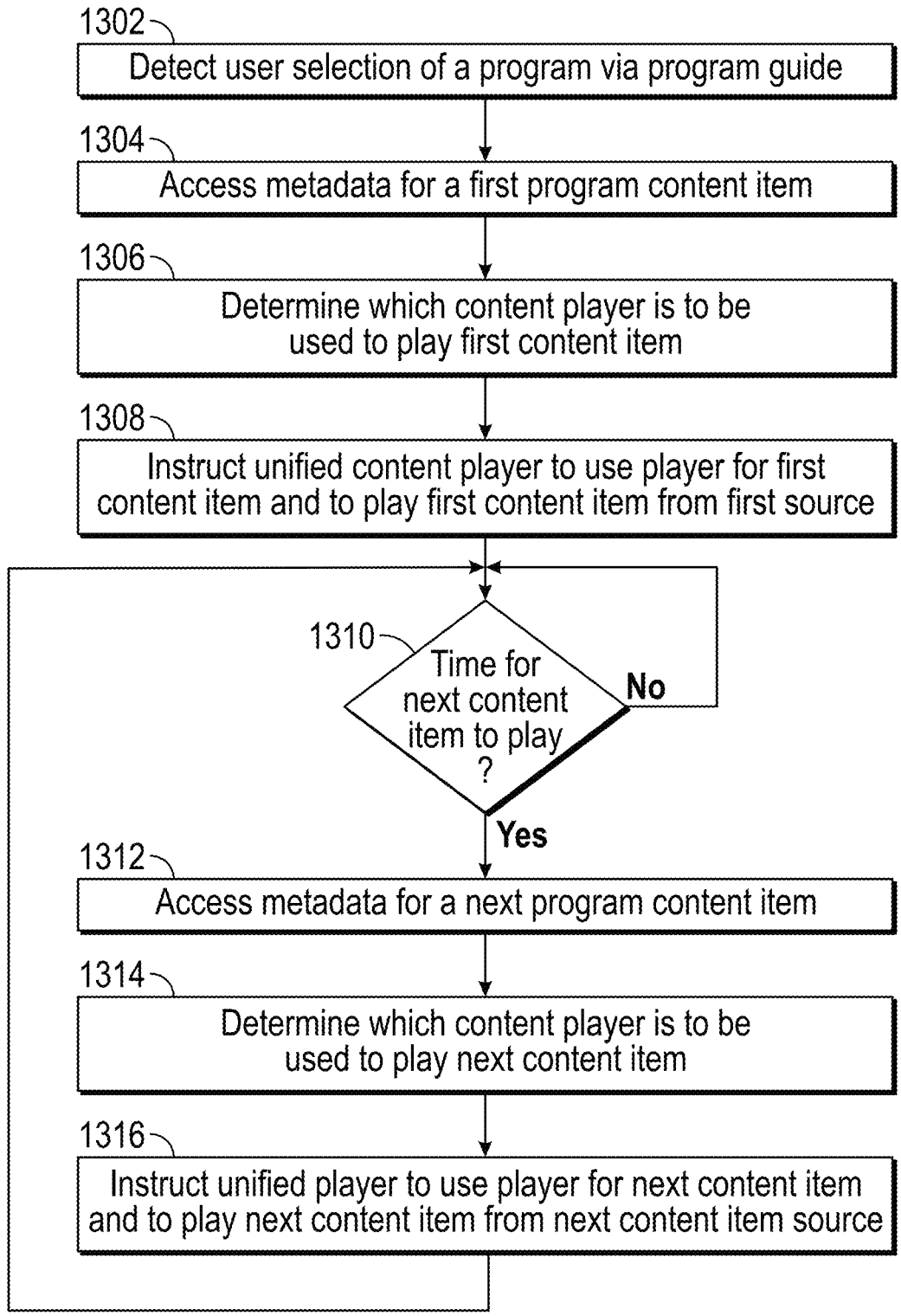

FIG. 13 illustrates an example process utilizing a unified content player, which may be executed using a content scheduling system or other computing system. While the following description may refer a first and a second item of content and a first content player and a second content player, there may be more than two items of content and two content players. At block 1302, an electronic program guide is presented to a user, and the user selects a program to play (or the user is watching a program playing as a result of a previous selection of a channel of which the program is a part). The user program (or channel) selection is detected. The program in this example is composed of multiple content items (e.g., video clips) from different sources, where at least one content item is to be streamed from a first source and is to be played back using a first content player (e.g., a first video player), at least one content item is to be streamed from a second source and is to be played back using a second content player (e.g., a second video player).

At block 1304, metadata associated with the first content item is accessed. Optionally, the metadata may be accessed from a local data store (e.g., local content data store of content scheduling system 102). Optionally, the metadata is accessed from the first content item source. The metadata associated with the first content item may include some or all of the following data: an identification of what content player is to be used to play the first content item, an identifier identifying the first source and/or a content item identifier (e.g., a unique alphanumeric or other code) identifying the first content item.

At block 1306, the process determines, at least in part, from the metadata which content player is to be used to play the first content item. At block 1308, the process instructs a unified content player on a user terminal to access the first content player and to utilize the first content player to play the first content item from the first content source. For example, the instructions may include the first content player identifier, the first source identifier, and/or the first content item identifier. Optionally, the instructions include a URL corresponding to the first content item. The first content player may be presented via a user browser and may be generated using code (e.g., JavaScript) from the content scheduling system, the first content source, and/or other source. The first content player may be configured so that the appearance conforms to a standardized uniform content player appearance (e.g., with the controls in a certain location and with a certain appearance, which may be different than that of the first content player in its native form).

At block 1310, a determination is made whether it is time for the next content item (the second content item in this example) to be played by the unified player. For example, the determination may be based on a timer or a trigger (e.g., metadata associated with the program) that indicates that it is (or is about to be) time for the second content item to be played. If it is time for the second content item to be played, at block 1312 metadata associated with the second content item is accessed (although the metadata may be accessed earlier, such as at the beginning of the program). Optionally, the metadata may be accessed from a local data store (e.g., local content data store of content scheduling system 102). Optionally, the metadata is accessed from the second content item source. The metadata associated with the second content item may include some or all of the following data: an identification of what content player is to be used to play the second content item, an identifier identifying the second source, and/or a content item identifier (e.g., a unique alphanumeric or other code) identifying the second content item.

At block 1314, the process determines, at least in part, from the metadata which content player is to be used to play the second content item. At block 1316, the process instructs a unified content player on a user terminal to access the second content player and to utilize the second content player to play the second content item from the second content source. For example, the instructions may include the second content player identifier, the second source identifier, and/or the second content item identifier. Optionally, the instructions include a URL corresponding to the second content item. The second content player may be presented via a user browser and may be generated using code (e.g., JavaScript) from the content scheduling system, the second content source, and/or other source. The second content player may be configured so that the appearance conforms to a standardized uniform content player appearance (e.g., with the controls in a certain location and with a certain appearance, which may be different than that of the second content player in its native form), so that the second content player and the first content player appear the same to the user, and the switching of content players is transparent to the user (e.g., the user is unaware that different content players are being used to play content from different sources). The process may then repeat for the next content item, and so on.

It is understood that other activities may be performed by the unified content player during playback of a content item. For example, the unified content player may report (e.g., to the content scheduling system or other system) the current playback position of the content item being played, buffering delays, and/or other information.

Another challenge posed by the process of composing a program using one or more clips from third party content hosting sources over which the system operator has no control, is that a given clip may be deleted at any time (e.g., by the third party hosting site, by the posting user, or otherwise). For example, a content hosting source may delete a video clip because of an alleged copyright violation, because of viewer complaints regarding the video clip, or for other reasons. Thus, when a clip is scheduled to be displayed to users as part of a program, the clip may be no longer be available, and an error condition may occur or there may be a dead space within the corresponding program (or if the program is composed of a single clip, the whole program may be "dead").

In order to address this problem, optionally certain embodiments identify backup content (e.g., video content or other content) to be substituted for removed or other unavailable video content that had been included in a program. In an example embodiment, before a given program is scheduled to air, the system may determine whether or not the clip is still available. For example, the system may issue a query to the hosting site via an API regarding the availability of the clip, and the hosting system will then provide a response received by the system, the response indicating whether or not the clip is still available (or may provide no response, which may indicate that the clip is no longer available). By way of illustration, the system may be scheduled to perform the availability check 30 minutes before the program airs, 12 hours before the program airs, one day before the program airs, or other time period before the program airs.

If the system determines that the clip is not available, the system may identify a substitute clip from a pool of clips or from one or more other sources (optionally including a pool of clips stored and maintained by the content scheduling system). By way of example, a pool of substitute clips (or other content) may have already been manually or automatically identified for the specific program (e.g., a dedicated program pool). The system may then select the substitute clip (or other content) from the program pool based at least in part on the similarly to the length (in time) of the no longer available clip. For example, if the currently unavailable clip is 2 minutes in length, the system may identify a clip from the pool that is 2 minutes or less in length. By way of further example, the system may identify a clip between 1 minute and 45 seconds and 2 minutes and 15 seconds long.

Thus, optionally, the system may select substitute content that is longer than the time period of the unavailable content, and may truncate the excess content corresponding to the time that exceeds that of the unavailable content. Optionally, if the system selects substitute content that is longer than that of the unavailable content, the system may delete other content from the program to compensate (e.g., the system may delete previously included promotional/advertising content for other programs). Optionally instead, the system may select substitute content that is no longer than the time period of the unavailable content.

Optionally, rather than using a dedicated program pool of substitute backup clips, the system may search for and select substitute clips from a broader pool (e.g., a pool specific to a given channel) or from third party content hosting sites. For example, the substitute clip may be selected by the system based on its similarity (e.g., as determined by comparing tags) to the currently unavailable clip and on the clip length. By way of illustration, if the currently unavailable clip has a tag of "cat tricks" and is 5 minutes in length, the system may identify a substitute clip that also has the tag "cat tricks" or a functional synonym for "cat tricks" (e.g., "cat stunts"), and that is about 5 minutes in length.

Optionally, rather than using a substitute clip to replace a video clip, live content (or other content type) may be specified, such as a microblog or social network stream.

Optionally, the currently unavailable clip may be substituted using two or more clips (or other content, which may include live content and/or recorded content) that combined have about the same length as the currently unavailable clip. A packing algorithm may be used to select multiple clips (or other content) to replace a given currently unavailable clip. The system may select a combination of substitute content, where each item of content of the combination is shorter than the unavailable content, but the combined length of the combination is longer than the time period of the unavailable content. The system may truncate the excess content from one of the items of the combination of substitute content (e.g., the last item of content) corresponding to the time that exceeds that of the unavailable content. Optionally instead, the system may select a combination of content having a length that is no longer than the time period of the unavailable content. Optionally, if the length is shorter than the time period of the unavailable content, fill-in content may be selected and used to fill-in the time period.

Yet another challenge posed by composing a program using one or more clips (or other content) from sources over which the system operator has no control, is that a given clip may actually vary in length. For example, a given clip may include a lead-in video (or post-roll) commercial when initially identified and selected for a given program, and so the clip (including the commercial) will have a first length. The lead-in clip may be dynamically selected by an advertisement server at the time the clip is requested. Thus, different advertisements of different lengths may be selected based on when the clip is requested and/or based on the location of the requester. Therefore, the given clip may include a different video commercial of a different length than the video commercial that was streamed as a lead-in commercial when the clip was originally selected, (or the clip, when originally selected, may not have included any lead-in video commercial), and hence the total length of the clip (including the lead-in advertisement) may change.

In order to address this problem and to ensure that the lengths of clips are synchronized with the scheduled program end time, certain embodiments schedule a longer time for a given clip/item of content (or for the program in which the given clip is to be included) than the actual length of the clip when initially selected for the program. The selected scheduled length may be configured to accommodate the maximum anticipated potential increase in clip length. For example, typically lead-in advertisements are 1 minute or less, and so the system may schedule an additional minute for the clip, or may schedule an additional 2 minutes to even better ensure that the total clip time (including the lead-in, post-roll, or other advertisement) will not exceed the scheduled time for the clip.

Then, when the clip is about to be (e.g., within 1 second, within 15 seconds, within 30 seconds) or is played as part of the program, the system may examine the clip (e.g., the clip metadata that indicates the advertisement length and/or the clip length) to determine the current total clip length (including the advertisement from the advertisement server) of the about-to-be played clip. For example, the system may use an API to access the clip length without the advertisement from the content hosting system. If the total clip length is shorter than the amount of time scheduled for the clip (or for multiple clips in a given program), the system may select other content to fill out the time. The fill-in content may be selected based on its length and optionally based on its relevancy to the program. If the system determines that the clip is shorter than the allocated time, the system may identify fill-in content, which may be in the form of one or more video clips or still/static images.

Optionally, the system may select fill-in content that is longer than the time period that needs to be filled in, and will truncate the excess content corresponding to the time that exceeds the period that needs to be filled in. Optionally, if the system selects fill-in content that is longer than the time period that needs to be filled in, the system may delete other content from the program to compensate (e.g., the system may delete previously included promotional/advertising content for other programs). The fill-in content may correspond to the subject matter of the program, may be promotional content for other programs, or may be advertisement content for one or more products or services. Optionally, the fill-in content may be retrieved from a pool of clips maintained by the system or from one or more other sources. By way of example, a pool of fill-in clips may have been manually or automatically identified for the specific program (e.g., a dedicated program pool). The system may then select the fill-in clip from the program pool based at least in part on the similarity to the length (in time) of the clip underrun.

Optionally, certain channels may be provided to, and accessed by users for free. Optionally, certain channels may be paid subscription channels, where the system will prevent access to the channels by users that the system determines has not subscribed to those channels. Optionally, bundled subscription packages may be provided where programs and/or channels are bundled by subject (e.g., any available shows regarding a specified sports team), theme (e.g., travel, music, etc.), event (a live concert, a sporting event, etc.), etc., and users may subscribe to one or more bundles. Optionally, certain programs/channels may be on a pay per view basis, where the system informs the user that the user needs to pay a fee to access a given program, or to access a channel for a specified period of time.

Optionally, the system may access (e.g., via an API) programming information from other broadcasters (e.g., cable and/or over-the-air broadcasters that also provide content to computers, mobile devices, etc. or that otherwise provide access to their content), and may add the programming information (e.g., name of program, air date/time, etc.) to the programming guide discussed above. Thus, the program guide may provide an integrated program guide including information for multiple broadcasters (e.g., online video content sources, over-the-air broadcasters, cable broadcasters, etc.). Optionally, the program guide enables the user to select and view channels and content from such broadcasters. Optionally, a user interface is provided via which the user can provide log-in information for the user's account(s) with the other broadcaster(s) that require or ask for such log-in in information order to access their content. The system may then utilize such log-in information from the user (e.g., user ID, password, etc.), to verify that the user is authorized to access such broadcaster content and/or the system forwards the login information to the broadcaster for verification and authorization.

Optionally, one or more channels may be embedded on and streamed to one or more third party sites (e.g., websites). For example, a blog about hip-hop music may embed a hip-hop music channel for viewing by its audience. Optionally, the channel may be presented with links to the site hosted by the system. Optionally, a company may utilize the system to generate a channel or program for a company brand. For example, if the company manufacturers or sells sports footwear, the system may be utilized to generate programs and/or channels of content related to or depicting footwear with the company brand. The content for the program of channel may be hand-selected by the company or the content may be automatically identified and/or assembled into a program or channel as similarly discussed elsewhere herein. The company channel may be accessed via a company website, a website hosted by the system, and/or a third party content hosting website. Optionally, a given channel or program may be syndicated across a plurality of platforms and distribution points (e.g., to other linear platforms, to cable or satellite set-top boxes, etc.). For example, an interface (e.g., provided via a software developer kit) may be provided enabling a publisher to create a channel (e.g., as discussed elsewhere herein) and specify how and to where the channel is to be broadcast (e.g., over the air, over the internet, via cable, etc.).

Optionally, content may utilize IP and/or wireless multicast streaming (e.g., to reduce network bandwidth usage), where a given stream may be accessed by multiple destinations, rather than only using one-to-one unicast streaming. For example, in multicast streaming, a multicast transmission may transmit IP packets to a group of destination terminals on a network. A destination node (e.g., a user terminal) may send to the system a join message when joining a multicast streaming transmission and may send a leave messages when leaving a multicast streaming transmission. For example, when a user is viewing a first channel and then switches to second channel, a leave message may be transmitted by the destination node for leaving the first channel, and a join message may be transmitted by the destination node for joining the second channel. Using multicast transmission, a system can send a packet of data (e.g., content data) once for receipt by multiple destination nodes. Multicast addressing may utilize a variety of different transport layer protocols, such as Pragmatic General Multicast (PGM) or is User Datagram Protocol (UDP).

Optionally, the content scheduling system operator (or other entity) may run advertisements on third party content sites. For example, the content scheduling system operator may purchase keywords corresponding to content, such as a video (e.g., a music video of a popular performer). Then, when a user of a third party content site performs a search using search terms that correspond to the keywords, an advertisement (which may comprise a link, text, an image/frame) for the video may be identified and displayed to the user on the user's terminal. When the user clicks on the advertisement/link for the video, the video may be played to the user. Optionally, the video is played via the site hosted by the content scheduling system. Optionally, the video is played via a third party content site. The content scheduling system may identify a channel that it determines the user may like based at least in part on the user selection of the video (e.g., by identifying a similar theme, subject matter, etc. using/comparing metadata associated with the channels and the video). For example, prior to the user selecting the video, an association of the video with a channel may optionally be performed, so that once a user selects the video, the system already "knows" which channel to select. The content scheduling system may detect or determine when the video has finished playing to the user and then cause the user to be provided with videos from the selected channel (e.g., in accordance with the channel schedule). For example, the currently playing program for the selected channel may be streamed to the user terminal for display to the user. The channel may be identified to the user by name, channel number, and/or otherwise.

Optionally, advertisement insertion points may be assigned by a programmer to different points within a playlist, such as before or after a given clip in a playlist. Thus, rather than specifying an advertisement insertion time, the insertion points are associated with the beginning and/or endings of clips within a playlist, such as a playlist of clips that forms a program. The advertisements may comprise linear advertisements (advertisements that appear before, after, or during a break in the video content (sometimes referred to as pre-roll, post-roll, or mid-roll)) and/or non-linear advertisements (advertisements that appear along with the video content (e.g., overlays that cover part of the video as it plays)). The advertisements may be served by an advertisement server.

Optionally, an operator may specify a maximum number of minutes and/or quantity of advertisements that may be added to a playlist. For example, if the program is scheduled to be 30 minutes long (including advertisements), and the corresponding playlist includes 22 minutes of content, then only 8 minutes of the program time is allocated to advertisements. When the programmer adds an advertisement insertion point, the programmer may specify the length (in time) of the advertisement to be inserted. The programming tool may calculate the current program length (including the base program and the current advertisement insertions) and optionally continuously display the total time to the programmer. The system may compare the current total time against the scheduled program time. Optionally, if the programmer attempts to add an advertisement insertion point with an associated time length that would cause the total length of the program to exceed the scheduled length, an error notice may be generated and presented to the programmer, and optionally the programming tool will prevent the addition of the advertisement insertion point.

Example processes will now be described with reference to the figures. The processes may be performed by or using the systems disclosed herein or by or with other systems. It is understood that not all the following processes need to be performed, nor do all the process states need to be performed.

Figure 7:
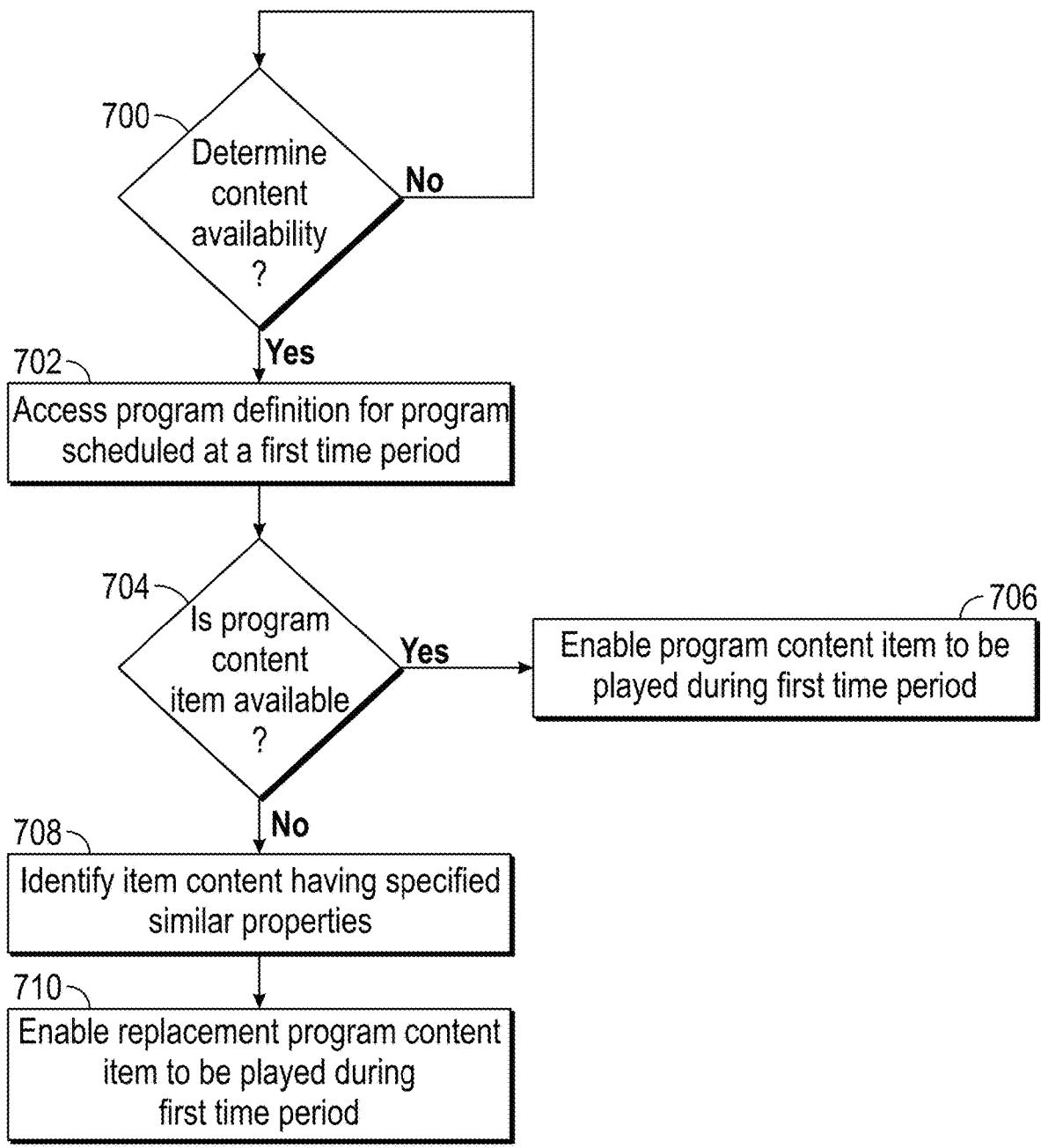
FIGS. 7-13 illustrate example processes.

FIG. 7 illustrates an example process that identifies whether a previously scheduled content item, such as a clip scheduled as part of a program composed of multiple clips, is currently available. The process may optionally be performed using the content substitution module discussed above. At block 700, a determination is made as to whether the process should evaluate the availability of one or more content items (e.g., video clips, etc.) that had previously been scheduled to be included in the program. For example, a rule may be defined that states that the availability evaluation is to be performed a specified period of time before the program is scheduled to be presented, or a specified period of time before the content item is scheduled to be presented. Optionally in addition or instead, the rule may specify a specific day and/or time at which the availability evaluation is to be performed.

At block 702, a program definition for the program scheduled at a first time period is accessed from a data store of program definitions. For example, the program definition may indicate which content items are included in the program and the display ordering of the content items, the content items' lengths, the start time of a given content item relative to the beginning of the program (e.g., content item 3 begins 5 minutes into the program), and may include locators (e.g., URLs) for the content items. The program definition may have been established days, weeks, months, or other time period before the next showing of the program. At block 704, at least partly in response to the determination that the availability evaluation is to be performed, a determination is made for a given content item as to whether the content item is still available. For example, as similarly discussed elsewhere herein, a query may be issued to the hosting site via an API regarding the availability of the content item, and the response, if any, will be received from the hosting system, the response indicating whether or not the clip is still available (or the host system may provide no response, which may indicate that the content item is no longer available).

If the process determines that the content item is available, at block 706 the process enables the content to be streamed as scheduled during the first time period.

If the process determines that the content item is no longer available, at block 708 the process may identify a substitute content item from a pool of content items or from one or more other sources (optionally including a pool of content items stored and maintained by the content scheduling process) having one or more specified similar properties (e.g., subject, length, source, creator, posting date, popularity, etc.). By way of example, a pool of substitute content items (or other content) may have previously been manually or automatically identified for the specific program (e.g., a dedicated program pool). The process may then select the substitute content item (or other content) from the program pool based at least in part on the similarly to the length (in time) of the no longer available content item. Optionally, in addition to or instead of using a dedicated program pool of substitute backup content items, the process may search for and select substitute content items from a broader pool (e.g., a pool specific to a given channel) or from third party content hosting sites.

As similarly, discussed elsewhere herein, optionally, the process may select substitute content that is longer than the time period of the unavailable content, and may truncate or edit out the excess content corresponding to the time that exceeds that of the unavailable content. Optionally, if the process selects substitute content that is longer than that of the unavailable content, the process may delete other content from the program to compensate (e.g., the process may delete previously included promotional/advertising content for other programs). Optionally instead, the process may select substitute content that is no longer than the time period of the unavailable content. Optionally, the currently unavailable content item may be substituted using two or more content items that combined have about the same length as the currently unavailable content item. Optionally, rather than using a substitute content item to replace a recorded content item, live content (or other content type) may be specified, such as a microblog or social network stream.

At block 710, the process enables the recorded and/or live substitute content item(s) to be streamed to a user terminal in place of the original content item during the first time period.

Figure 8:
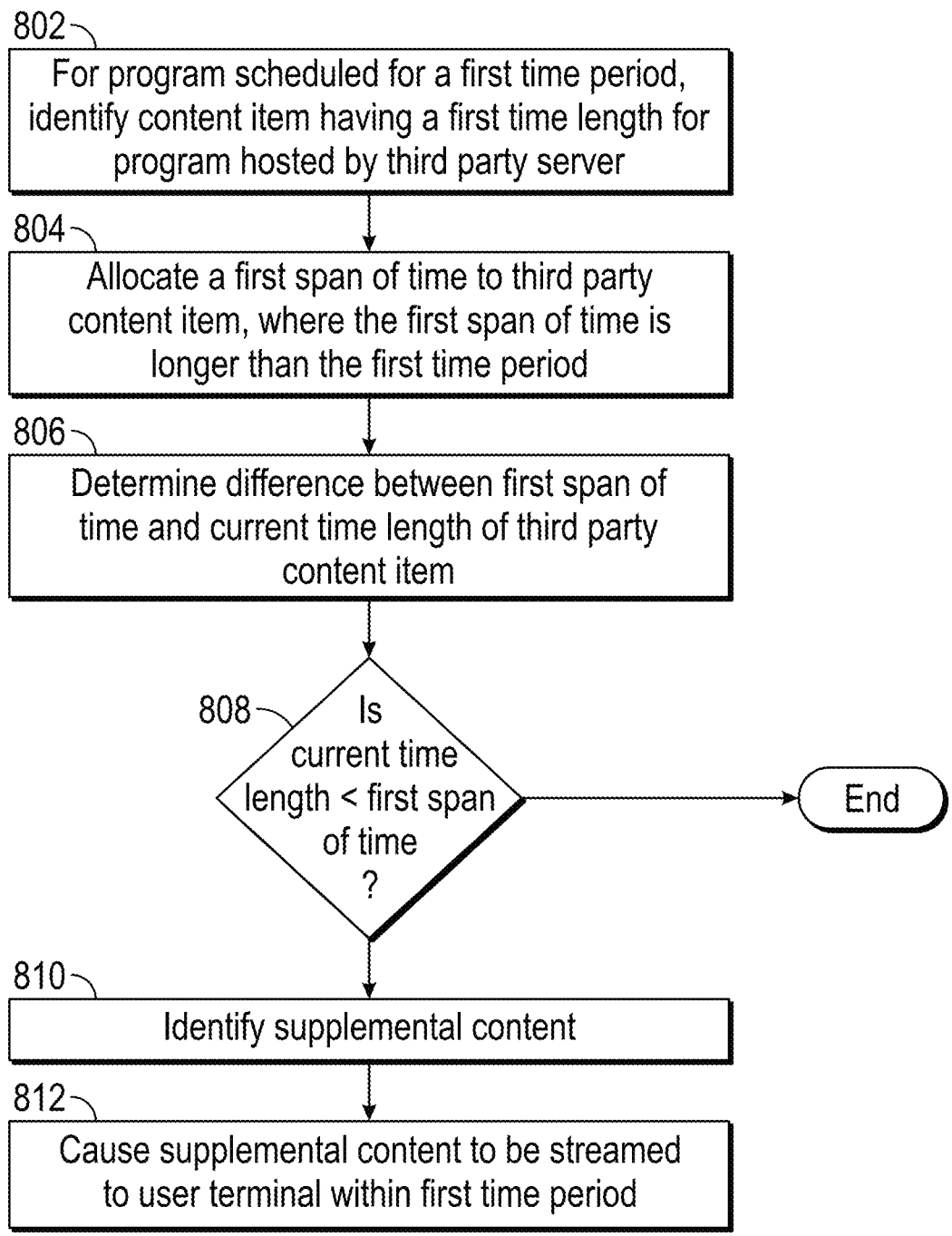

Referring now to FIG. 8, an example process for determining whether supplemental content is needed for a program will be discussed. The process may optionally be performed using the supplemental content identification module discussed above. At block 802, a program definition for a program scheduled at a first time period is accessed. For example, the program definition may indicate the content items that are included in the program and the ordering of the content items for display, the content items' lengths, the start time of a given content item relative to the beginning of the program, and may include locators for the content items. Some or all of the content items may be hosted by third party hosting sites. For example, the content items may include a first content item (e.g., a video clip or other content) hosted by a third party site server, where the first content item has a first time length, where the first time length may include time allocated for an advertisement (e.g., a 30 second video advertisement) as well as for the primary, non-advertising content. The program definition and the content item time lengths may have been established days, weeks, months, or other time period before the next showing of the program. At block 804, a first span of time is allocated for the first content item hosted by the third party site server, where the first span of time is longer than the first time length of the first item.

At block 806, the current length of the first content item is determined. The current length may be the current total content item length (e.g., including an advertisement that will be or is currently being served from an advertisement server, where the current advertisement may be a different advertisement and have a different time length the previously allocated first time length). For example, a rule may be defined that states that the length evaluation is to be performed a specified period of time before the program is scheduled to be presented, or a specified period of time before the first content item is next scheduled to be presented (e.g., within 1 second, within 15 seconds, within 30 seconds, 1 day or other period of time prior to the next presentation of the first content item). Optionally in addition or instead, the rule may specify a specific day and/or time at which the length evaluation is to be performed.

The process may examine the first content item (e.g., the content item metadata that indicates the advertisement length and/or the content item length) to determine the current total content item length (including the advertisement from the advertisement server). For example, the process may optionally use an API to access the content item length without the advertisement from the content hosting system.

At block 806, a determination is made as to whether the current total content item length is shorter than the allocated first span of time for the first content item. If the total content item length is shorter than allocated first span of time for the first content item (or for multiple content items in a given program), at block 808, the process may identify and select other content to fill out the time (e.g., the time=the first span of time—current total content item length). The fill-in, supplemental content may be selected based on its length and optionally based on its relevancy to the program and/or on other criteria (e.g., subject, source, creator, posting date, popularity, etc.). If the process determines that the content item is shorter than the allocated first span of time, the process may identify fill-in content, which may be in the form of one or more video content items or other content items (e.g., still images, blogs streams, etc.).

Optionally, the process may select fill-in, supplemental content that is longer than the time period that needs to be filled in, and will truncate or edit out the excess content corresponding to the time that exceeds the period that needs to be filled in. Optionally, if the process selects fill-in content that is longer than the time period that needs to be filled in, the process may delete other content from the program to compensate (e.g., the process may delete previously included promotional/advertising content for other programs). The fill-in content may correspond to the subject matter of the program, may be promotional content for other programs, or may be advertisement content for one or more products or services. Optionally, the fill-in content may be retrieved from a pool of content items maintained by the process or from one or more other sources. By way of example, a pool of fill-in content items may have been manually or automatically identified for the specific program (e.g., a dedicated program pool). The process may then select the fill-in content item from the program pool based at least in part on the similarity to the length (in time) of the content item underrun.

At block 812, the fill-in, supplemental content is streamed during the program.

As noted above, the length of a given content item (e.g., a video clip) in a program may vary for a variety of reasons, such as a change in the time length of an advertisement (e.g., a video advertisement). In the previous example, the total content time length for an item of content (e.g., including an item of primary content and an advertisement) decreased from when the item of content was originally scheduled as part of a program. However, it is also possible that total content time length for an item of content (e.g., including an item of primary content and an advertisement) may increase from when the item of content was originally scheduled as part of a program. This increase in time may also be caused by content buffering delays on a user's terminal or elsewhere. Buffering delays may be reported to the system by the content player (which may be a third party content player utilized by the unified content player executing on the user terminal) and/or the system may infer a delay from playback status information from the content player. For example, the content player may report the current position in time and/or by frame of the playback of content, and the system may compare the report current position to the scheduled position to determine if there is a playback delay on the user terminal.

Thus, for example, if a program was scheduled to run for 30 minutes, but at the scheduled viewing time the total content time length of an item of content included in the program is 30 seconds longer than originally scheduled (of if there was a 30 second buffering delay), the total time for the program will now be 30 minutes and 30 seconds. In order to deal with this technical challenge, an example technique is to truncate the end of the program (e.g., the last 30 seconds) to ensure the next program begins as scheduled. However, this may provide an unpleasant user viewing experience, as a key portion of the program may be cut off.

Another technique, sometimes referred to herein as a time shift adjustment process, that may optionally be used is to enable a first program to be shown to the user without truncation, even if the first program overruns its scheduled time (as scheduled in the electronic program guide), and to delay the playback of the next, adjacent program so that the next, adjacent program does not start until 30 seconds (or other delay period) after its scheduled start time. For example, the delay may be determined by calculating the time difference between an amount of time originally allocated for a given item of content and the actual play time. Optionally, the electronic program guide may be dynamically adjusted to reflect the extended time of the first program and/or the delayed start and/or end of the next program (and optionally of still additional subsequent programs). Optionally, the electronic program guide is not adjusted to reflect the extended time of the first program and/or the delayed start and/or end of the next program. As discussed herein, the various items of content included in a program may optionally be streamed to the user terminal from various content sources for playback via a content player.

Optionally, in the situation where the user may experience a time shift (e.g., as a result of an advertisement that ran longer than its allocated time or as a result of buffering delays), the time shift adjustment process may choose to not play or inhibit playing of one or more upcoming advertisements in order to allow the program or channel being viewed by the user to 'catch up' to the originally scheduled "live," non-time shifted timeline.

The foregoing technique may be dynamically performed on a viewer-by-viewer basis. Thus, if a first user is viewing the first program (with the extended time), then the next, adjacent program start time may be delayed, as discussed above. However, if a second user is not viewing the first program (or had been viewing the first program but without delays, such as might be caused by buffering on the first user terminal), but then begins viewing the next, adjacent program (e.g., by selecting the next, adjacent program via the electronic program guide), the next adjacent program will begin playing to the second user via a content player at the originally scheduled time.

Thus, two different users watching the same time-scheduled program may actually view them with a time shift comprising a relative time skew (e.g., 30 seconds apart in this example), where the relative time skew may be based on changes in program length of one or more programs being viewed by one user that are not being viewed by another user or an a playback delay (e.g., a buffering delay) that might affect one user but not another user. Further, optionally the electronic program guide of the first user is dynamically adjusted to take into account the extended length of the first program, while the electronic program guide of the second user is not dynamically adjusted.

As similarly discussed above, changes in time length of a given item of content may be determined from metadata accessed via an API from the content source. Optionally, content buffering or other data may be accessed from a user terminal to determine if a display of a given item of content is being delayed as a result of buffering or other delays.

Figure 9:
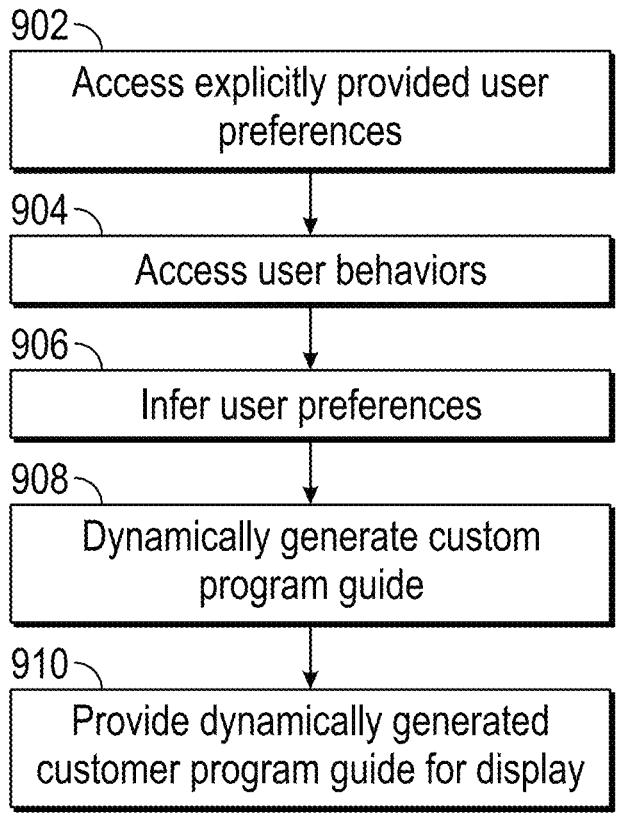

Referring now to FIG. 9, an example process for dynamically generating a customized program guide is discussed. The process may optionally be performed using the program guide generation module discussed above. At block 902, explicitly provided user preferences are accessed. For example, explicitly provided user preferences may be accessed from user account information which stores genre, program, subject matter, content and/or channel likes and/or dislikes, user specifications of channels to be blocked, user reminder instructions, user bookmarks, etc., previously provided by the user.

At block 904, user viewing behavior (e.g., how long a user watches content per day or week, how many times in a specified time period the user changes channels, how often per specified time period the user tries a new channel or show (a channel or show the user has not previously viewed), etc.) and viewing history may be accessed. At block 906, inferred user preferences may be determined or accessed. For example, a user's likes and/or dislikes may be inferred from the user's viewing history, user navigation, and viewing behavior, etc. By way of illustration it may be inferred that the user's most viewed channels in a specified past time period (e.g., the last 30 days) are the user's most preferred channels. On the other hand, if a user frequently switches to a specific channel for short periods of time (e.g., a sports news channel), the process may infer that, even though the user does not spend long period of time viewing the channel, the channel is still a strongly preferred channel.

At block 910, a personalized, dynamically generated program guide is generated based at least in part on the explicitly provided user preferences and/or the inferred user preferences. For example, the explicitly provided user preferences and/or the inferred user preferences may be used in determining the ordering of channels in the electronic program guide (e.g., which channels are presented first, second, third, etc.); which, if any channels are to be excluded from the program guide (e.g., channels that the system determines are of low interest to the user); which channels are to be highlighted (e.g., via color, animation, pop-up interfaces or otherwise, etc.), what types of information are to be included in the program guide, etc. The personalized, dynamically generated program guide may then be provided for display to a user terminal.

Figure 10:
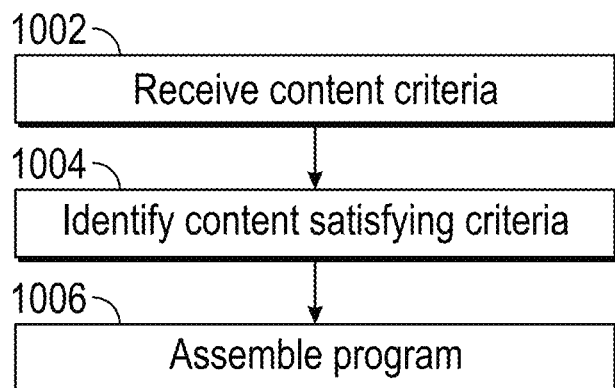

Referring now to FIG. 10, an example process for automatically assembling a program from multiple content items will be discussed. The process may optionally be performed using the automatic program generation module discussed above. At block 1002, a user interface is provided via which a programmer (where the programmer programs shows and may be unfamiliar with software programming languages) can specify criteria and rules for selecting content items for a program. For example, the user interface may enable a programmer to specify a name for the program, keywords associated with the subject matter of the program, a program length, a maximum content item length, a minimum content item length, the desired content-type (e.g., recorded video clips, still images, social media postings, blog streams, etc.), content sources (e.g., content hosting sites), content item popularity thresholds, content item author popularity thresholds, social influence ratings (e.g., scores or rankings), etc.

At block 1004, the process identifies content that satisfies the specified criteria, and ensures that the total length of the assembled of the content items, optionally including advertising, does not exceed the specified program length by keeping a running total of the item content being added to the program. For example, the process may access, via various content hosting APIs, associated metadata to determine if the criteria are met before selecting a given content item to be included in the program. For example, as part of the process of determining if a given item of content matches keywords included in the criteria, the process may compare keywords specified by the programmer to tags associated with the item content to determine if there is a match.

At block 1006, the process assembles the program, including the selected content items, and programs the content items to appear in a specified order. The program may then optionally be included in a program guide, and users may access and view the program via their user terminals.

Figure 11:
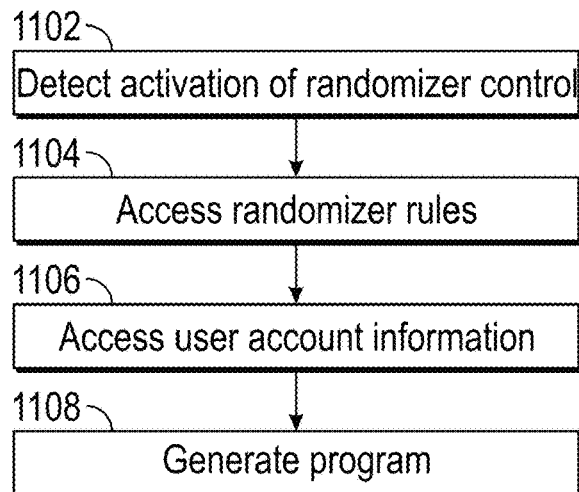

Referring now to FIG. 11, an example process for dynamically generating a program or channel is described. The process may optionally be performed using the automatic program generation module discussed above. The process may be performed in substantially real time. The generated content may include non-scheduled content and/or content not specifically selected by the user (e.g., where the program or channel is not simply a playlist defined by the user). At block 1102, the process detects a user activation of a dynamic program generation control (sometimes referred to herein as a randomizer control) presented via a user interface of a user terminal.

At block 1104, the process accesses from memory dynamic program generation (randomizer) rules. For example, the randomizer rules may include one or more of the following: do not include more than a specified number of content items from the same author, do not include more than a specified number of content items from the same source, do not include content items longer than a first specified length, do not include content items shorter than a second specified length, the dynamically generated program shall be a first specified length, only include content meeting a specified popularity threshold, only include content from authors meeting a specified popularity threshold, only include content from authors meeting a specified social influence rating threshold, etc.

At block 1106, the process accesses user account information (e.g., explicitly provided user preferences (e.g., including likes and/or dislikes)), inferred user preferences (e.g., including likes and/or dislikes), user specifications of channels to be blocked, user reminder instructions, user bookmarks, user viewing history, user navigation and viewing behavior, etc.). The process selects one or more content items based at least in part on the user account information and/or the dynamic program generation rules. At block 1108, the process dynamically generates a program using the selected content and causes the content to be streamed to the user terminal.

Figure 12:
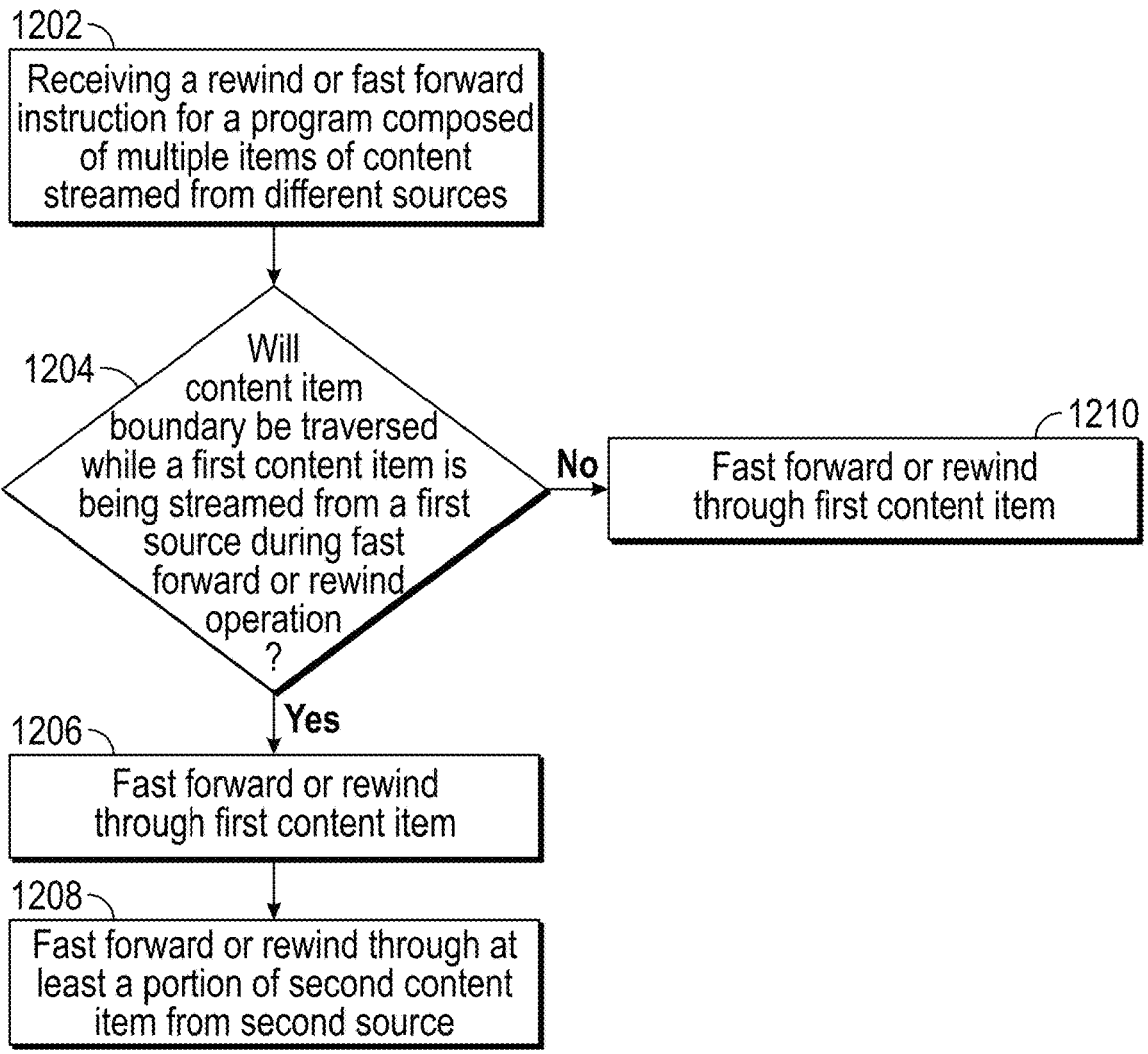

Referring now to FIG. 12, an example process for fast forwarding or rewinding through a programmed composed of content items from multiple content sources (e.g., video hosting sites, etc.) is described. The process may optionally be performed using the unified player module discussed above.

At block 1202, a program comprised of multiple items of content from multiple sources (e.g., from a plurality of content hosting servers operated by different entities) is being streamed to a user terminal. For example, the program may include a first content item from a first source and a second content item from a second source. The user issues a content navigation instruction by activating a content navigation control, such as a fast forward control or a rewind control. At block 1204, a determination is made as to whether execution of the navigation instruction will cause a content boundary will be traversed. For example, the process may determine whether a fast forward operation, began while the first content item is being streamed from a first source, will exceed the length of the first content item. If the fast forward operation, began while the first content item is being streamed from a first source, will exceed the length of the first content item, then at block 1206, the fast forward process proceeds through the first content item from the first source (e.g., with selected frames from the first content item being presented during the fast forward process), and at block 1208, the fast forward process proceeds through at least a portion of the second content item from the second source (e.g., with selected frames from the second content item being presented during the fast forward process).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of playing streaming video content, the method comprising:
    detecting, by a first system comprising computer hardware configured with specific executable instructions, that a first program is scheduled to be accessed by a user terminal, wherein the first program is comprised of at least:
        a first video item configured to be streamed from a first source and to be viewed using a first video player, and
        a second video item configured to be streamed from a second source and to be viewed using a second video player;
    accessing, by the first system, metadata for the first video item, the metadata comprising an identification of the first video item and the first video player;
    based at least in part on the metadata for the first video item, determining, by the first system, that the first video player is to be used to play the first video item;
    instructing a unified content player executing on a user terminal to access the first video item from the first source and to utilize the first video player to play the first video item, wherein the first video item is streamed from the first source, wherein the unified content player comprises a user interface including at least a rewind control positioned at a first location and having a first appearance, and a pause control positioned at a second location and having a second appearance;
    accessing, by the first system, metadata for the second video item, the metadata comprising an identification of the second video item and the second video player;
    based at least in part on the metadata for the second video, determining, by the first system, that the second video player is to be used to play the second video item;
    determining timing for playing of the second video item;
    based at least in part on the determined timing for playing of the second video item, instructing the unified content player executing on the user terminal to access the second video item from the second source and to utilize the second video player to play the second video item, wherein the second video item is streamed from the second source, and wherein an appearance of the unified player user interface does not change relative to the appearance of the unified player user interface when the first video player is utilized.

2. The method as defined in claim 1, wherein the metadata for the first video item comprises an identifier identifying the first source, and a unique identifier corresponding to the first video item.

3. The method as defined in claim 1, wherein the first video player comprises program code accessed by an application hosted on the user terminal, at least in part from the first source.

4. The method as defined in claim 1, wherein the first video player comprises program code accessed at least in part from the first system.

5. The method as defined in claim 1, wherein the first video player comprises program code accessed by an application hosted on the user terminal, at least in part from the first system and from the first source.

6. The method as defined in claim 1, wherein the first video player and the second video player are presented via an application hosted on the user terminal.

7. The method as defined in claim 1, the method further comprising using a timer to determine timing for playing of the second video item.

8. The method as defined in claim 1, wherein the unified content player comprises a stage module configured to ensure an appropriate video player is being used for respective items of content of video content.

9. The method as defined in claim 1, the method further comprising providing a plurality of native bridge application programming interfaces for a respective plurality of different native environments.

10. The method as defined in claim 1, wherein the unified content player is configured to provide a common wrapper for a plurality of different video players.

11. A computer-implemented method of playing streaming video content, the method comprising:
accessing, by a first system, metadata comprising an identification of a first video player;
based at least in part on the identification of the first video player,
enabling a unified content player executing on a user terminal to access a first video item from a source and to utilize the first video player to play the first video item, wherein the first video item is streamed from the source, and wherein the unified content player comprises a user interface including at least a rewind control positioned at a first location and having a first appearance, and a pause control positioned at a second location and having a second appearance;
accessing, by the first system, metadata comprising an identification of a second video player;
based at least in part on the identification of the second video player, determining, by the first system, that the second video player is to be used to play a second video item; and
enabling the unified content player executing on the user terminal to access the second video item and to utilize the second video player to play the second video item, and wherein an appearance of the unified player user interface does not change relative to the appearance of the unified player user interface when the first video player is utilized.

12. The method as defined in claim 11, the method further comprising accessing, by the first system, metadata for the first video item, the metadata comprising an identification of the first video item and the first video player;
based at least in part on the metadata for the first video, determining, by the first system, that the first video player is to be used to play the first video item,
wherein the metadata for the first video item comprises an identifier identifying the source, and a unique identifier corresponding to the first video item.

13. The method as defined in claim 11, wherein the first video player comprises program code accessed by an application hosted on the user terminal, at least in part from the source.

14. The method as defined in claim 11, wherein the first video player comprises program code accessed at least in part from the first system.

15. The method as defined in claim 11, wherein the first video player comprises program code accessed by an application hosted on the user terminal, at least in part from the first system and from the source.

16. The method as defined in claim 11, wherein the first video player and the second video player are presented via an application hosted on the user terminal.

17. The method as defined in claim 11, the method further comprising using a timer to determine timing for playing of the second video item.

18. The method as defined in claim 11, wherein the unified content player comprises a stage module configured to ensure an appropriate video player is being used for respective items of content of video content.

19. The method as defined in claim 11, the method further comprising providing a plurality of native bridge application programming interfaces for a respective plurality of different native environments.

20. The method as defined in claim 11, wherein the unified content player is configured to provide a common wrapper for a plurality of different video players.

21. A computer system comprising:
one or more processing devices;
non-transitory machine readable media that stores executable instructions, which, when executed by the one or more processing devices, are configured to cause the one or more processing devices to:
accessing metadata comprising an identification of a first video player;
based at least in part on the identification of the first video player,
enabling a unified content player executing on a user terminal to access a first video item from a source and to utilize the first video player to play the first video item, wherein the first video item is streamed from the source, and wherein the unified content player comprises a user interface including at least a rewind control positioned at a first location and having a first appearance, and a pause control positioned at a second location and having a second appearance;
accessing metadata comprising an identification of a second video player;
based at least in part on the identification of the second video player, determining that the second video player is to be used to play a second video item;
enabling the unified content player executing on the user terminal to access the second video item and to utilize the second video player to play the second video item, and wherein an appearance of the unified player user interface does not change relative to the appearance of the unified player user interface when the first video player is utilized.

22. The computer system as defined in claim 21, the operations further comprising accessing metadata for the first video item, the metadata comprising an identification of the first video item and the first video player;
based at least in part on the metadata for the first video, determining that the first video player is to be used to play the first video item,
wherein the metadata for the first video item comprises an identifier identifying the source, and a unique identifier corresponding to the first video item.

23. The computer system as defined in claim 21, wherein the first video player comprises program code accessed by an application hosted on the user terminal, at least in part from the source.

24. The computer system as defined in claim 21, the operations further comprising providing at least a portion of code for the first video player to an application hosted on the user terminal.

25. The computer system as defined in claim 21, wherein the first video player comprises program code accessed by an application hosted on the user terminal, at least in part from the computer system and from the source.

26. The computer system as defined in claim 21, wherein the first video player and the second video player are presented via an application hosted on the user terminal.

27. The computer system as defined in claim 21, the method further comprising using a timer to determine timing for playing of the second video item.

28. The computer system as defined in claim 21, wherein the unified content player comprises a stage module configured to ensure an appropriate video player is being used for respective items of content of video content.

29. The computer system as defined in claim 21, the method further comprising providing a plurality of native bridge application programming interfaces for a respective plurality of different native environments.

30. The computer system as defined in claim 21, wherein the unified content player is configured to provide a common wrapper for a plurality of different video players.

* * * * *